US011154032B2

(12) United States Patent
Brayer

(10) Patent No.: US 11,154,032 B2
(45) Date of Patent: Oct. 26, 2021

(54) MEANS AND METHODS FOR FREE DOME RANGE

(71) Applicant: DAIRYCS AUTOMATIC MILKING LTD., Rosh Haayin (IL)

(72) Inventor: Eyal Brayer, Kfar Monash (IL)

(73) Assignee: DAIRYCS AUTOMATIC MILKING LTD., Rosh Haayin (IL)

( * ) Notice: Subject to any disclaimer, the term of this patent is extended or adjusted under 35 U.S.C. 154(b) by 144 days.

(21) Appl. No.: 16/315,130

(22) PCT Filed: Jul. 5, 2017

(86) PCT No.: PCT/IL2017/050753
§ 371 (c)(1),
(2) Date: Jan. 3, 2019

(87) PCT Pub. No.: WO2018/008026
PCT Pub. Date: Jan. 11, 2018

(65) Prior Publication Data
US 2019/0223406 A1 Jul. 25, 2019

(30) Foreign Application Priority Data
Jul. 5, 2016 (IL) .......................................... 246617

(51) Int. Cl.
*A01K 1/12* (2006.01)
*A01J 5/017* (2006.01)
(Continued)

(52) U.S. Cl.
CPC .................. *A01K 1/12* (2013.01); *A01J 5/003* (2013.01); *A01J 5/01* (2013.01); *A01J 5/017* (2013.01);
(Continued)

(58) Field of Classification Search
CPC .............. A01J 5/003; A01J 5/007; A01K 1/12
(Continued)

(56) References Cited

U.S. PATENT DOCUMENTS 2,039,562 A * 5/1936 Shodron .............. A01K 1/0041
119/14.03
4,557,649 A 12/1985 Jeal
(Continued)

FOREIGN PATENT DOCUMENTS

DE 1287174 1/1969
DE 3922624 5/1990
(Continued)

*Primary Examiner* — Lisa L Tsang
(74) *Attorney, Agent, or Firm* — The Roy Gross Law Firm, LLC; Roy Gross

(57) ABSTRACT

A free dome range (FDR) where dairy animals have a free access to their stall to concurrently eat and to be milked. The FDR comprises a plurality of stalls; at least one of these stalls is characterized by a front side and rear opposite side into which a dairy animal is at least temporarily accommodated, head fronting the front side; a plurality of main living areas (MLAs); at least one of the MLAs is in connection with at least one of the stalls by a plurality of gates. The FDR further comprising a substantially horizontally positioned elevated rail system comprising a plurality of elevated rails, and a plurality of mobile milking units (MMUs), each of the MMUs is configured to transport on the elevated rail to a dairy animal at its stall, and milk the animal while it is eating.

10 Claims, 55 Drawing Sheets

Figure 1:
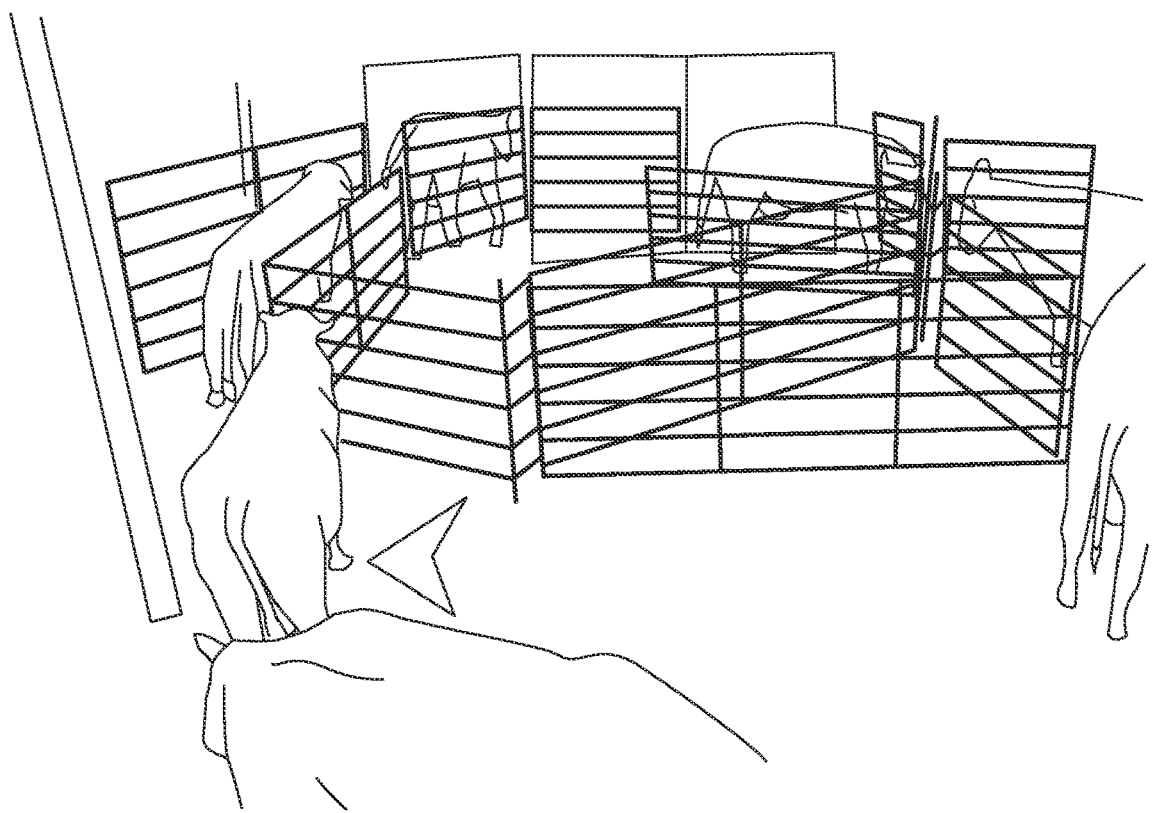

(51) Int. Cl.
  *A01J 9/00* (2006.01)
  *A01K 1/00* (2006.01)
  *A01J 5/003* (2006.01)
  *A01J 5/01* (2006.01)
  *A01J 5/013* (2006.01)
  *A01J 7/02* (2006.01)

(52) U.S. Cl.
  CPC ........... *A01J 5/0131* (2013.01); *A01J 5/0175* (2013.01); *A01J 7/025* (2013.01); *A01J 9/00* (2013.01); *A01K 1/00* (2013.01); *A01K 1/0017* (2013.01); *A01K 1/126* (2013.01)

(58) Field of Classification Search
  USPC .................................. 119/14.03, 14.08, 14.1
  See application file for complete search history.

(56) References Cited

U.S. PATENT DOCUMENTS

| | | | |
|---|---|---|---|
| 5,456,433 A | 10/1995 | Burns et al. | |
| 5,596,945 A * | 1/1997 | van der Lely | A01J 5/0175 |
| | | | 119/14.03 |
| 5,816,190 A | 10/1998 | Van Der Lely | |
| 6,041,736 A | 3/2000 | Van Den Berg et al. | |
| 6,382,130 B1 * | 5/2002 | Rooney | A01J 5/00 |
| | | | 119/14.01 |
| 7,231,886 B2 * | 6/2007 | Van Den Berg | A01J 7/04 |
| | | | 119/14.11 |
| 10,638,718 B2 * | 5/2020 | Pinsky | A01J 5/007 |
| 2003/0154925 A1 | 8/2003 | Van Den Berg et al. | |
| 2005/0120965 A1 * | 6/2005 | Van Den Berg | A01K 5/02 |
| | | | 119/14.02 |
| 2009/0308327 A1 * | 12/2009 | Van Den Berg | A01K 1/01 |
| | | | 119/518 |
| 2010/0170163 A1 | 7/2010 | Tarbell et al. | |
| 2010/0288897 A1 | 11/2010 | Chang | |
| 2011/0108695 A1 | 5/2011 | Wang | |
| 2011/0114024 A1 * | 5/2011 | Van Den Berg | A01J 5/044 |
| | | | 119/14.02 |
| 2012/0001041 A1 | 1/2012 | Yang et al. | |
| 2012/0144760 A1 | 6/2012 | Schaefer et al. | |
| 2015/0020738 A1 * | 1/2015 | Krone | A01J 5/0175 |
| | | | 119/14.04 |
| 2016/0010679 A1 | 1/2016 | Makino et al. | |
| 2018/0235176 A1 * | 8/2018 | Van Den Berg | A01J 5/017 |

FOREIGN PATENT DOCUMENTS

| | | | |
|---|---|---|---|
| DE | 102011117629 | 5/2013 | |
| EP | 0635203 A2 * | 1/1995 | ........... A01J 5/0175 |
| EP | 1576876 | 9/2005 | |
| WO | 02/31910 | 4/2002 | |
| WO | 2009057996 | 5/2009 | |

* cited by examiner

TYPE IV

TYPE IV

TYPE IV

TYPE IV

TYPE IV

TYPE IV

MEANS AND METHODS FOR FREE DOME RANGE

CROSS-REFERENCE TO RELATED APPLICATIONS

This application is a § 371 national stage entry of International Application No. PCT/IL2017/050753, filed Jul. 5, 2017, which claims priority to Israeli Patent Application No. 246617, filed Jul. 5, 2016, the entire contents of which are incorporated herein by reference.

FIELD OF THE INVENTION

The present invention generally pertains to milking farm animals free dome range. The present invention further pertains to means for cow's loose housing and tie-stall systems, subsystems and modules thereof. The present invention further relates to methods of managing dairy animals, especially milking cows.

BACKGROUND OF THE INVENTION

There are two major cattle-housing methods, the tie-stall barn (or stanchion barn) and the loose-housing system. In the tie-stall barn each animal is tied up in a stall for resting, feeding, milking, and watering, A typical plan has two rows of stalls. In older buildings hay and straw are stored in an overhead loft, but in modern layouts adjacent buildings are generally used. Loose-housing system is a system of dairy cattle management in which animals are kept at liberty in a loafing barn usually with access to an open yard and may be taken (or alternatively have to go) to separate areas or buildings for milking and/or feeding.

Tie-stall housing of dairy cows is still used extensively worldwide, despite of the welfare concerns regarding the restriction of voluntary movement and limitation, of expression of the cows' natural behavior. Popescu et al. discloses that in. Europe, between 20% (lowland) and 80% (upland) of cows are tethered at least during the winter. Hence, the welfare quality of the investigated dairy cows was significantly better in the tie-stall farms which allow exercise for cows (paddocks, pasture or both) than in those which do not; see Popescu, Silvana, et al. "Dairy cows' welfare quality in tie-stall housing system with or without access to exercise." *Acta Veterinaria Scandinavica* 55.1 (2013): 43 which is incorporated herein as a reference.

Arney et al. states that increases in the size (weight) of animals in recent years, through intensive breeding for higher milk production, have resulted in housing and furniture becoming more and more poorly suited to the cattle housed. This includes: length and breadth of cubicle space, leading to dunging in the cubicle instead of the passageway and an inability to lie down or stand comfortably, partition design impeding comfortable lying, inadequate space in passageways, and restricted access to feed and water. Each of these can affect not only the welfare of the animals, 2 but their feed intakes, levels of production, health and fertility. The opportunity to lie comfortably in a clean area should not be neglected; cows show a strong motivation to lie down: dairy cattle lie down for ~7-10 h during the day and night period; individual lying periods are on average 1.5 h long. If a comfortable and easily accessible lying area is not available, cows may spend more time lying or standing in dirty passageways, which is likely to lead to health problems— udder infection and leg injury in particular. Lameness is becoming an increasingly important factor affecting the health and welfare of the dairy cow. Usually the flooring is of concrete, which with time, and especially when covered with slurry, becomes slippery. Cows have to alter their gait on lower friction flooring and this can lead to injury and a disinclination to walk, making them less inclined to visit the feed area despite motivation to do so, possibly reducing feed intake and production; See David Arney and Andres Aland "Contemporary Issues in Farm Animal Housing and Management Cattle Housing and Welfare" p. 324-329 in Jakobsson, Christine. *Sustainable Agriculture*. No. 1 Baltic University Press, 2014.

Regarding cows crowding: Crowding, blocking and waiting of cows is a common phenomenon in various first-generation milking robots. As shown, a cow (white arrow) is blocking the exit to the milking robot and two other cows are stuck in the exit alley; see prior art photo in FIG. 1, which is adopted from Janice Siegford and Jacquelyn Jacobs "Effect of Exit Alley Blocking Incidences on the Accessibility of the Automatic Milking System". January 2011 Michigan Dairy Review pp. 18-20;, further incorporated herein as a reference.

Some thirty six years ago, it was recognized that the best and most natural life-routine for dairy cows would be to milk them automatically, per quarter of the udder, as many times as individually needed, during some of their voluntary visits to the feeding table. This was in fact set as the initial goal for automatic milking, but was never fully achieved. Due to technical and economic constraints that made it necessary to implement various compromising concepts. Cows today therefore still spend a lot of time waiting in stressful queues and are not always milked when needed, resulting in sub-optimal health, welfare, longevity, milk quality and farm profits; see prior art photo in FIG. 2, which shows crowded waiting for milking parlor. It is noted that milking in free housing is predominantly done in milking parlors and in (first generation) milking robots.

Very small farms or low tech farms may still have a milker coming up to the animal to milk it, either with a mobile milking machine or completely manually.

Kerstin Svennersten-Sjaunja et al., by De Laval, in "Efficient Milking" (2001), which is incorporated herein as a reference, state, inter alia, that there is a large variation in milking intervals between milk producing countries. In most countries, a 8-16 hours milking interval is common practice due to the labor situation. On larger farms a 12-12 hours milking interval is often practiced. Twelve hour's interval is the most optimal milking interval with twice daily milking. Milk production (kg milk) increases with equal intervals compared to unequal milking intervals. What is the mechanism behind this phenomenon? Milk secretion starts to decline 10 hours after the previous milking, while udder pressure is increasing. At 35 hours after previous milking the milk secreting process has stopped. Likewise, obviously udder pressure alone is not the only factor regulating milk secretion rate, but also the discussed inhibitor mechanisms. Consequently, to optimize milk production. The length of milking intervals has to be taken into consideration. The rise in intra-mammary pressure and the fall in milk secretion rate with lengthening milking intervals. However, in some countries where labor was rather inexpensive, more frequent milking was practiced. During the last decade focus has been put on milking more frequently again, in particular in high yielding herds. The benefits of more frequent milking are many. Changing from milking twice a day to three times a day increases milk production markedly. Published data show increases ranging from 5 to 25% more milk per day. In addition, lactation becomes more persistent and prolonged. The reason why milk production increases with a more frequent milking could be a more frequent exposure of hormones stimulating milk secretion to the mammary gland. However, as mentioned above, the milk contains an inhibitor with negative feedback control on milk secretion. A more frequent removal of this inhibitor therefore results in a higher production. An interesting finding in this respect is that cows with a small udder cistern are more sensitive to the frequency of milking. The smaller the cistern, the greater the effect of frequent milk removal on milk production, while the larger the cistern, the less the response to frequent milking. frequent milking has both long term and short term effects. The short term effect is an increased milk production due to enhanced activity in the milk secreting cells, while the long term effect is increased production due to increased number of milk secreting cells. The latter indicates that it is possible to influence the number of milk secreting cells during an established lactation, which is of importance to the milk producing capacity; see also in Erdman, Richard A., and Mark Varner. "Fixed yield responses to increased milking frequency." *Journal of dairy science* 78.5 (1995): 1199-1203; Hogeveen, H., et al. "Milking interval, milk production and milk flow-rate in an automatic milking system." *Livestock production science* 72.1 (2001): 157-167; and Jacobs, J. A., and J. M. Siegford. "Invited review: The impact of automatic milking systems on dairy cow management, behavior, health, and welfare." *Journal of dairy science* 95.5 (2012): 2227-2247, all incorporated herein as a reference.

Regarding "milking group"; as underlines in U.S. Pat. No. 8,925,482 by Lely Patent N.V., a group of dairy animals, for example a group of cows, can generally comprise different subgroups of dairy animals which give different types of milk.

These different types of milk may, for example, comprise milk for consumption, beestings, milk from cows suffering from mastitis, or milk from cows treated with antibiotics. It is not desirable to collect these different types in one and the same milk reservoir. Mixing milk for consumption with other types of milk may result in the milk for consumption no longer being suitable for consumption. Milk which is not to be mixed with milk for consumption will be referred to below as separation milk. After milking a cow giving separation milk, it is desirable and often compulsory to flush the milking system before milking a cow giving milk for consumption. Flushing the milking system takes a relatively long time. In addition, the flushing of the milking system requires large amounts of flushing liquid, for example clean water. With groups of dairy animals comprising relatively many dairy animals which give separation milk, the milking system must therefore have to be cleaned relatively often. During flushing, the milking system cannot be used, as a result of which the milking system is used less efficiently. An example of a group of dairy animals which comprises a relatively large number of dairy animals giving separation milk is a group of dairy animals whose milking cycles are synchronous to a high degree. In such a group, relatively many dairy animals can simultaneously give beestings which are unsuitable for consumption and which should not be mixed with the milk for consumption. Another example is a group of dairy animals with relatively a large number of sick cows which are treated with antibiotics. The tedious management issue of milking a specific cow with its ever changing needs and milking capabilities whereat the cow is one member of a milking group is still problematic unmet need, especially in large-scale dairy-farming.

U.S. Pat. No. 4,508,058 "Milking method and an apparatus therefor" by Alfa-Laval AB, which is incorporated herein as a reference, discloses a method of milking loose-housing cows which find their way individually to one or more feeding stalls where they are automatically identified and fed with the aid of a computer connected to the identification and feeding means. A computer is used for recording of the points of time each cow is milked and to activate a device, in connection with the identification of a cow arriving at the feeding stall to eat, and provided that a predetermined time has passed after the preceding milking operation, which device is activated for automatic application of the milking means to the cow's udder and for starting a milking operation.

EP0635203 "A construction for automatically milking animals" and EP1336337 "An assembly for feeding and milking animals, and a method of feeding and milking animals" by Texas Industries Inc. (Lely) discloses a construction for automatically milking cows, provided with a milking robot. The construction comprises a shed (1) or any other space where the animals are allowed to move freely. The shed (1) or other space is designed such that the milking robot (14) moves to an animal to be milked and performs the milking on the spot.

U.S. Pat. Nos. 7,640,889 and 7,836,848 by Lely, entitled "Assembly for feeding and milking animals, and a method of feeding and milking animals" discloses an assembly for feeding and milking animals and methods thereof, respectively. The assembly being provided with an area where the animals are allowed to move freely; a number of juxtaposed feeding stations for the animals; a retaining device fixedly disposed at a feeding station for retaining an animal at that feeding station, which retaining device can be activated for retaining that animal and can be deactivated for releasing that animal; a self-propelled mobile milking robot comprising a milking device for milking an animal including at least one teat cup for connection to a teat of an animal; and a computer system for controlling the operation and movement of the milking robot. Here, the claimed novelty and inventive step is that the assembly is capable of determining the feeding station where an animal to be milked is present, and activating the relevant retaining device for retaining the animal at the determined feeding station and the retaining device of at least one adjacent feeding station that is adjacent to the determined feeding station. A key and basic feature of the disclosed feeding and milking assembly is thus the further limitation of the retaining device of at least one adjacent feeding station that is adjacent to the determined feeding station The cows are to be maneuvered or otherwise manipulated.

A cow's loose housing (free dome range—FDR) that will better support cow's health and welfare, enable optimal production of higher quality milk, especially in milking group as defined above, improve operational margins, make farm work easier and more satisfying and reduce land use is hence still a long felt need.

SUMMARY OF THE INVENTION

Various objects of the invention are hereby presented in a non-limiting manner: One object of the invention is to disclose a free dome range or freedom range (FDR) for milking cows where cows are milked when freely fed in a synchronized manner. The milking units are approaching the dairy animal at time of its food intake, just the opposite of other large scale milking systems, where animal are directed to move towards the milking unit at predefined time periods.

Another object of the invention is to disclose an FDR for milking cows, where according to one embodiment of the invention, FDR comprises modules selected from a group consisting of main living area (MLA) having at least one exit gate form where dairy animals may freely access stalls area, and at least one entrance gate where animals may either freely r controllably access from stalls area to either the main leaving area or alternatively, to a treating area. The MLA is interconnected to at least one eating area for example by means of one or more unidirectional gates. Eating area composed of a plurality of stalls, separated from one another e.g. by rails and optionally closable from behind, movable feeding unit (MFU). One or more mobile milking units (MMUs) are provided on elevated rails system for milking predefined cows when the cow is fed. Mobile preparation and cup placement units (MPCPUs) which are either mobile autonomous units, temporarily or permanently attached to the MMUs and further provided. One or more milk emptying and MMU recycling units (MEMRs) are utilizable; as well as one or more milk containers and milk piping. Treatment area is a chute where further treatment is provided. A complete farm may contain one or more identical or different FDR's optionally interconnected and sharing resources for example MMUs or MEMRs.

Another object of the invention is to disclose a method for managing dairy animals, especially cows, comprising steps of providing FDR as defined and described in the present invention; continuously and uninterruptedly directing fed cows in a non-manipulated manner, without-queues and blockages, from MLA, to eating area where they are comfortably milked if and when needed while they are eating, optionally then, via treatment area, back to MLA, and so on and so forth.

Another object of the present invention is to disclose an FDR where dairy animals have a free access to their stall to concurrently eat and to be milked, comprising a plurality of s stalls, s is an integer equal to or greater than one; at least one of the stalls is characterized by a front side and rear opposite side into which a dairy animal is at least temporarily accommodated, head fronting the front side; and a plurality of m MLA, m is an integer equal to or greater than one;at least one of the MLAs is in connection with at least one of the stalls by means a plurality of g gates, g is an integer equal to or greater than one. The FDR further comprising a substantially horizontally positioned elevated rail system comprising a plurality of e elevated rails, e is an integer number equal to or greater than one; and a plurality of n mobile milking units (MMUs), n is an integer equal to or greater than one, each of the MMUs is configured to transport on the elevated rail to a dairy animal at its stall, and milk the animal while it is eating.

Another object of the present invention is to disclose the FDR as defined in any of eth above, wherein the dairy animals are selected from a group consisting of cows, sheep, buffaloes, and goats.

Another object of the present invention is to disclose dairy farm, at least one portion of the farm comprises a substantially horizontally positioned elevated rail system comprising a plurality of elevated rails on which milking units are transported.

Another object of the present invention is to disclose dairy farm, at least one portion of the farm comprises at least one stall, a transformation infrastructure approaching the rear portion of the stall, on which milking units are movable.

Another object of the present invention is to disclose dairy farm, at least one portion of the farm comprises at least one unidirectional entrance gate separating stall area from a main living, at least one unidirectional exit gate separating the stall area from treatment area, and at least one unidirectional entrance gate separating the treatment are from the main living a main living area.

Another object of the present invention is to disclose the FDR as defined in any of eth above, wherein at least one of the elevated rails is selected from a group consisting of at least partially linear rail, at least partially curved rail, at least partially tilted rails, at least partially vertical rail and any combination thereof.

Another object of the present invention is to disclose the FDR as defined in any of eth above, wherein at least a portion of the plurality of elevated rails is interconnected in at least one junction.

Another object of the present invention is to disclose the FDR as defined in any of eth above, wherein the at least a portion of plurality of interconnected elevated rails is arranged one or more streets-and-avenues configurations.

Another object of the present invention is to disclose an array of FDRs comprising at least one first FDR as defied in any of the above, and at least one second FDR; wherein the first and the second FDRs are interconnected by means of at least one mutual elevated rail system thereby MMUs of the one FDR is transportable to the second FDR and vice versa.

Another object of the present invention is to disclose the array of FDRs as defined in any of the above, wherein the array comprises a plurality of f FDRs, f is an integer equal to or greater than two; the FDRs arranged in at least one shape selected from a group consisting of triangular, quadrilateral, polygonal, circular, star-like shapes and any combination thereof.

Another object of the present invention is to disclose the FDR as defined in any of the above, wherein the stall is characterized by a substantial rectangular shape, comprising a rear side, the rear side is directed to opposite of a front a side; and wherein the dairy animal is directed through the rear side, with its head facing the frontal side.

Another object of the present invention is to disclose the FDR as defined in any of the above, wherein the aforethe MMU comprises at least one member of a group consisting of taxi, messenger, extender; the taxi configured to horizontally drive the MMU along the ER; the messenger is configured to both (i) downloading the MMU substantially vertically from the elevated rail to a lower docking station provided within or in connection with the stall and (ii) uploading substantially vertically the MMU to the taxi unit; and the extender configured to reversibly approaching the milking assembly towards dairy animal's teats.

Another object of the present invention is to disclose an MMU as defined in any of the above, wherein the MMU comprises at least one member of a group consisting of taxi, messenger, extender; the taxi configured to horizontally drive the MMU along the ER; the messenger is configured to both (i) downloading the MMU substantially vertically from the elevated rail to a lower docking station provided within or in connection with the stall and (ii) uploading substantially vertically the MMU to the taxi unit; and the extender configured to reversibly approaching the milking assembly towards dairy animal's teats.

Another object of the present invention is to disclose the FDR as defined in any of the above, wherein it comprises a docking station located at the stall's rear portion, the docking station is configured to reversibly interconnect either a messenger and/or an extremer mechanisms of the MMU.

Another object of the present invention is to disclose the MMU as defined in any of the above, wherein the MMU is at least temporarily interconnecting, either wirelessly of cordially, a computer assisted milking protocol and MMU's movement control (CAP&C) for controlling the transport of the MMU.

Another object of the present invention is to disclose the MMU as defined in any of the above, wherein it is interconnected to or intercommunicated with a teat-cup assembly (TCA), the TCA comprises a plurality of teat-cups, each of which of the teat cups is configured, by means of size and shape, to reversibly accommodate a teat and facilitate the vacuum-assisted milking of the teat.

Another object of the present invention is to disclose the MMU as defined in any of the above, wherein the proximal portions of the teat cups is affixed substantially both: (a) MMU's teat time-resolved spatial orientation and location and (b) teat time-resolved spatial orientation and location.

Another object of the present invention is to disclose the MMU as defined in any of the above, wherein the TCA comprises a motor gear box-containing teat-cups ejection-straighten mechanism (TCESM), configured for enabling the approach the teat cups to the teats before milking and the retraction of the same after milking.

Another object of the present invention is to disclose a TCA, wherein for milking operation; comprising: at least one milking cup movable horizontally in a reciprocate manner, the at least one milking cup further comprising a concave conic member (363) configured for receiving a teat of an animal, a dual milk-vacuum pipe (364) and a connector (362) interconnecting the concave conic member and dual milk-vacuum pipe there between; and an ejection mechanism (365) for approaching the at least one milking cup to the teat of the animal; the ejection mechanism comprising a rack-and-pinion mechanism(366) and a motor driving a pinion of the rack-and-pinion mechanism (361) the at least one milking cup is mechanically connected to a rack of the rack-and-pinion mechanism.

Another object of the present invention is to disclose the MMU as defined in any of the above, wherein the TCA is interconnected with a manipulating milking arm (AM), the milking arm is configured to actuate the TCA from animal's rear portion, via its rear legs and below its body, to a location adjacent and below animal's teats; and vice versa.

Another object of the present invention is to disclose the MMU as defined in any of the above, wherein it comprises or interconnected with intercommunicate to a plurality of cm cameras; cm is an integer number being greater than or equal one, the cameras are selected for a group consisting of (i) at least one camera interconnected with a teat-cup assembly or teat-cups base thereof, configuring to focus on either of both the teat cups and teats thereby determining the 2D or spatial 3D orientation of teat-cups at the vicinity of the adjacent teats; (ii) at least one camera configured to focus the rear legs of the dairy animals thereby either or both determining the spatial 2D or 3D orientation of the legs and scoring animal health condition.

Another object of the present invention is to disclose the MMU as defined in any of the above, wherein at least one camera is selected from a group consisting a digital or video images capturing module, image acquiring sensor, thermal acquiring sensor, CCD, CMOS, wide-angle optic sensor, zoom enabling optic sensors, thermal sensor, optic sensor, including a monochromatic sensor or a combination of two or more monochromatic sensors, magnetic detector, florescence detector, laser detector, thermal & optic integrated sensor, time-of flight (TOF), TOF sensor, structured-light camera, structured-light sensor and any combination thereof Another object of the present invention is to disclose the MMU as defined in any of the above, wherein at least one of the cameras is configured for cordially or wirelessly communicating with a computer readable medium, configured to process images thereby manipulate the milking arm actuation the from animal's rear portion, via its rear legs and below its body, to a location adjacent and below animal's teats; and vice versa.

Another object of the present invention is to disclose the MMU as defined in any of the above, wherein it is further comprising a computer readable magnetic medium configured for calculating, by means of the image, animals rear legs 2D or 3D time resolved orientation, defining the middle in legs' height (substantially along Z-main axis) and legs distance (substantially along Y-main axis).

Another object of the present invention is to disclose the FDR as defined in any of the above, wherein it further comprises a computer readable magnetic medium configured for defining and alarming, by means of the image, estrus condition in animals.

Another object of the present invention is to disclose the FDR as defined in any of the above, wherein it comprises plurality of cm cameras; cm is an integer number being greater than or equal one, the cameras are selected for a group consisting of (i) at least one camera interconnected with a teat-cup assembly or teat-cups base thereof, configuring to focus on either of both the teat cups and teats thereby determining the 2D or spatial 3D orientation of teat-cups at the vicinity of the adjacent teats; (ii) at least one camera configured to focus the rear legs of the dairy animals thereby either or both determining the spatial 2D or 3D orientation of the legs and scoring animal health condition.

Another object of the present invention is to disclose the FDR as defined in any of the above, wherein it comprises at least one camera is selected from a group consisting a digital or video images capturing module, image acquiring sensor, thermal acquiring sensor, CCD, CMOS, wide-angle optic sensor, zoom enabling optic sensors, thermal sensor, optic sensor, including a monochromatic sensor or a combination of two or more monochromatic sensors, magnetic detector, florescence detector, laser detector, thermal & optic integrated sensor, time-of flight (TOF), TOF sensor, structured-light camera, structured-light sensor and any combination thereof.

Another object of the present invention is to disclose the FDR as defined in any of the above, wherein at least one of the cameras is configured for cordially or wirelessly communicating with a computer readable medium, configured to process images thereby manipulate the milking arm actuation the from animal's rear portion, via its rear legs and below its body, to a location adjacent and below animal's teats; and vice versa.

Another object of the present invention is to disclose the FDR as defined in any of the above, wherein it further comprising a computer readable magnetic medium configured for calculating, by means of the image, animals rear legs 2D or 3D time resolved orientation, defining the middle in legs' height (substantially along Z-main axis) and legs distance (substantially along Y-main axis).

Another object of the present invention is to disclose the FDR as defined in any of the above, wherein it further comprising a computer readable magnetic medium configured for defining and alarming, by means of the image, estrus condition in animals.

Another object of the present invention is to disclose the FDR as defined in any of the above, wherein it is utilizing and/or comprising a computer-implemented system for algorithm portfolios in hierarchical machine learning, comprising a group of layers of nonlinear processing units consisting of a data input of rear legs either or both 2D and 3D orientations; a data input of either or both 2D and 3D orientations of each of the teats; a data output of image processing capabilities configuring the milking arm movement via cow's rear legs; the system is operable by locating milking cups below teats before milking, and then retrieving teats cups and arm's retrieval after milking is concluded. The hierarchical learning may comprises "rear-legs & teats image processing capabilities" of the deep structured learning milking, providing means to monitoring dairy animals' health condition.

Another object of the present invention is to disclose a method for determining estrus in dairy animal. The method comprises steps of providing p detectors, p is an integer greater than or equal 1, the p detectors selected from a group consisting of single-axis accelerometers, multiple axis accelerometers, cameras and any combination thereof; for each time period ($\Delta t_i$) the dairy animal is within an FDR-Stall, by means of at least one of the p detectors, continuously or intermittently determining head acceleration of the animal ($a_{x,y,z}(t)$) thereby defining, for each the time period ($\Delta t_i$), an animal eating event energy value ($B_{eating}(\Delta t_i)$); generating, for the animal, for each first predetermined period of time n, a total eating energy value $E_{eating,total}(n)$ by summing all the eating event energy values occurring during each the first predetermined period of time n, $E_{eating,total}(n)=\Sigma_{i=i_{begin}}^{i_{end}} E_{eating}(\Delta t_i)$; averaging, for a second predetermined period of time comprising N of the first predetermined period of times, N being in integer greater than 1, all the total eating energy values $E_{eating,total}(n)$, thereby generating a baseline eating energy $E_{eating}$; and determining, for at least one the second predetermined period of time, a maximum daily eating energy value $E_{eating,max}=\max(E_{eating,total}(n))$; and generating an estrus alarm when the eating energy event value $E_{eating,total}(n)$ is greater than $(E_{eating,max}+E_{eating})/2$.

Another object of the present invention is to disclose a method for determining estrus in dairy animal. This method comprising steps of providing p detectors, p is an integer greater than or equal 1, the p detectors selected from a group consisting of single-axis accelerometers, multiple axis accelerometers, cameras and any combination thereof; determining, by means of at least one of the p detectors, each time period ($\Delta t_i$) the dairy animal is not within an FDR-Stall; for each time period ($\Delta t_i$) the dairy animal is not within an FDR-Stall, by means of at least one of the p detectors, continuously or intermittently determining head acceleration of the animal ($a_{x,y,z}(t)$) thereby defining, for each the time period ($\Delta t_i$), an animal head movement energy value ($E_{move}(\Delta t_i)$); generating, for the animal, for each first predetermined period of time n, a total head movement energy value $E_{move,total}(n)$ by summing all the head movement energy values occurring during each the first predetermined period of time n, $E_{move,total}(n)=\Sigma_{ibegin}^{iend} E_{move,total}(\Delta t_i)$; averaging, for a second predetermined period of time comprising N of the first predetermined period of time, N being in integer greater than 1, all the total head movement energy values $E_{move,total}(n)$, thereby generating a baseline head movement energy $F_{move}$; determining, for at least one the second move; predetermined period of time, a maximum daily head movement energy value $E_{move,max}=\max(E_{move,total}(n))$, and generating an estrus alarm when the head movement energy value $E_{move,total}(n)$ is greater than $(E_{move,max}+E_{move})/2$.

Another object of the present invention is to disclose a method for determining estrus in dairy animal. The animal comprising steps of providing p detectors, p is an integer greater than or equal 1, the p detectors selected from a group consisting of single-axis accelerometers, multiple axis accelerometers, cameras and any combination thereof; determining, by means of at least one of thep detectors, each time period ($\Delta t_{in}$) the dairy animal is not within an FDR's stall; for each first predetermined period of time n, by means of at least one of the p detectors, continuously or intermittently determining head acceleration of the animal ($a_{x,y,z}(t)$) thereby defining, for each the first predetermined period of time n, a total animal head movement energy value $E_{move,total}(n)$; for each time period ($\Delta t_{in}$) the dairy animal is within an FDR-Stall, by means of at least one of the p detectors, continuously or intermittently determining head acceleration of the animal ($a_{x,y,x}(t)$) thereby defining, for each the time period ($\Delta t_{in}$), an animal eating event energy value ($E_{ear}(\Delta t_{in})$); generating, for the animal, for each first predetermined period of time n, a total eating event energy value $E_{eat,total}(n)$ by summing all the eating event energy values occurring during each the first predetermined period of time n, $E_{eat,total}(n)=\Sigma_{ibegin}^{iend} E_{eat,total}(\Delta t_i)$; for each first predetermined period of time n, determining a total non-eating head movement energy $E_{nonear}(n)$ as the difference between the total animal head movement energy value $E_{move,total}(n)$ and the total eating event energy value $E_{eat,total}(\Delta t_{in})$, $E_{nonear}(n)=E_{move,total}(n)-E_{eat,total}(n)$; averaging, for a second predetermined period of time comprising N of the first predetermined period of time, N being in integer greater than 1, all the total non-eating movement energy values $E_{move,total}(n)$, thereby generating a baseline head movement energy $E_{move}$; determining, for at least one the second predetermined period of time, a maximum daily head movement energy value $E_{move,max}=\max(E_{nonear}(n))$; and generating an estrus alarm when the head movement energy value $E_{nonear}(n)$ is greater than $(E_{move,max}+E_{move})/2$.

Another object of the present invention is to disclose one or more of the methods above wherein first predetermined period of time is about one day and the second predetermined period of time is about one month.

Another object of the present invention is to disclose a method of providing dairy animals in a free dome range (FDR) thereby providing them with free access to their stall for concurrently eating and being milking. This method comprising steps of providing a plurality of s stalls, s is an integer equal to or greater than one; further providing at least one of the stalls with a front side and rear opposite side into which a dairy animal is at least temporarily accommodated, head fronting the front side; and providing a plurality of m main living areas (MLA), m is an integer equal to or greater than one; connecting at least one of the MLAs with at least one of the stalls by means a plurality of g gates, g is an integer equal to or greater than one. The method further comprising steps of positioning an elevated rail system substantially horizontally and providing the same with a plurality of e elevated rails, e is an integer number equal to or greater than one; and providing a plurality of n mobile milking units (MMUs), n is an integer equal to or greater than one, and configuring each of the MMUs to transport on the elevated rail to a dairy animal at its stall, and milk the animal while it is eating.

Another object of the present invention is to disclose a method of transporting a mobile milking unit to dairy animal's stall. The method comprising steps of affixing a plurality of e rails to be substantially horizontal elevated configuration above of burn's floor, e is an integer number being equal to or greater than one in a manner that at least one portion of the rail is located adjacent and above the rear portion of stall, where animal rear portion is located; and interconnecting an MMU to the rail so that the MMU is movable along the elevated rail to the stall's rear portion and vice versa.

Another object of the present invention is to disclose the method above wherein the step of interconnecting an MMU to the rail comprises step of interconnecting a taxi portion of an MMU to an elevated rail.

Another object of the present invention is to disclose a method for forming an array of FDRs comprising steps of adjoining at least first FDR to at least one second FDR; and interconnecting the at least two FDRs by at least one mutual elevated rail thereby allowing MMUs transporting from at least one FDR to at least one second FDR.

Another object of the present invention is to disclose a method for introducing an MMU to dairy animals' teats. The method comprising steps of, by means of a taxi mechanism, transporting an MMU substantially horizontally along an elevated rail; by means of an messenger mechanism, vertically lowering the MMU from the elevated rail to a lower docking station provided within or in connection with the rear portion of a stall; and then by means of an extender mechanism, substantially horizontally forwarding a teats cup assembly (TCA) from the docking station between animal's rear legs, below its rear body portion, to a location provided adjacent and below animal's teats.

Another object of the present invention is to disclose a method for controlling and prioritizing the transport of an MMU to a dairy animal in its stall, comprising a step of communicating the MMU, at least temporarily, either wirelessly of cordially, to a computer readable magnetic media configured with milking-assisting protocol and MMU's movement controlling protocol (CAP&C).

Another object of the present invention is to disclose a method for approaching teat cups to teats before milking and the retraction the same after milking, the method comprising a step of providing a TCA with a motor gear box-containing teat-cups ejection-straighten mechanism (TCESM), configured for enabling teat cups (i) to approach the teats before milking and then (ii) to retract after milking.

Another object of the present invention is to disclose a method of determining the spatial 3D orientation of teat-cups to a teat to be milked, wherein the method comprising steps of connecting a TCA to an MMU; providing a TCA with a plurality of cm cameras; cm is an integer number being greater than or equal one; and focusing at least one of the cameras towards the teat and the cups.

Another object of the present invention is to disclose a method for actuating the milking arm comprising steps of acquiring at least one either 2D or 3D image of one or two animals rear legs by means of at least one optic or thermal sensor; either cordially or wirelessly, communicating the image with a computer readable medium (CRM), and processing the image thereby providing the leg or legs time-resolved orientation; by means of the CRM, defining the middle in legs' height (Z-main axis) and legs distance (Y-main axis); by means of the CRM processed image data, manipulating milking arm to actuate between animal's rear legs, from animal's rear portion, below its body, to a location adjacent and below animal's teats; and vice versa retrieving the arm backwardly.

Another object of the present invention is to disclose a method for scoring animals' health condition comprising step of providing, in FDR's rear portion of a stall, a thermic or and/or optic sensor; acquiring an image of animal's rear portion; by means of a deep learning algorithm, processing the image and comparing it to a reference data, thereby scoring the animals' health condition.

It is still another object of the present invention is to disclose a method for allowing dairy animal to feed freely and for milking the animal while the feed, comprising steps of providing a dairy farm with at least one stall, proving a transformation infrastructure approaching the rear portion of the stall, and moving mobile milking units along the transformation infrastructure.

Yet Another object of the present invention is to disclose a method for allowing dairy animal to feed freely and for milking the animal while the feed, comprising steps of, by means of at least one unidirectional entrance gate, separating stall area from a main living; by means of at least one unidirectional exit gate, separating the stall area from treatment area, and by means of at least one unidirectional entrance gate, separating the treatment are from the main living a main living area.

Another object of the present invention is to disclose the FDR as defined in any of the above, wherein at least a portion of the plurality of elevated rails is interconnected in at least one junction.

Another object of the present invention is to disclose the FDR as defined in any of the above, wherein the at least a portion of plurality of interconnected elevated rails is arranged one or more streets-and-avenues configurations.

The term 'about' refers hereinafter to any number being equal, greater or lower than 25% of the defined measure. Another object of the present invention is to disclose the FDR as defined in any of the above, wherein at least one stall is characterized by a rectangular shape with length of about 247 cm and width of about 90 cm.

Another object of the present invention is to disclose the FDR as defined in any of the above, wherein at least one stall is characterized by a substantial rectangular shape; the ratio of length and width dimensions is about 1:2.7.

Another object of the present invention is to disclose the FDR as defined in any of the above, wherein the stall is characterized by a substantial rectangular shape, comprising a rear side, the rear side is directed to opposite of a front a side; and wherein the dairy animal is directed through the rear side, with its head facing the frontal side.

Another object of the present invention is to disclose the FDR as defined in any of the above, wherein the entrance side of claim 9 is characterized by a width of about 76.5 cm.

Another object of the present invention is to disclose the FDR as defined in any of the above, wherein the stall has a substantially horizontal floor and wherein at least one of the following is held true: the stall comprises a main drain characterized by length of about 100 cm and a width of about 18 cm, respectively; the stall comprises a stall drain provided substantially perpendicular the main drain; characterized by width of about 35 cm, depth of about 12 cm length ranging from about 90 cm to about 120 cm; the stall comprises one or more side entrances, at least one side entrance affixed substantially perpendicular to the entrance side and having a width of about 70; the stall comprises one or more high pressure water sprinklers, at least one of the sprinklers configured for washing wither the stall's floor or the stall's drain; 1 stall comprises a main drain tilted about 1.5 degrees towards the floor; and the stall comprises about 18 cm step.

Another object of the present invention is to disclose a stall having a substantially horizontal floor wherein at least one of the following is held true: the stall comprises a main drain characterized by length of about 100 cm and a width of about 18 cm, respectively; the stall comprises a stall drain provided substantially perpendicular the main drain; characterized by width of about 35 cm, depth of about 12 cm length ranging from about 90 cm to about 120 cm; the stall comprises one or more side entrances, at least one side entrance affixed substantially perpendicular to the entrance side and having a width of about 70; the stall comprises one or more high pressure water sprinklers, at least one of the sprinklers configured for washing wither the stall's floor or the stall's drain; the stall comprises a main drain tilted about 1.5 degrees towards the floor; and the stall comprises about 18 cm step.

Another object of the present invention is to disclose a first method for determining estrus in dairy animal. The method comprising steps of providing p detectors, p is an integer greater than or equal 1, the p detectors selected from a group consisting of single-axis accelerometers, multiple axis accelerometers, cameras and any combination thereof; for each time period ($\Delta t_i$) the dairy animal is within an FDR-Stall, by means of at least one of the p detectors, continuously or intermittently determining head acceleration of the animal ($a_{x,y,z}(t)$) thereby defining, for each the time period ($\Delta t_i$), an animal eating event energy value ($B_{eating}$ ($\Delta t_i$)); generating, for the animal, for each first predetermined period of time n, a total eating energy value $E_{eating,total}(n)$ by summing all the eating event energy values occurring during each the first predetermined period of time n, $E_{eating,total}(n) = \Sigma_{i=i_{begin}}^{i_{end}} E_{eating}(\Delta t_i)$; averaging, for a second predetermined period of time comprising N of the first predetermined period of times, N being in integer greater than 1, all the total eating energy values $E_{eating,total}(n)$, by dividing the total eating energy value $E_{eating,total}(n)$ by the N first predetermined period of times, thereby generating a baseline eating energy $E_{eating}$; determining, for at least one the second predetermined period of time, a maximum daily eating energy value $E_{eating,max} = \max(E_{eating,total}(n))$; and generating an estrus alarm when the eating energy event value $E_{eating,total}(n)$ is greater than $(E_{eating,max} + E_{eating})/2$. The first predetermined period of time is about e.g., one day. Shorter or longer time periods are also provided useful. Additionally, energy values can be measured along one time period or as a sum of every values measured thorough plurality of time periods, while dairy animal is within an FDR- stall. The second predetermined period of time is e.g., about one month. Shorter or longer time periods are also provided useful. The term "averaging" refers hereinafter to any suitable mathematical and statistical formula known in the art useful for defining a workable baseline.

Another object of the present invention is to disclose a second method for determining estrus in dairy animal comprising steps of providing p detectors, p is an integer greater than or equal 1, the p detectors selected from a group consisting of single-axis accelerometers, multiple axis accelerometers, cameras and any combination thereof; determining, by means of at least one of the p detectors, each time period ($\Delta t_i$) the dairy animal is not within an FDR-Stall; for each time period ($\Delta t_i$) the dairy animal is not within an FDR-Stall, by means of at least one of the p detectors, continuously or intermittently determining head acceleration of the animal ($a_{x,y,z}(t)$ thereby defining, for each the time period ($\Delta t_i$), an animal head movement energy value ($E_{move}$ ($\Delta t_i$)); generating, for the animal, for each first predetermined period of time n, a total head movement energy value $E_{move,total}(n)$ by summing all the head movement energy values occurring during each the first predetermined period of time n, $E_{move,total}(n) = \Sigma_{ibegin}^{iend} E_{move,total}(\Delta t_i)$; averaging, for a second predetermined period of time comprising N of the first predetermined period of time, N being in integer greater than 1, all the total head movement energy values $E_{move,total}(n)$, by dividing the total head movement energy value $E_{move,total}(n)$ by the N first predetermined period of times, thereby generating a baseline head movement energy $E_{move}$; determining, for at least one the second predetermined period of time, a maximum daily head movement energy value $E_{move,max} = \max(E_{move,total}(n))$; and generating an estrus alarm when the head movement energy value $E_{move,total}(n)$ is greater than $(E_{move,max} + E_{move})/2$. Here again, the first predetermined period of time is about e.g., one day. Shorter or longer time periods are also provided useful. Additionally, energy values can be measured along one time period or as a sum of every values measured thorough plurality of time periods, while dairy animal is in not within the FDR-stall. The second predetermined period of time is e.g., about one month. Shorter or longer time periods are also provided useful.

Another object of the present invention is to disclose an MMU comprising a TCA, wherein the TCA is configured to milk each of cow's quarter separately.

Another object of the present invention is to disclose an FDR as defined in any of the above, wherein it comprising a milk a first separation container into which milk milked from at least one first animal is delivered before milking at least one second cow.

Another object of the present invention is to disclose an FDR as defined in any of the above, wherein it comprising a milk a second separation container into which milk milked from at least one first quarter (teat) of an animal is delivered before milking at least one second quarter (teat) of said animal.

Another object of the present invention is to disclose an FDR as defined in any of the above, wherein said MMUs are configured to dock, communicate or otherwise connect to at least one recycling station.

Another object of the present invention is to disclose an FDR as defined in any of the above, wherein said recycling stations comprises at least one module selected from a group consisting of milk collection module; milk chemical and biological analysis module; milk separation module; MMUs emptying module; MMUs cleaning module; MMUs recycling module; MMUs water and consumables loading module; and any combination thereof.

Another object of the present invention is to disclose an FDR as defined in any of the above, wherein said milk chemical and biological analysis module comprising an analyzer configured to analyze each said milk milked from each of cow's quarter separately.

Another object of the present invention is to disclose an FDR as defined in any of the above, wherein said recycling station is connectable to a central collecting container either directly or by a pipeline, and wherein said recycling station is further configured to wash said MMUs and said pipeline.

Another object of the present invention is to disclose a method for avoiding mixture of milk from infected quarters with milk from healthy quarters of a dairy animal comprising steps of milking each quarter separately; and emptying the milk of said each quarter into one independent container.

Another object of the present invention is to disclose an TCA as defined in any of the above, wherein the TCA further comprising one teat cleaning cup configured horizontally on top of said TCA; said cleaning cup further connected to pipes containing hot water, air and vacuum.

Another object of the present invention is to disclose an MMU as defined in any of the above, the MMU comprising a taxi, wherein said taxi is configured to drive said MMU horizontally along said elevated rail; wherein said MMU further comprising a messenger configured to both (i) downloading said MMU substantially vertically from said elevated rail to a lower docking station provided within or in connection with the stall and (ii) uploading substantially vertically said MMU to said taxi unit; and further wherein said MMU comprising an extender configured to reversibly approaching the milking assembly towards dairy animal's teats.

Another object of the present invention is to disclose an MMU as defined in any of the above, said MMU configured for both downloading a milking unit substantially vertically from said elevated rail to a lower docking station provided within or in connection with the stall; and for uploading substantially vertically the same.

Another object of the present invention is to disclose an MMU as defined in any of the above, the MMU comprising at least one member of a group consisting of taxi, messenger, and extender; said taxi configured to horizontally drive said MMU along said elevated rail.; said messenger is configured to both (i) downloading said MMU substantially vertically from said elevated rail to a lower docking station provided within or in connection with the stall and (ii) uploading substantially vertically said MMU to said taxi; and said extender configured to reversibly approaching the milking assembly towards dairy animal's teats.

Another object of the present invention is to disclose an MMU as defined in any of the above, the MMU comprising at least one member of a group consisting of taxi, messenger, and extender; said taxi configured to horizontally drive a milking unit along said elevated; said MMU is configured to both (i) downloading said milking unit substantially vertically from said elevated rail to a lower docking station provided within or in connection with the stall and (ii) uploading substantially vertically milking unit to said taxi unit; and said extender configured to reversibly approaching the milking assembly towards dairy animal's teats.

BRIEF DESCRIPTION OF THE FIGURES AND IMAGES

Figure 2:
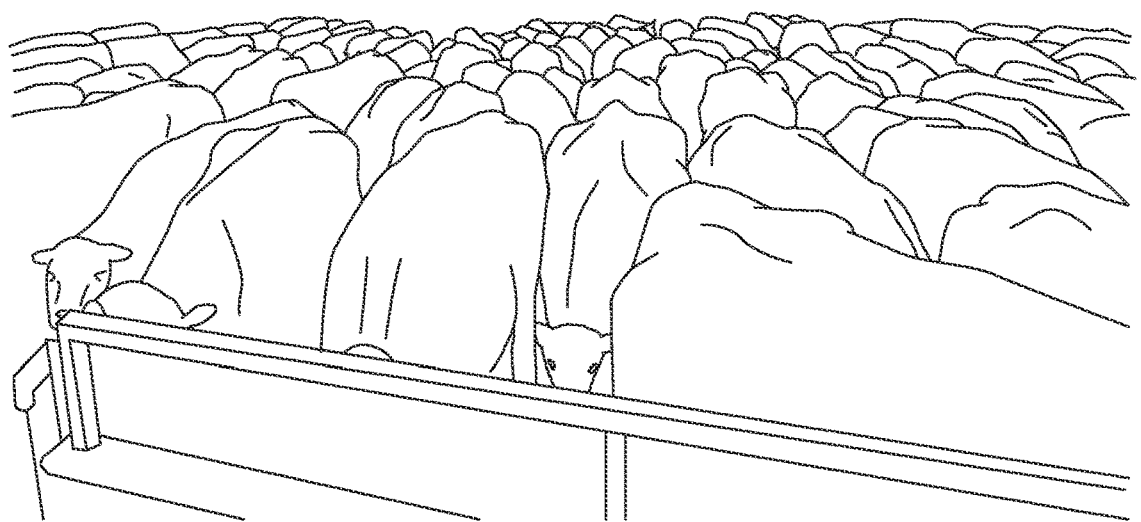
Figure 3:
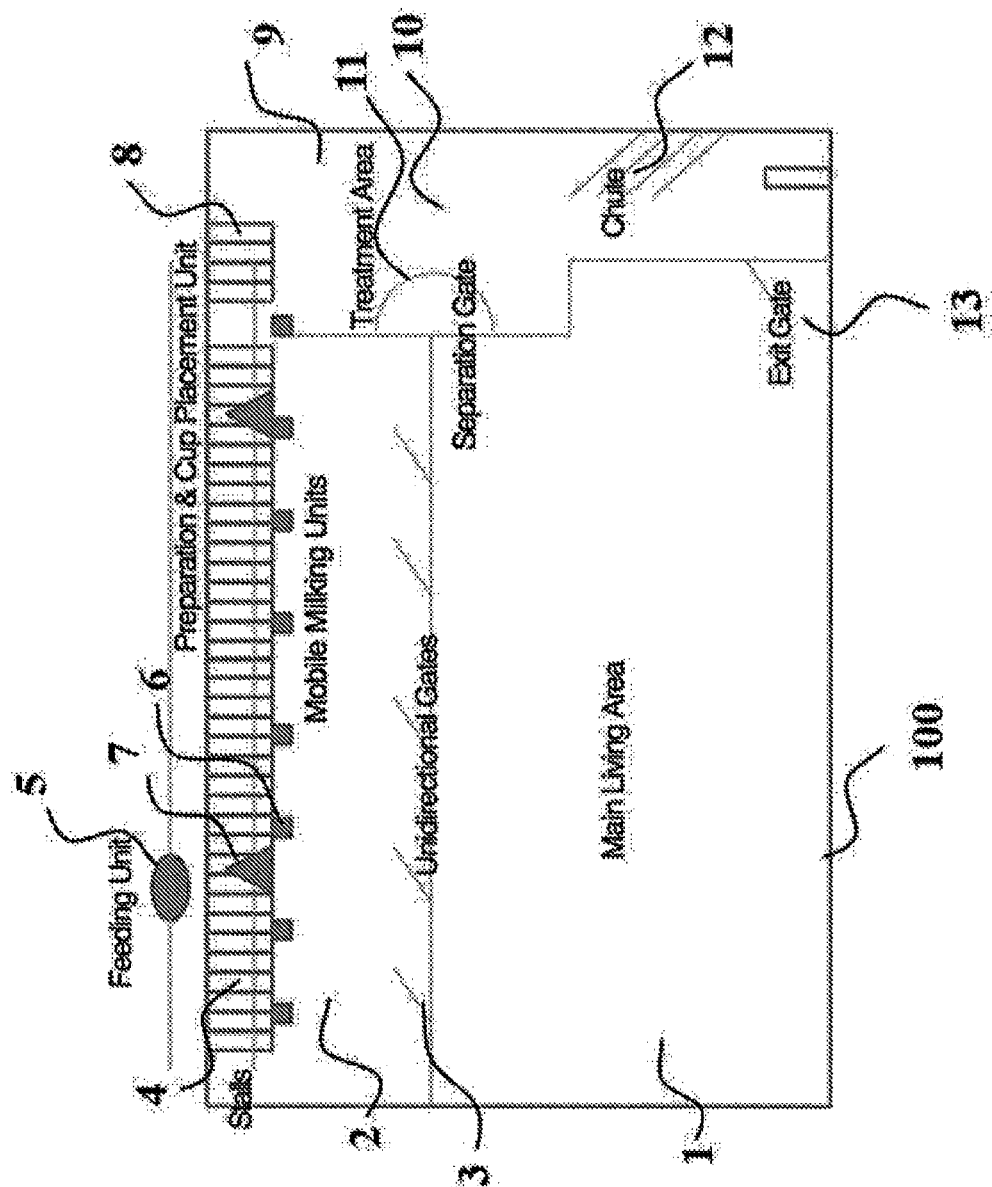

Exemplary embodiments are illustrated in referenced figures. It is intended that the embodiments and figures disclosed herein be considered as being illustrative, rather than restrictive. The disclosure, however, both as to organization and method of operation, together with objects, features, and advantages thereof, may best be understood by reference to the following detailed description when read with the accompanying figures, in which:

FIG. 1 presents a photo of crowding, blocking and waiting of cows in prior art dairy technology;

FIG. 2 presents a photo of crowded waiting for milking parlor in prior art dairy technology;

FIG. 3 schematically illustrates an FDR scheme according to one embodiment of the invention.

Figure 4:
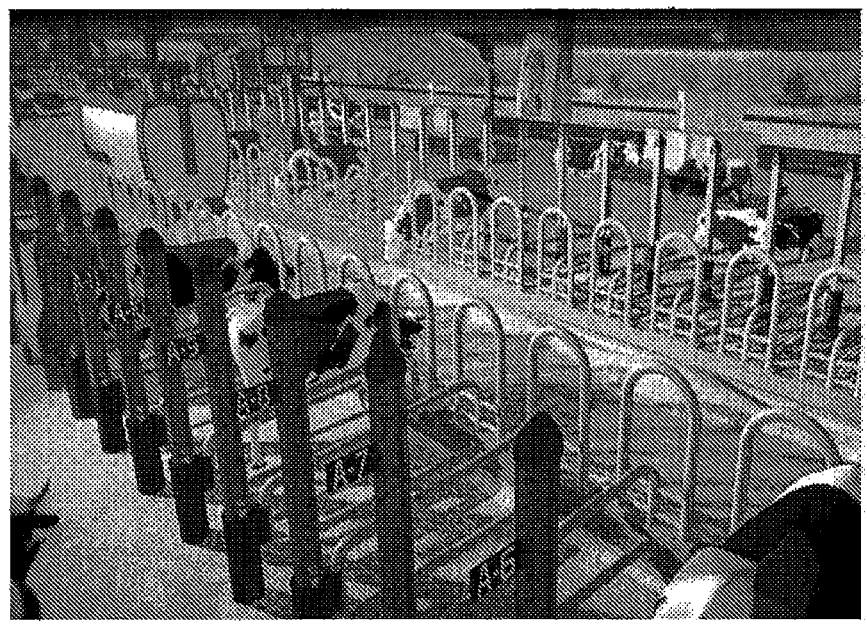
Figure 5:
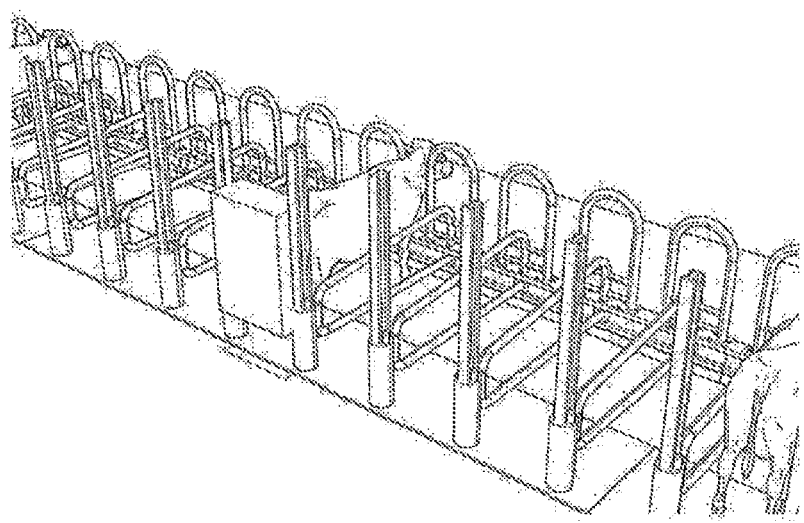
Figure 6:
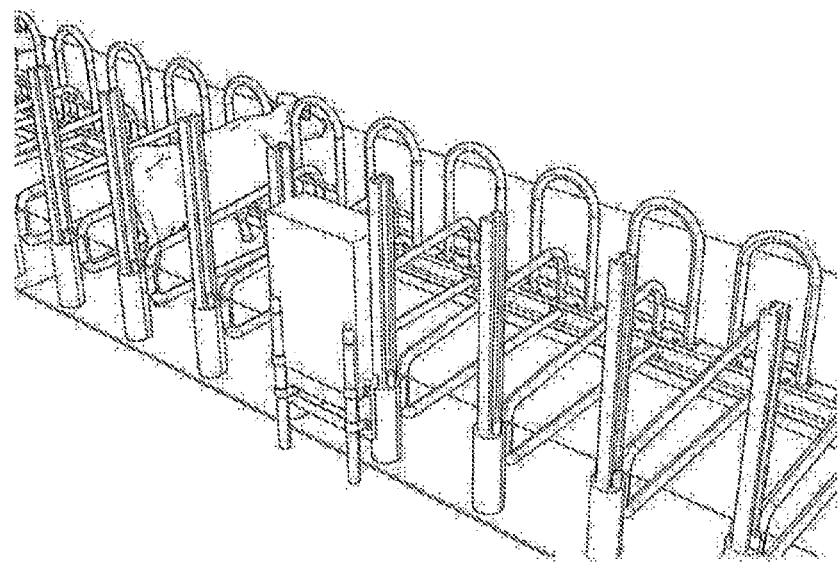
Figure 7:
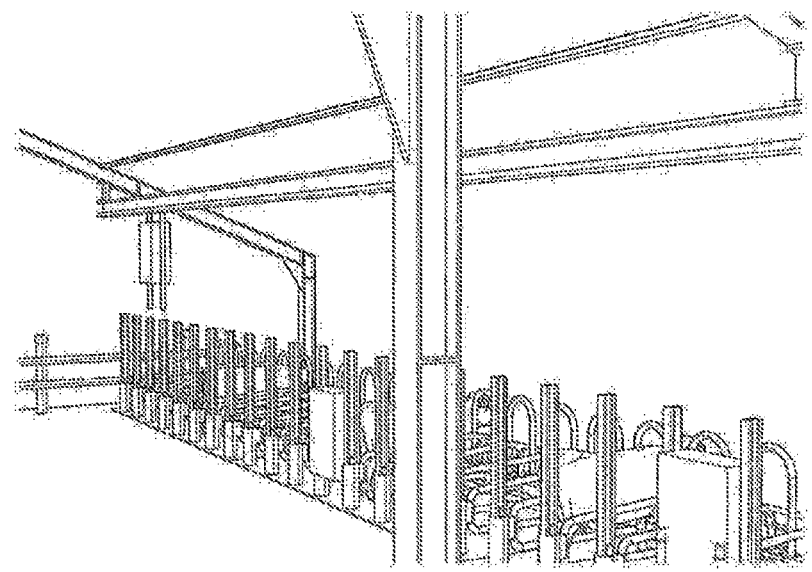
Figure 8:
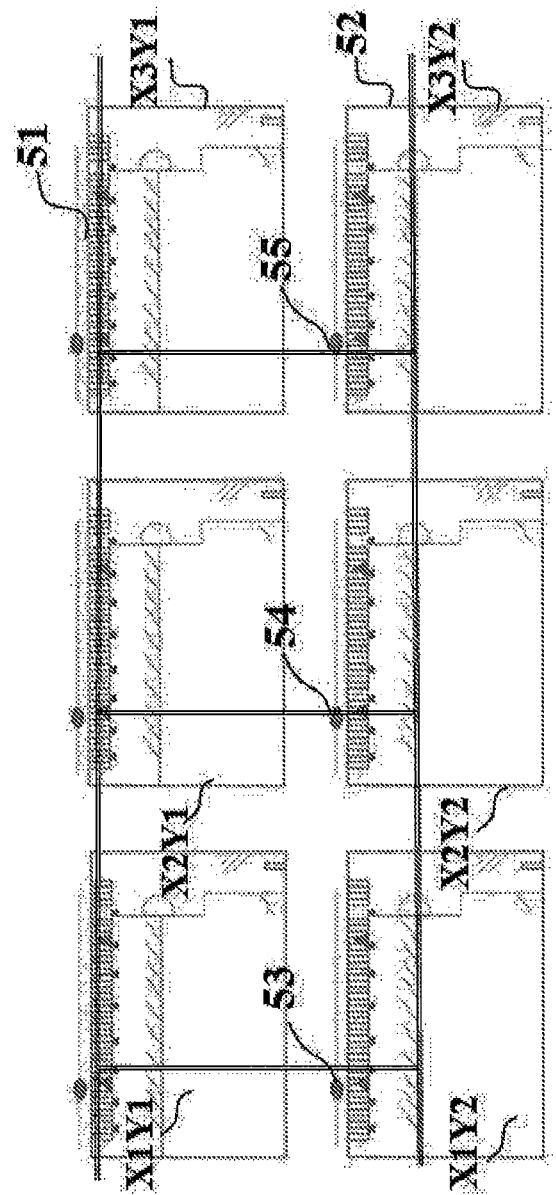
Figure 9A:
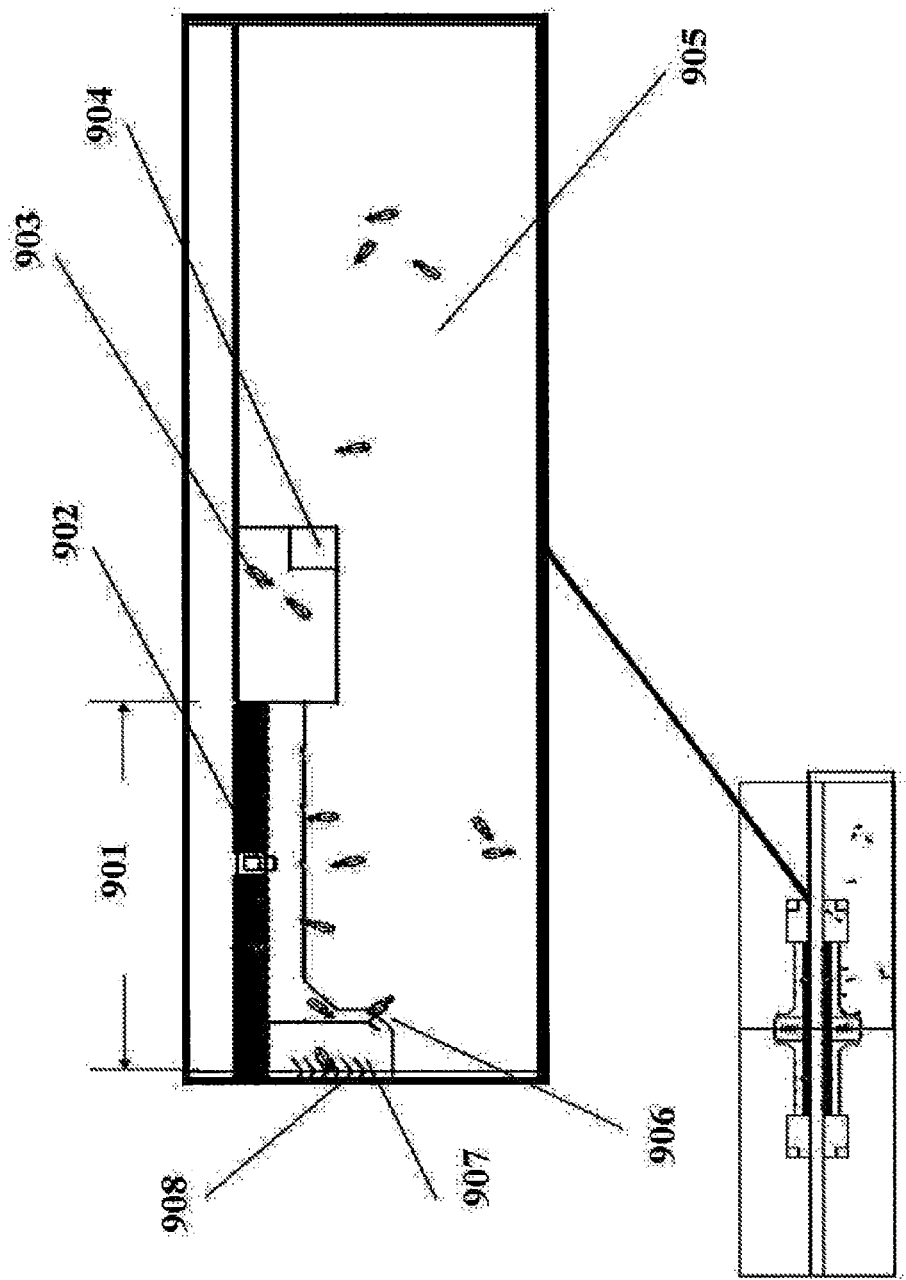
Figure 9B:
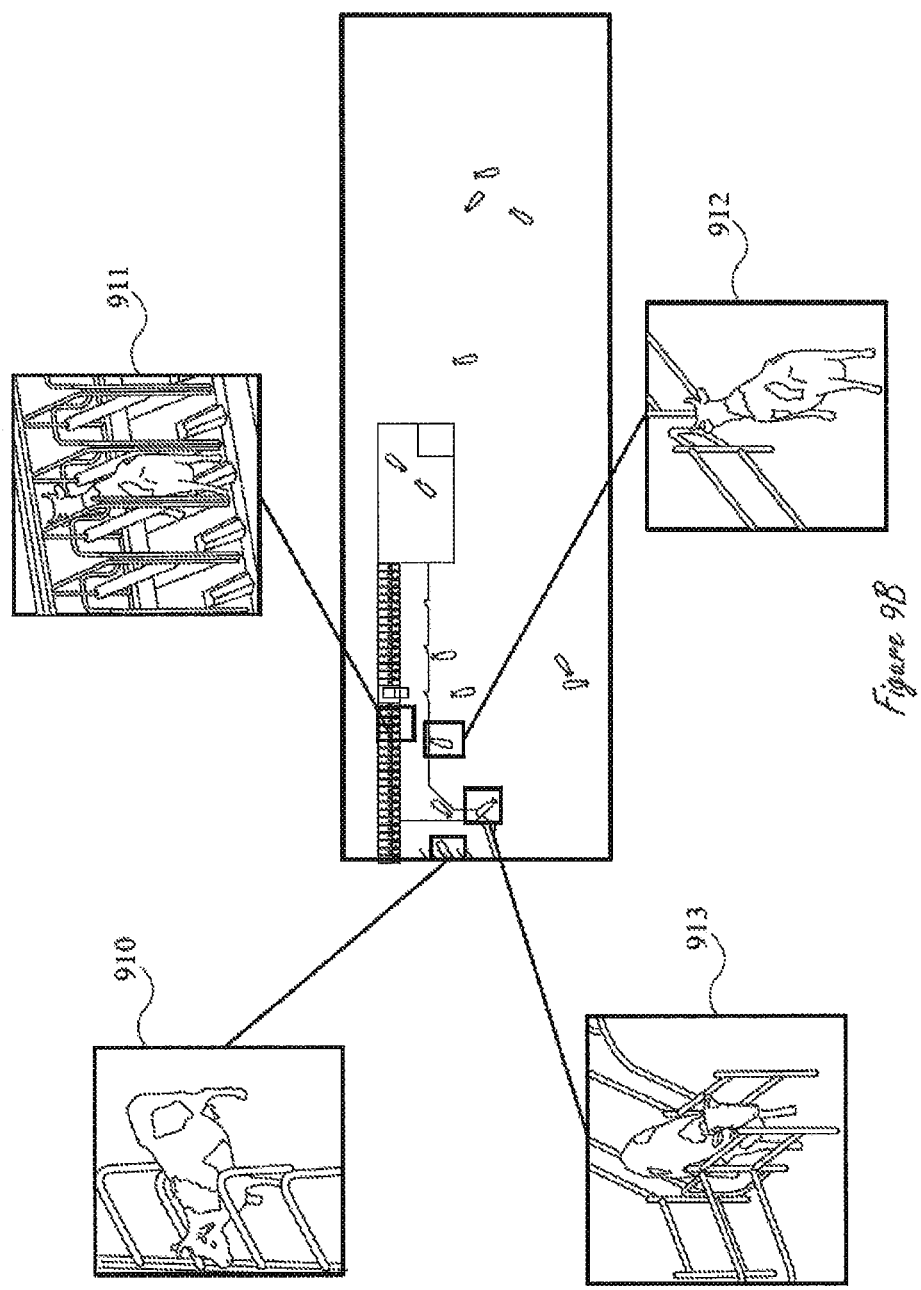

FIG. 4 schematically illustrates stalls within an FDR scheme according to one embodiment of the invention, an MMU approached the rear side of a cow to be milked;

FIG. 6 schematically illustrates a line of stalls within an FDR scheme according to one embodiment of the invention, here the cow is eating whilst waiting to an MMU;

FIG. 7 schematically illustrates a line of stalls within an FDR with a suspended/elevated rail above the stalls according to one embodiment of the invention;

FIG. 8 schematically illustrates an array of FDRs interconnected by means of mutual MMU(s) according to an embodiment of the invention;

FIGS. 9A-9B schematically illustrate two FDR schemes according to an embodiment of the invention;, fed cows are continuously and uninterruptedly directed to move, when they please, in a non-manipulated manner, without-queues and blockages, from MLA, to eating area, optionally then, via treatment area, back to MLA, and so on and so forth.

Figure 10:
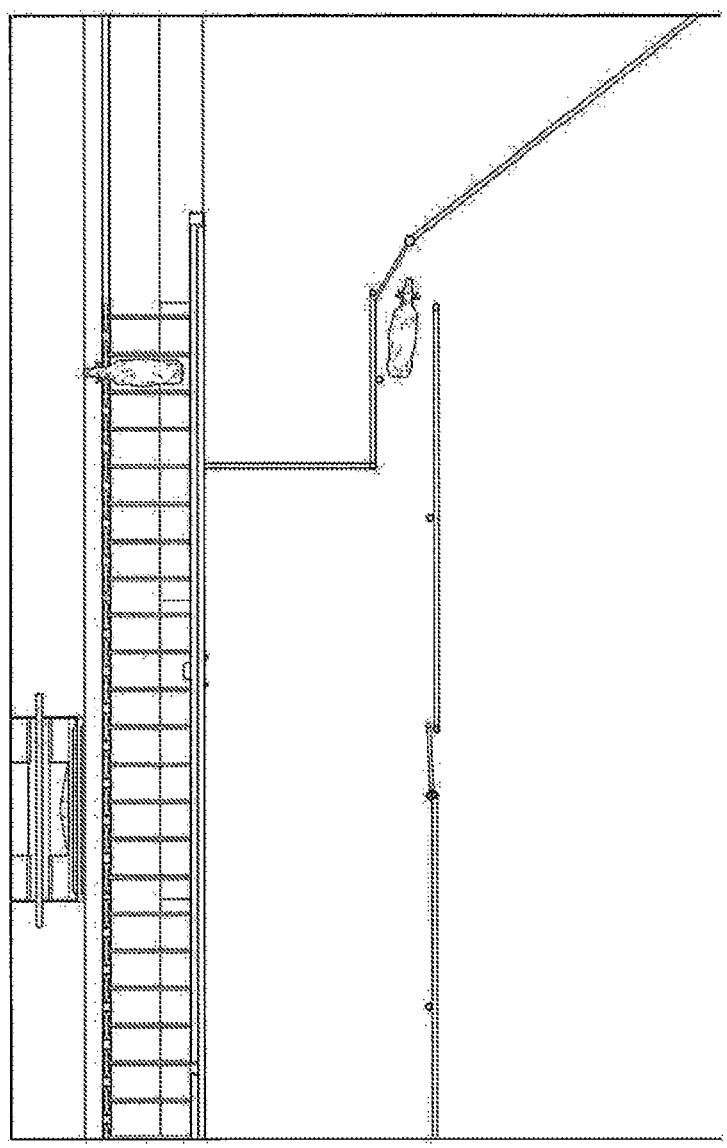
Figure 11:
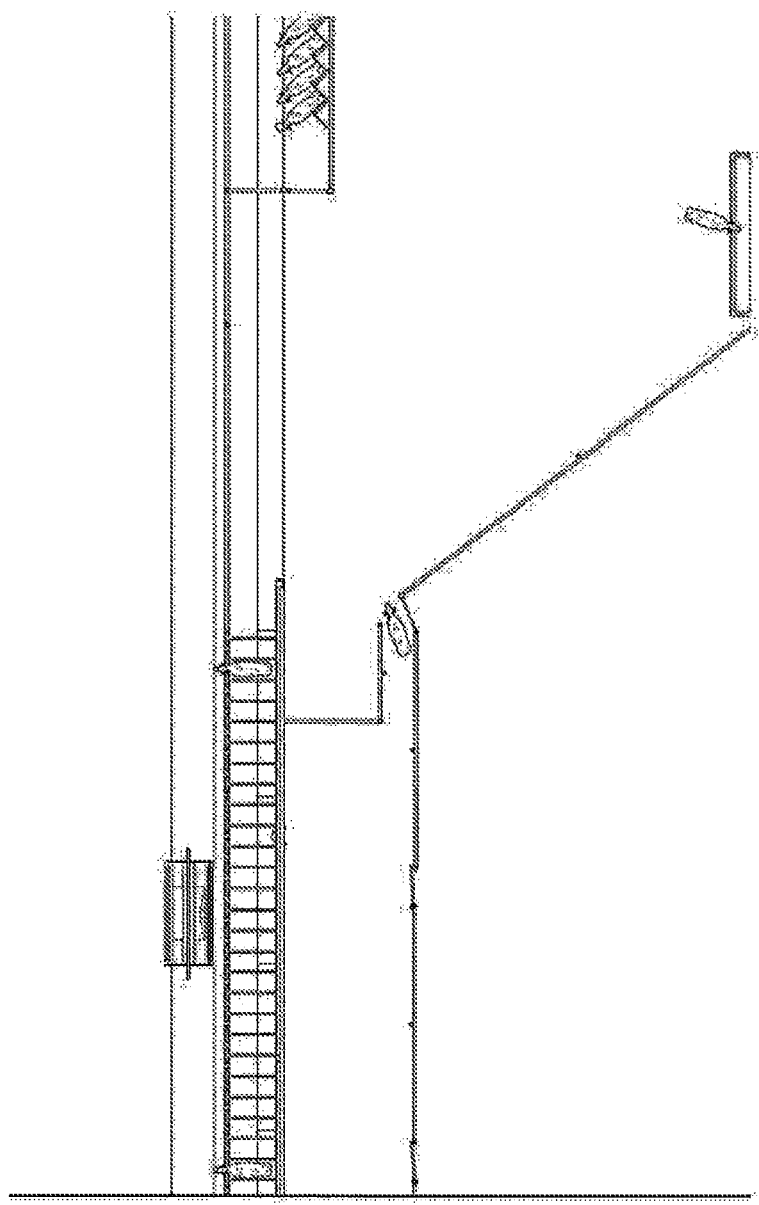
Figure 12:
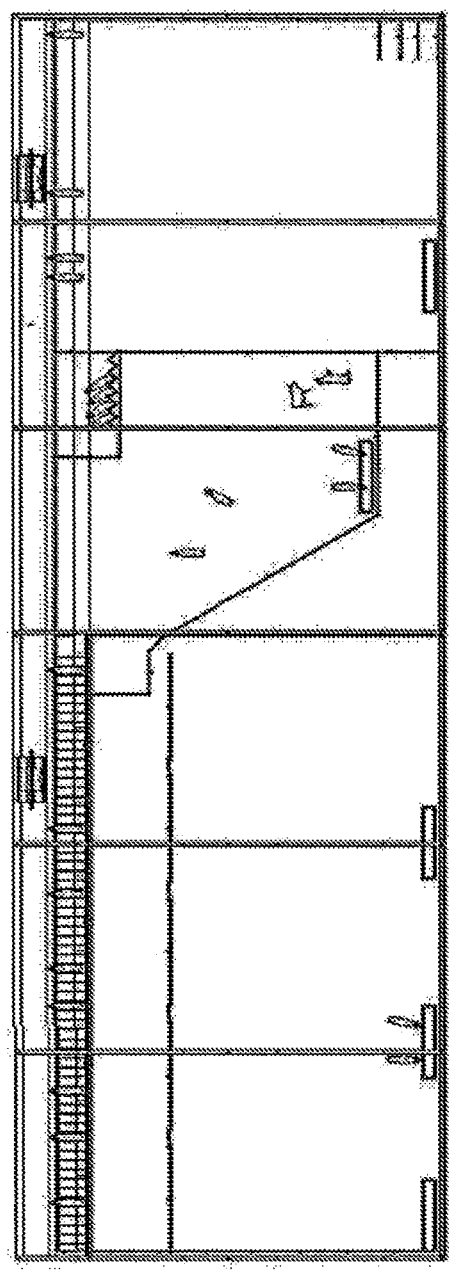
Figure 13:
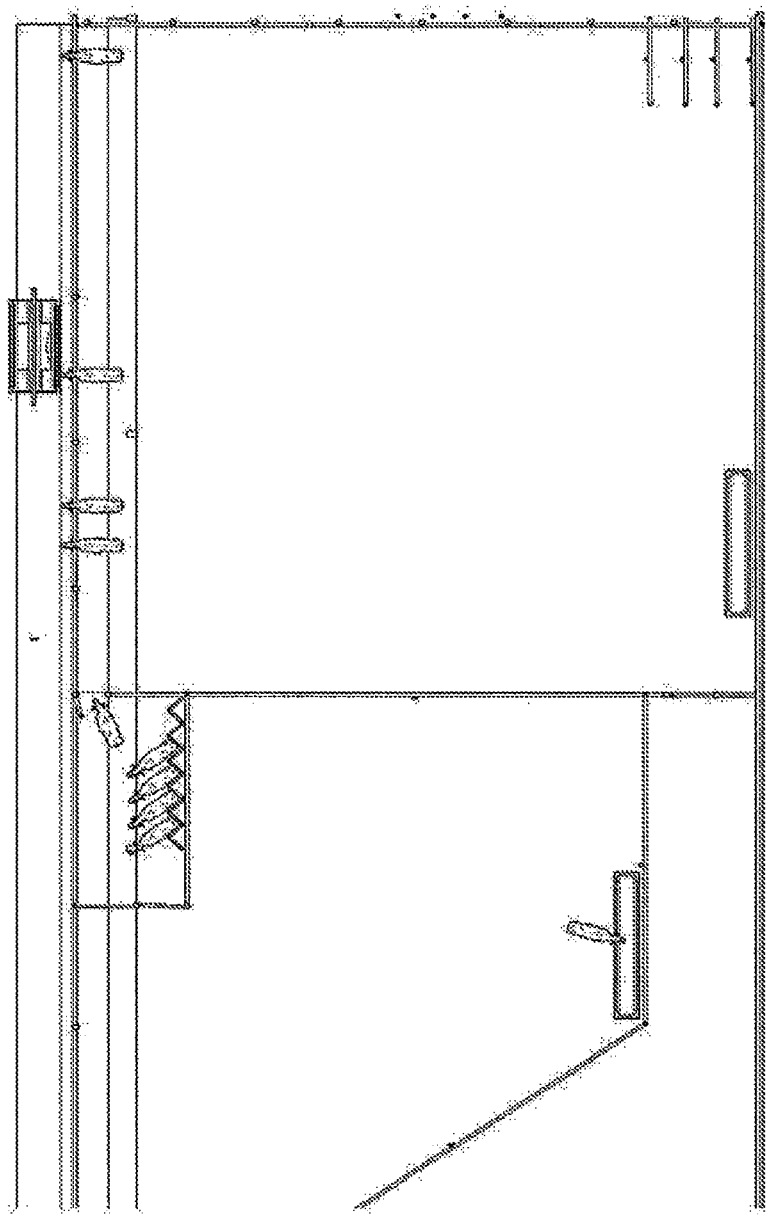
Figure 14:
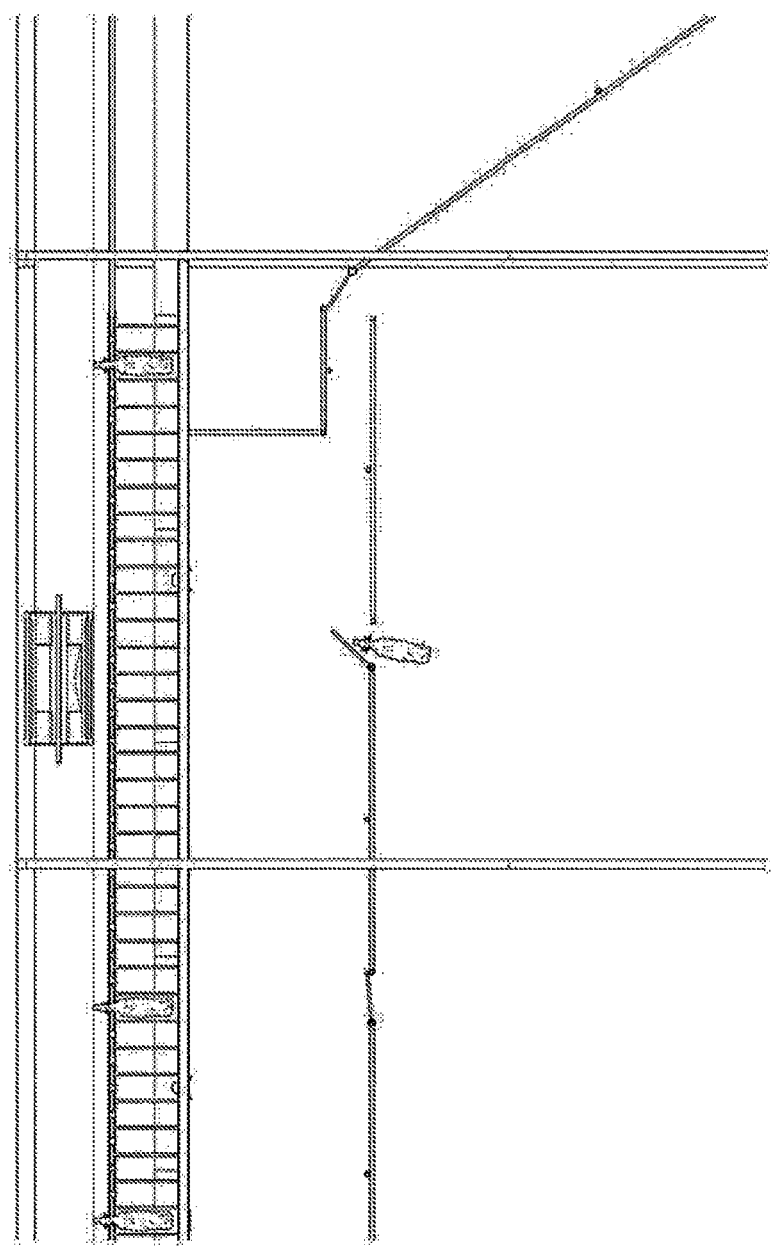
Figure 15:
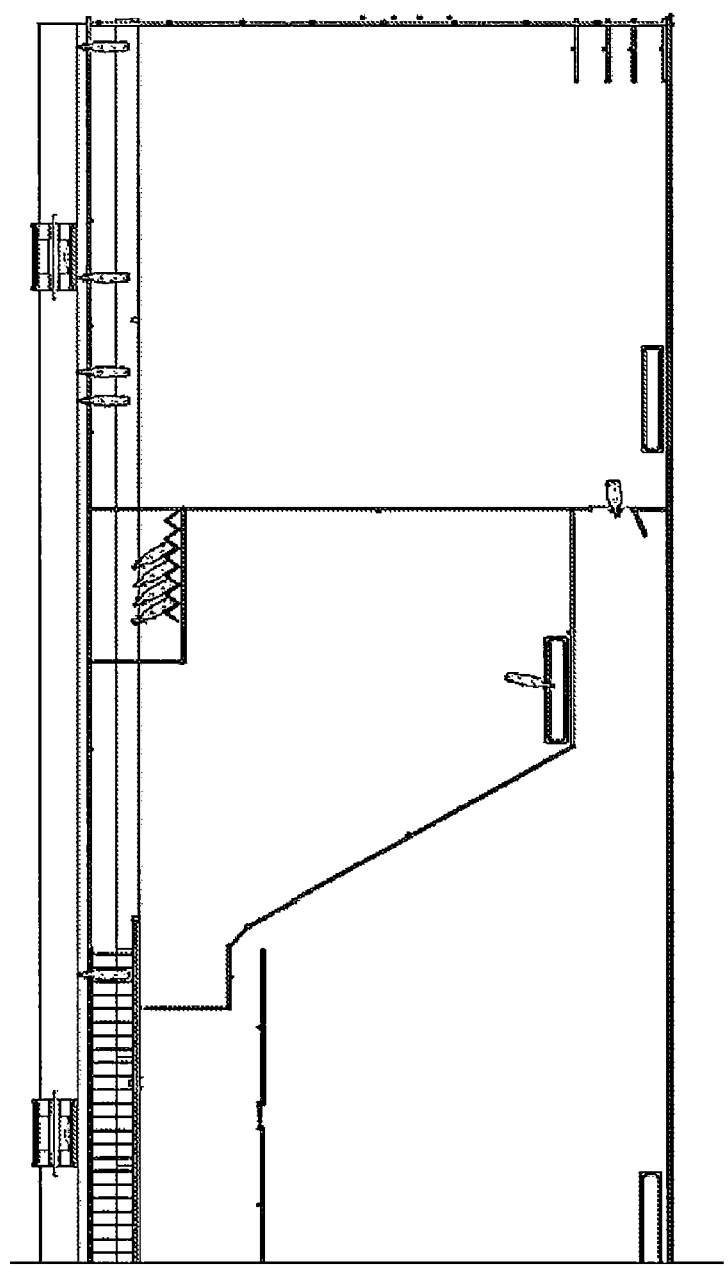
Figure 16:
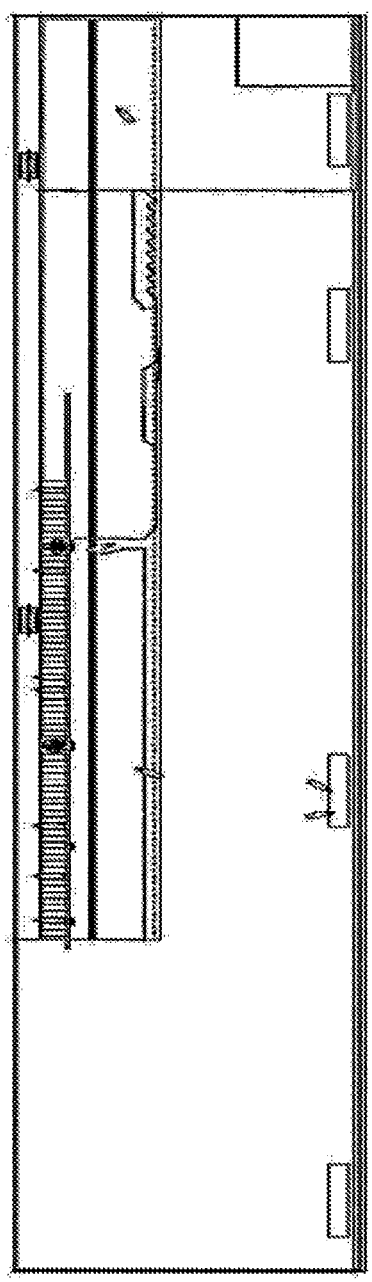
Figure 18:
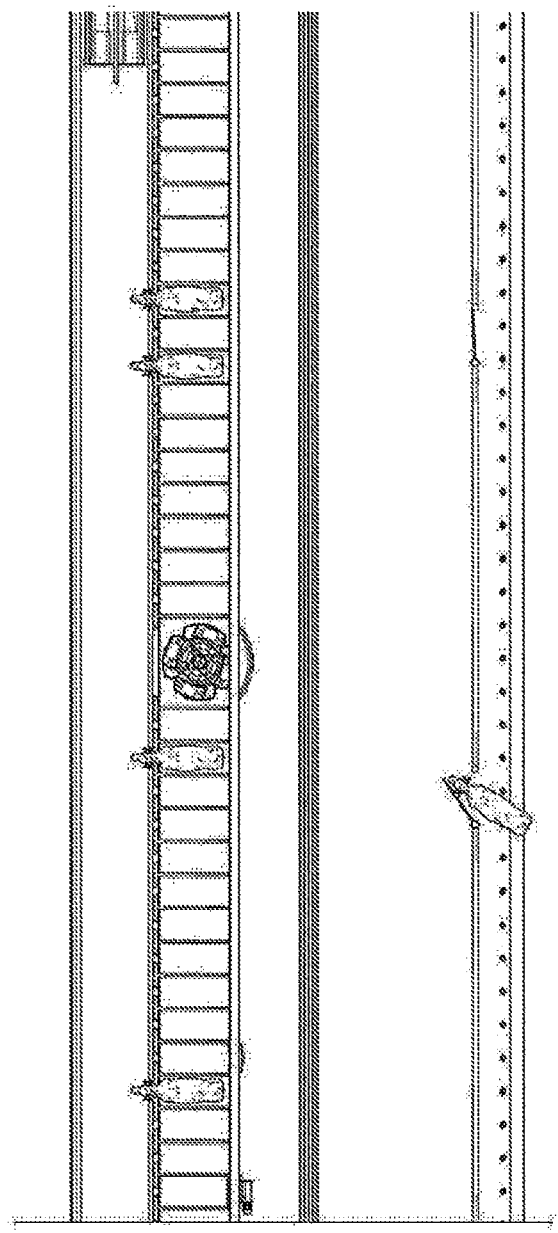
Figure 19:
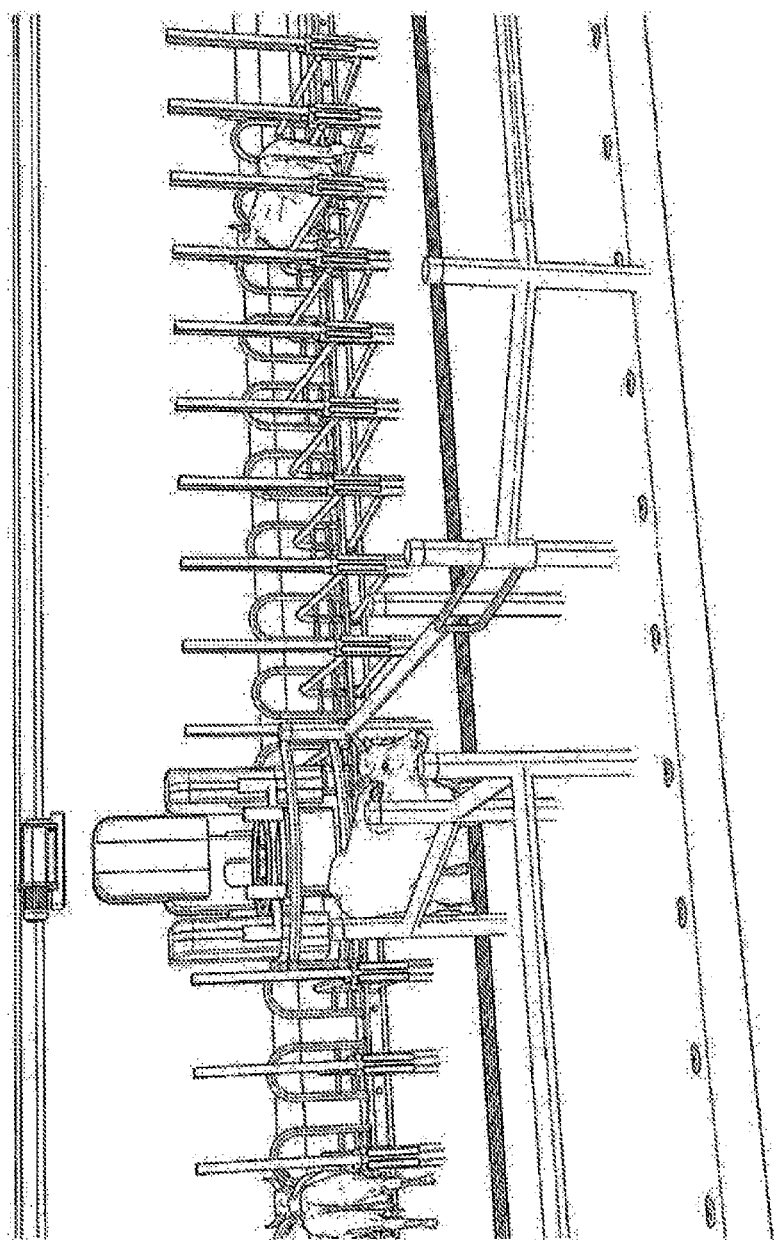
Figure 20:
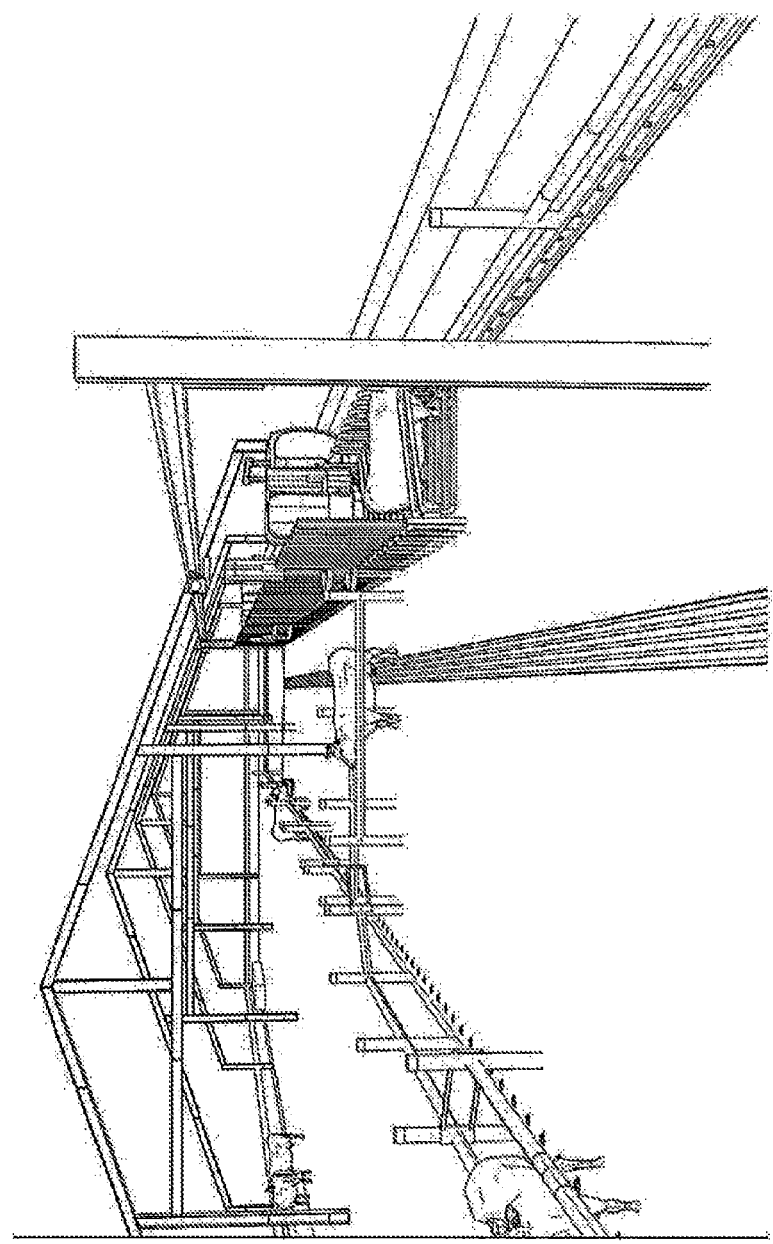
Figure 21:
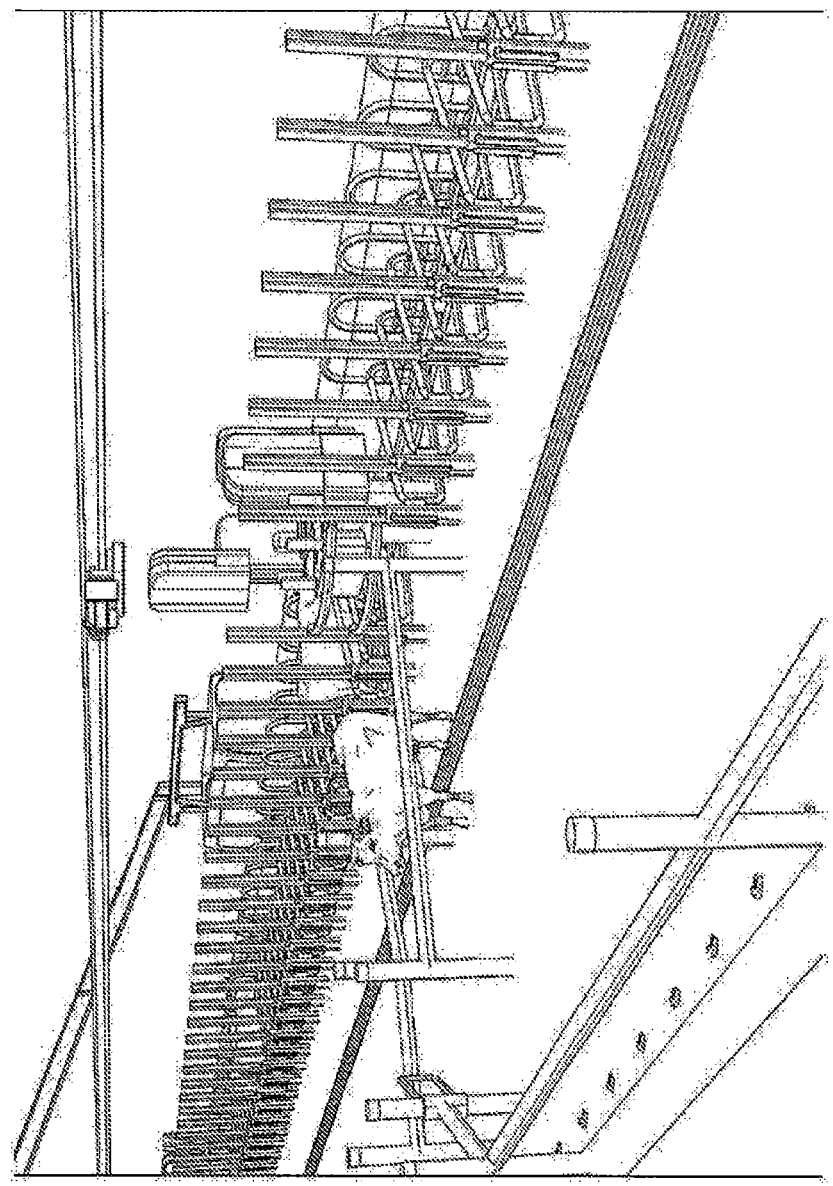
Figure 22:
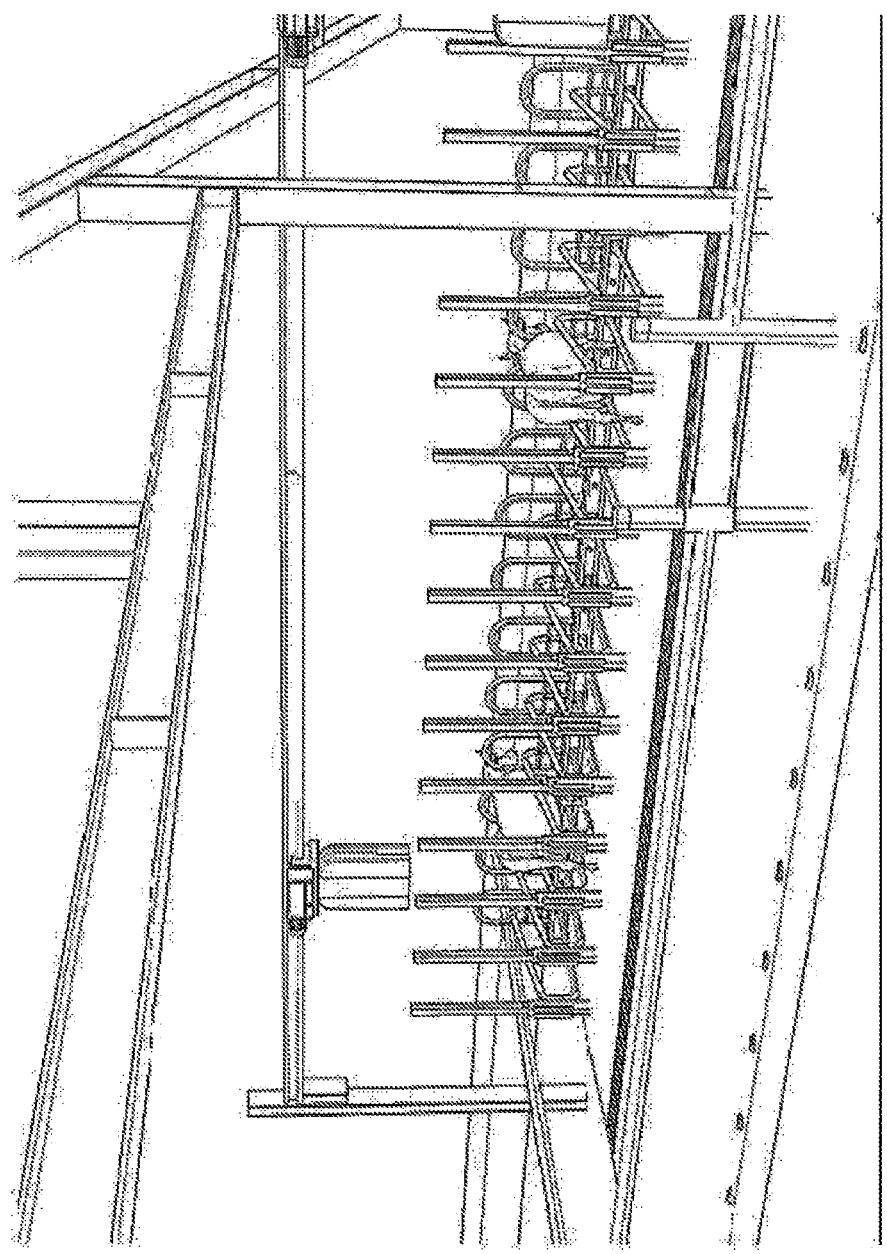
Figure 23:
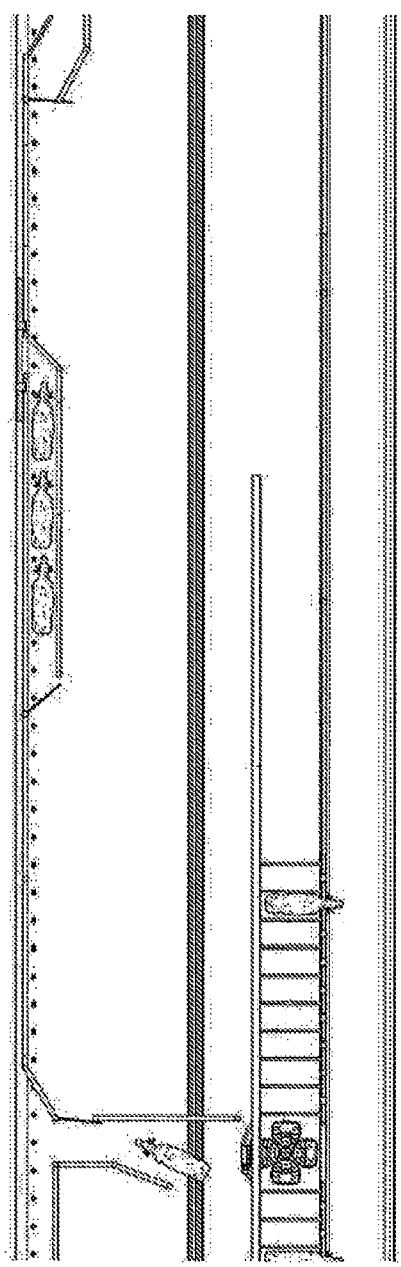
Figure 24A:
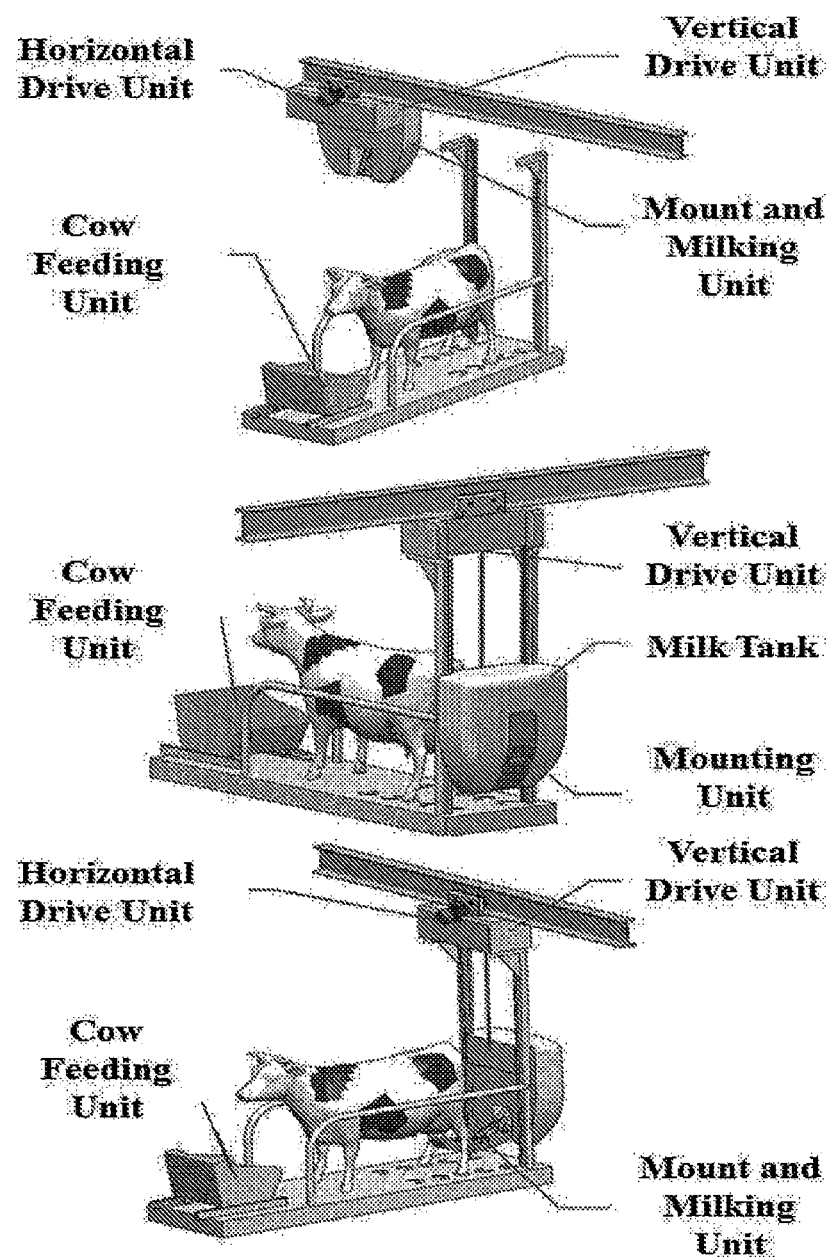
Figure 24B:
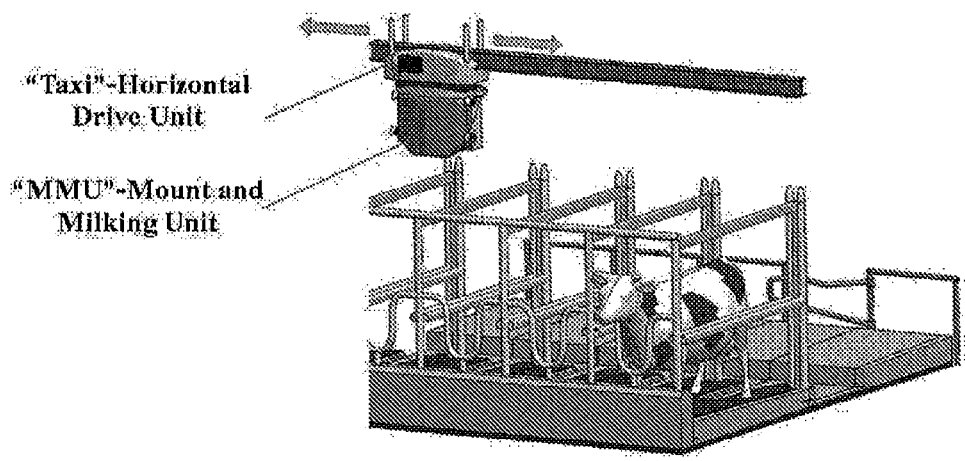
Figure 24C:
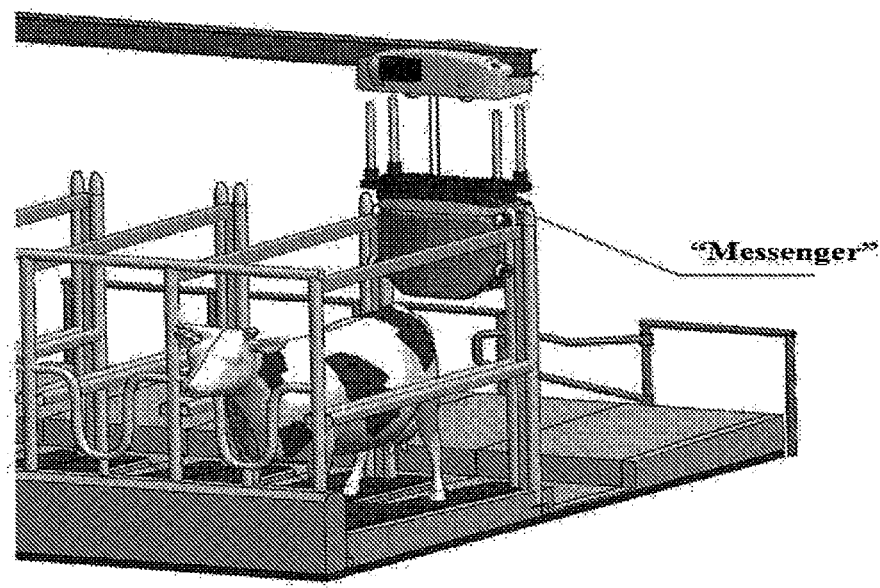
Figure 24D:
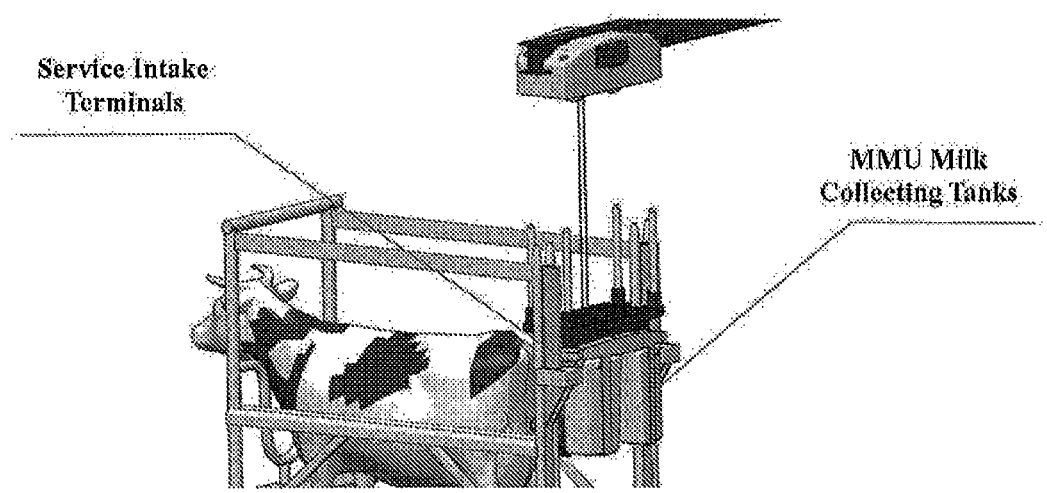
Figure 24E:
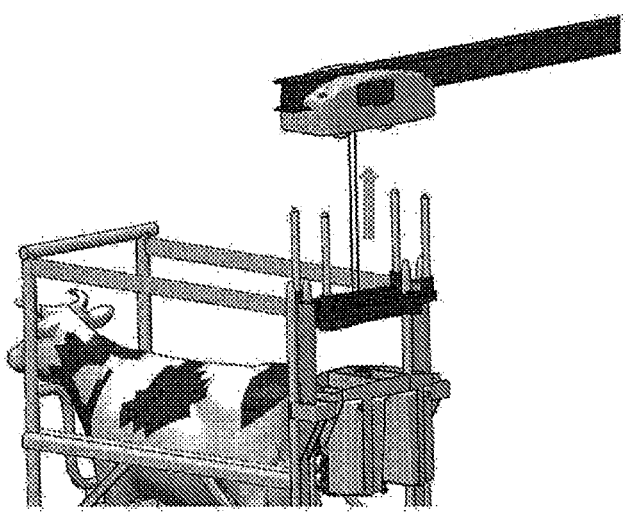
Figure 24F:
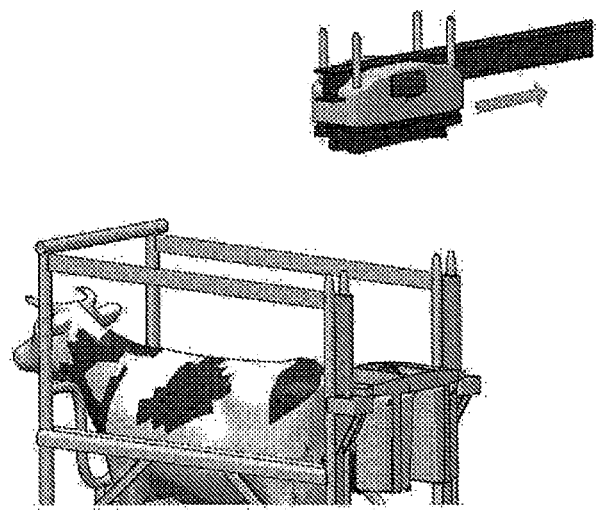
Figure 25:
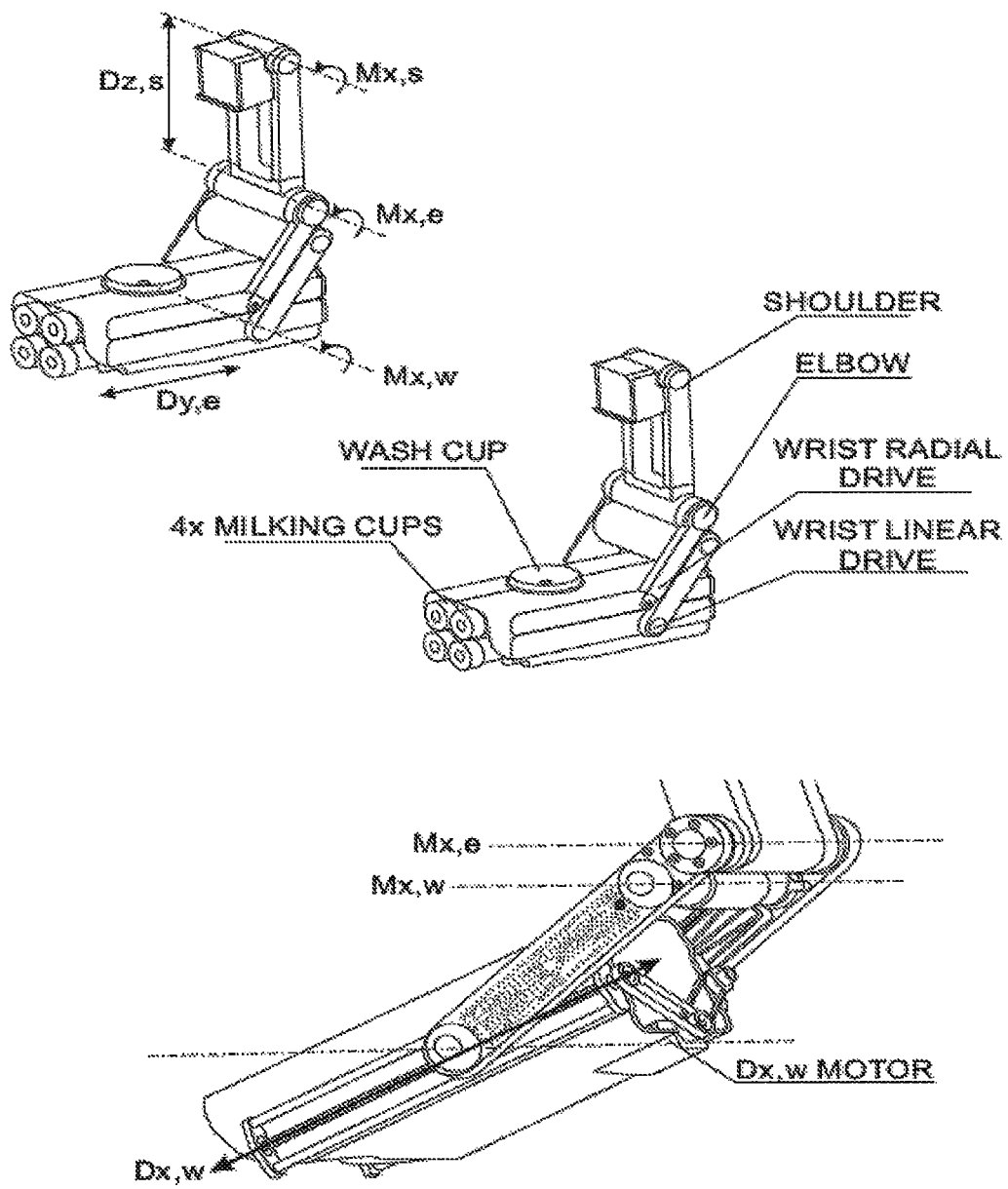
Figure 26:
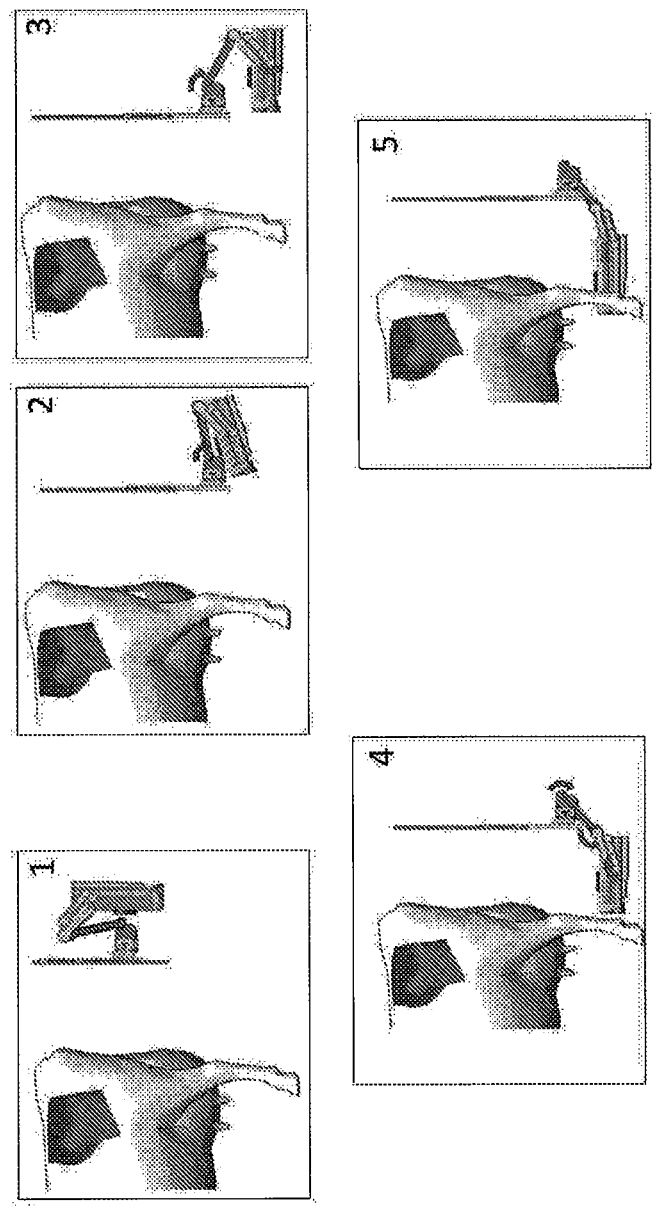
Figure 27:
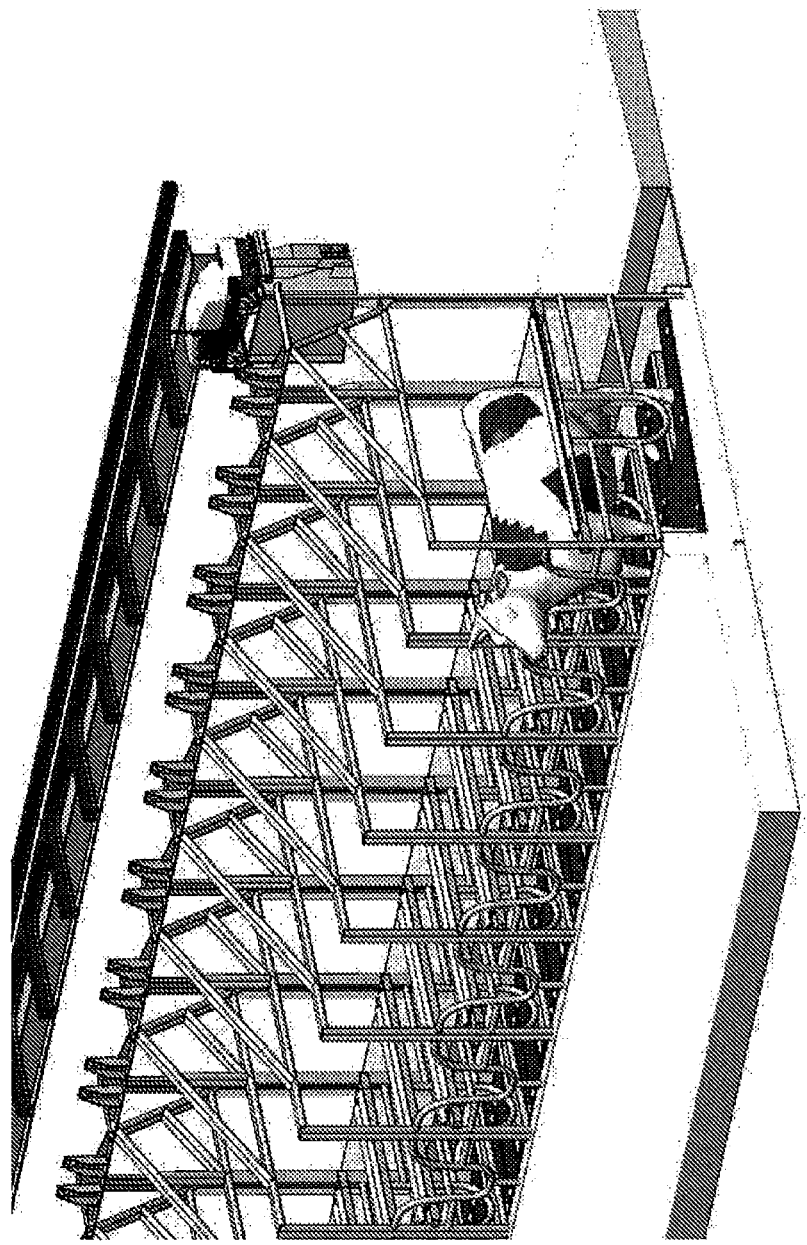
Figure 28:
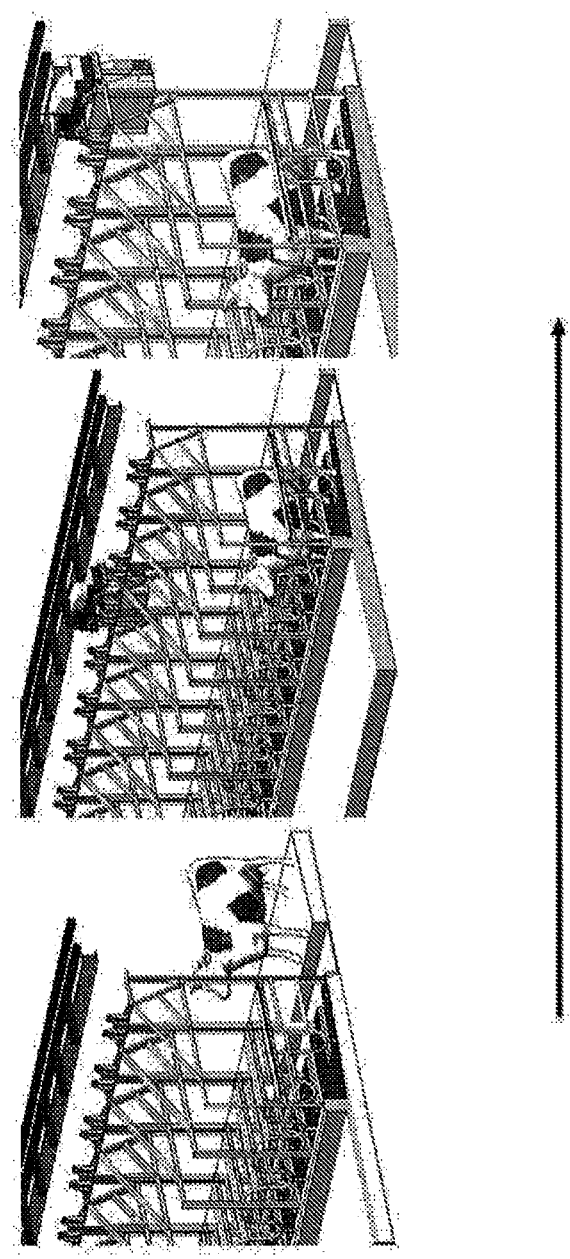
Figure 29:
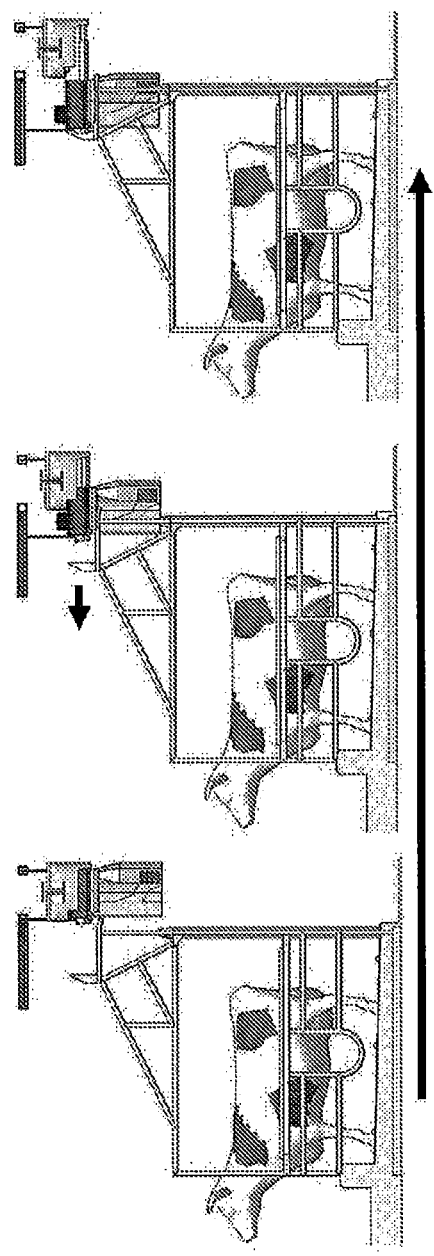
Figure 30:
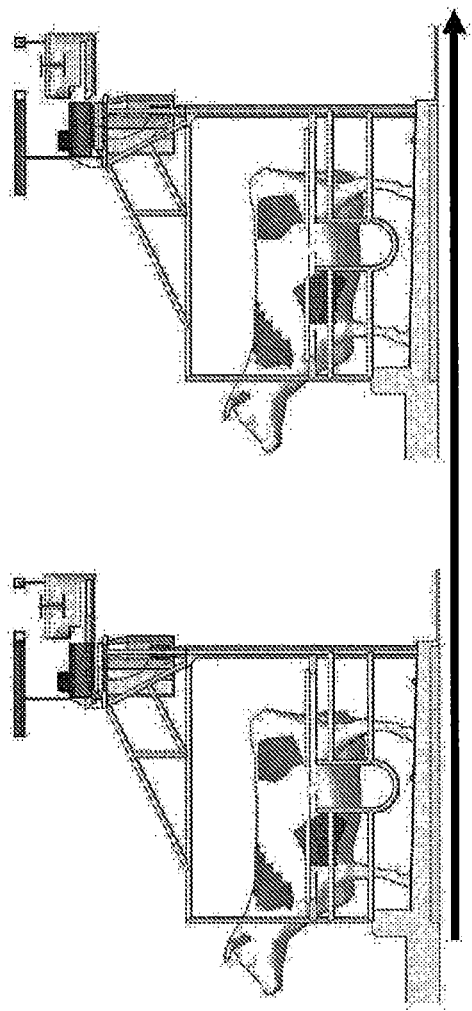
Figure 31:
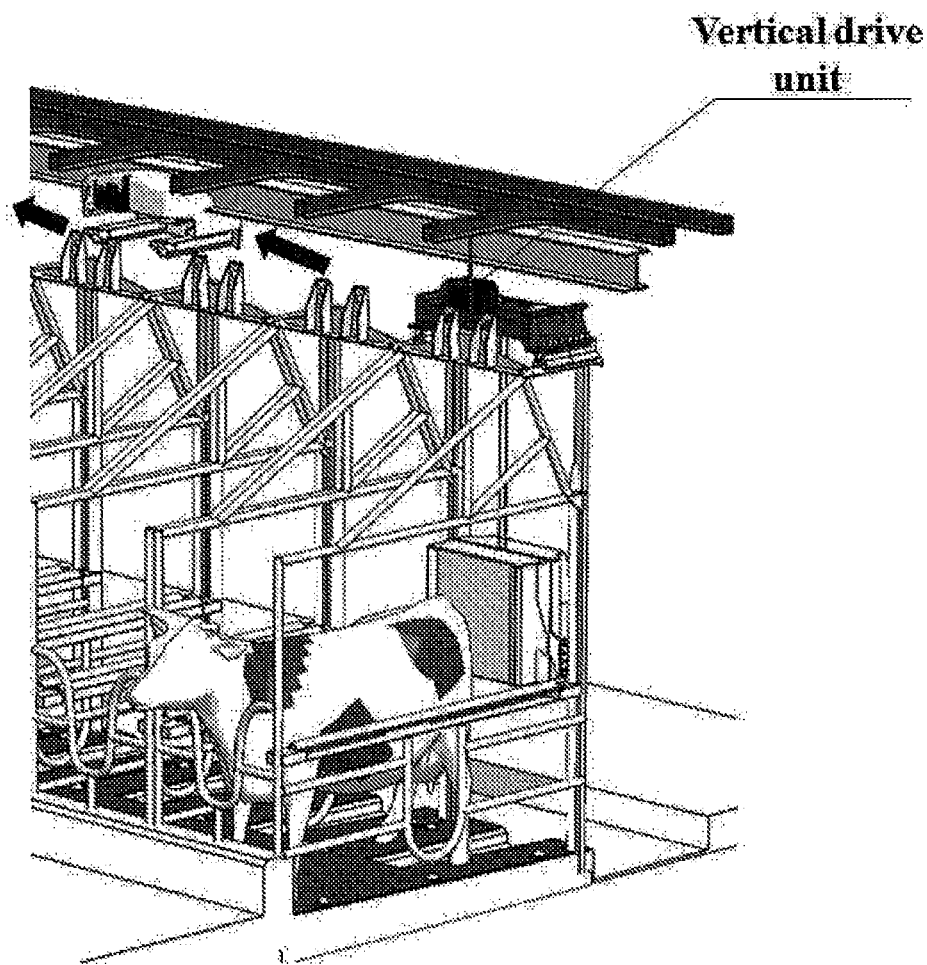
Figure 32:
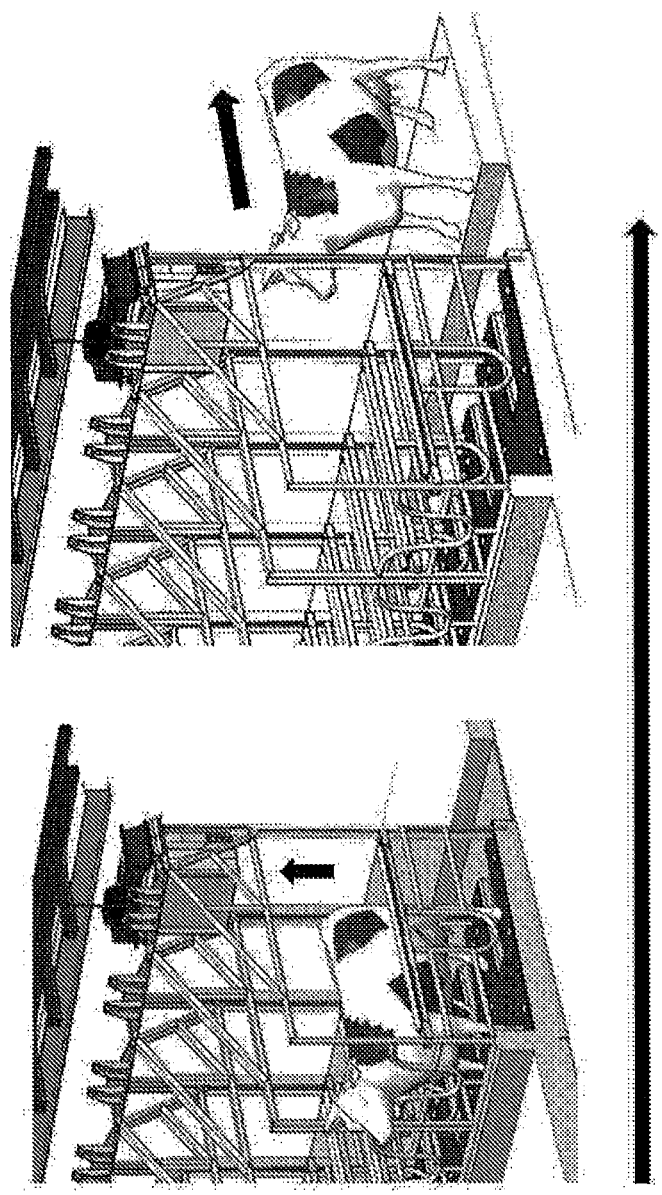
Figure 33:
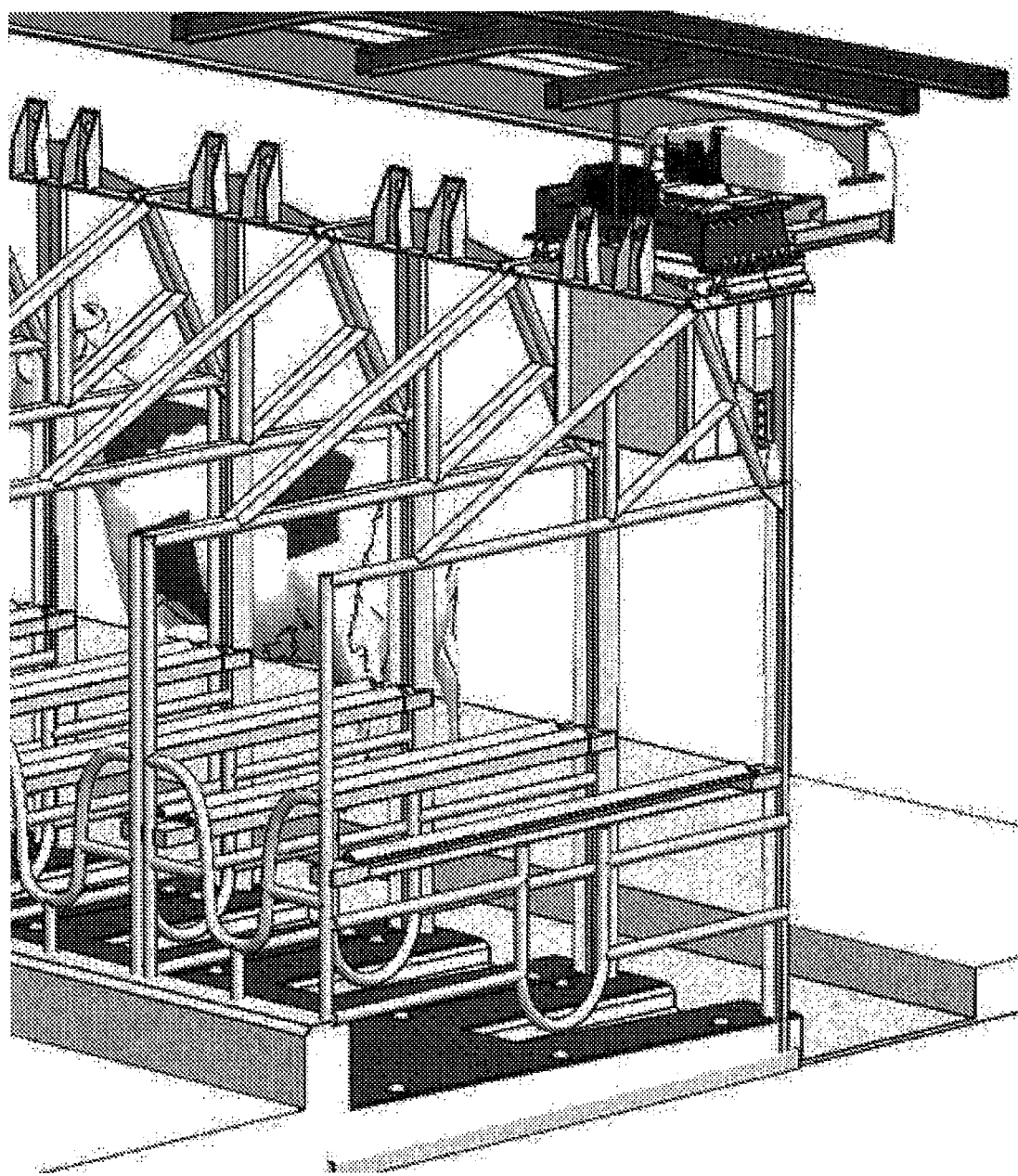
Figure 34:
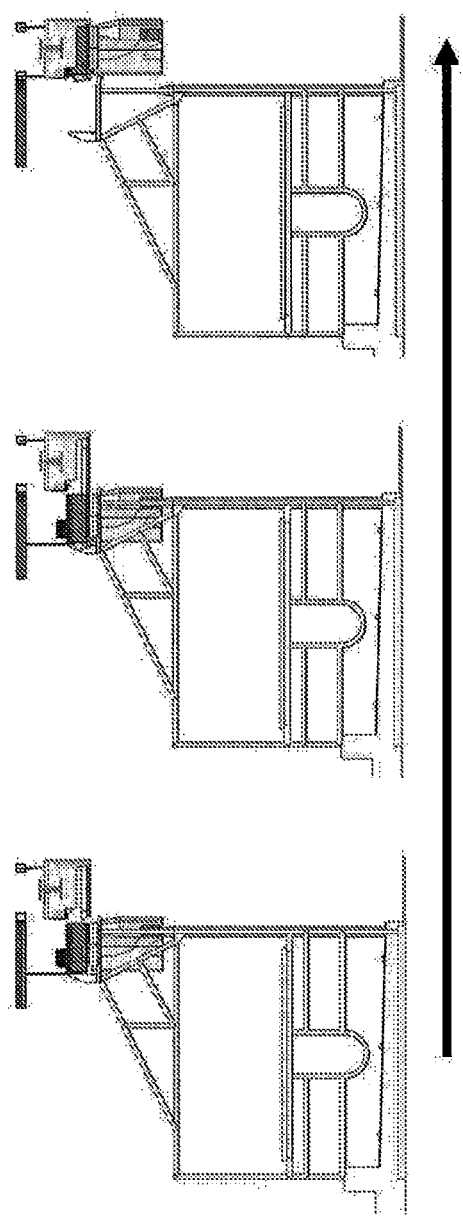
Figure 35:
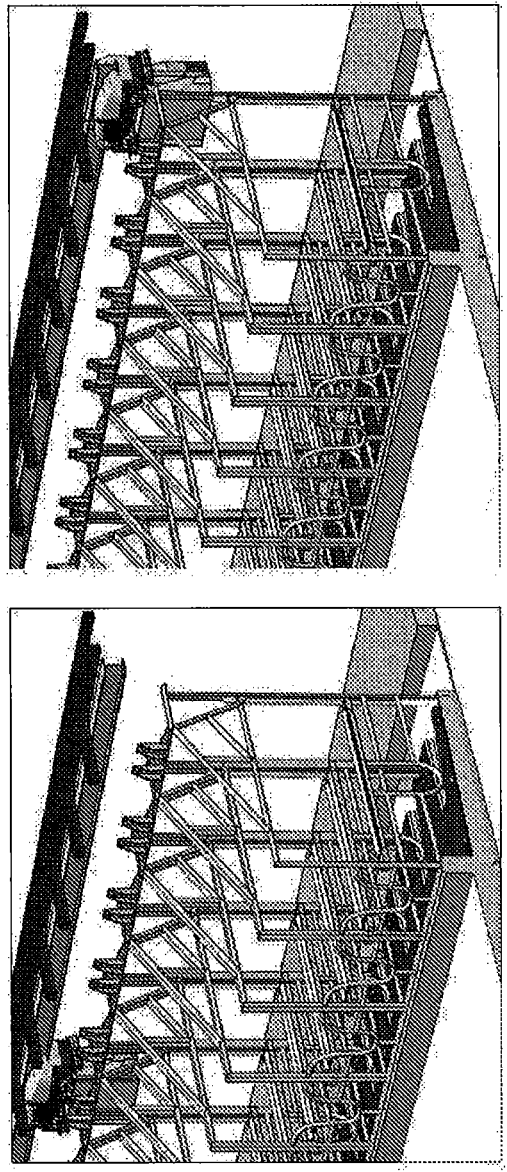
Figure 42:
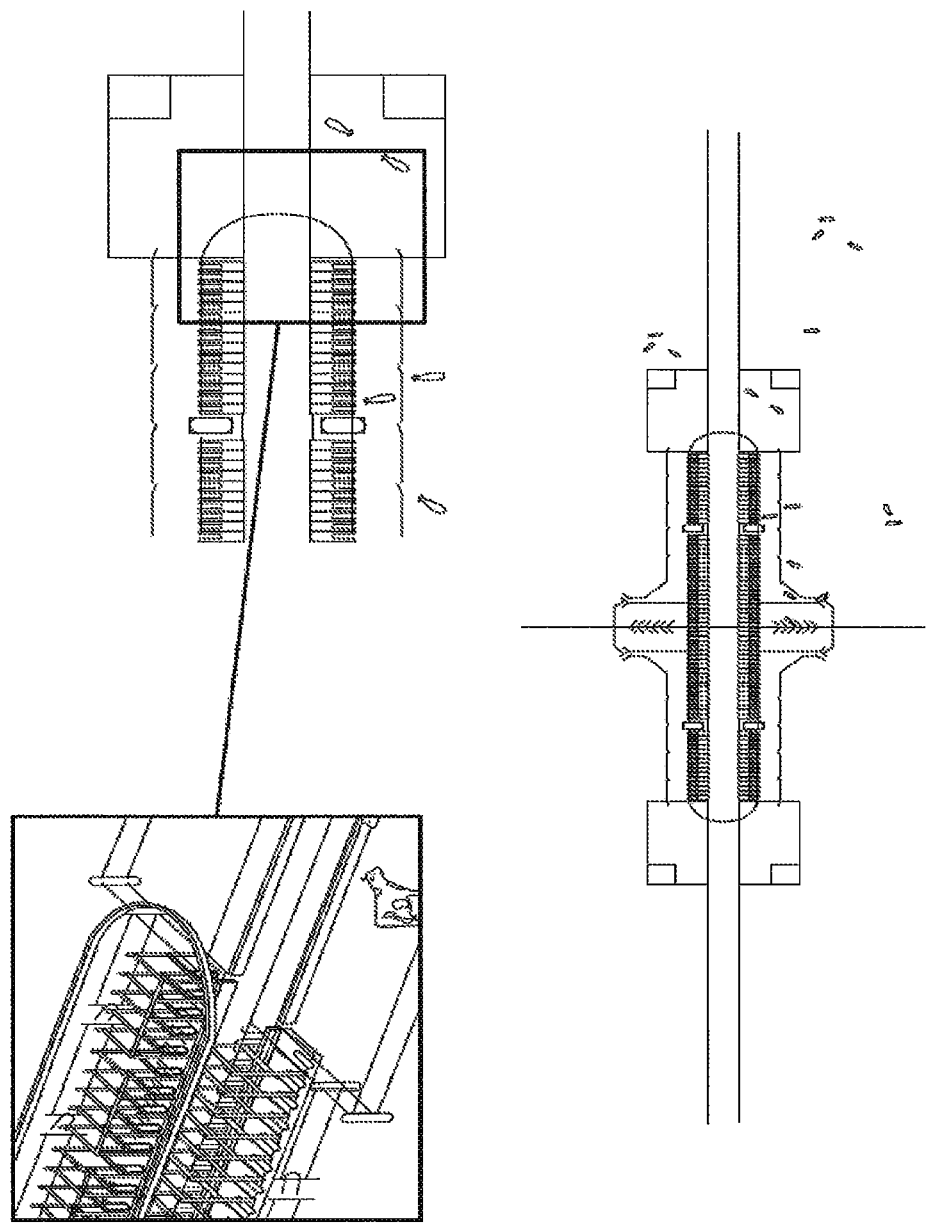
Figure 43:
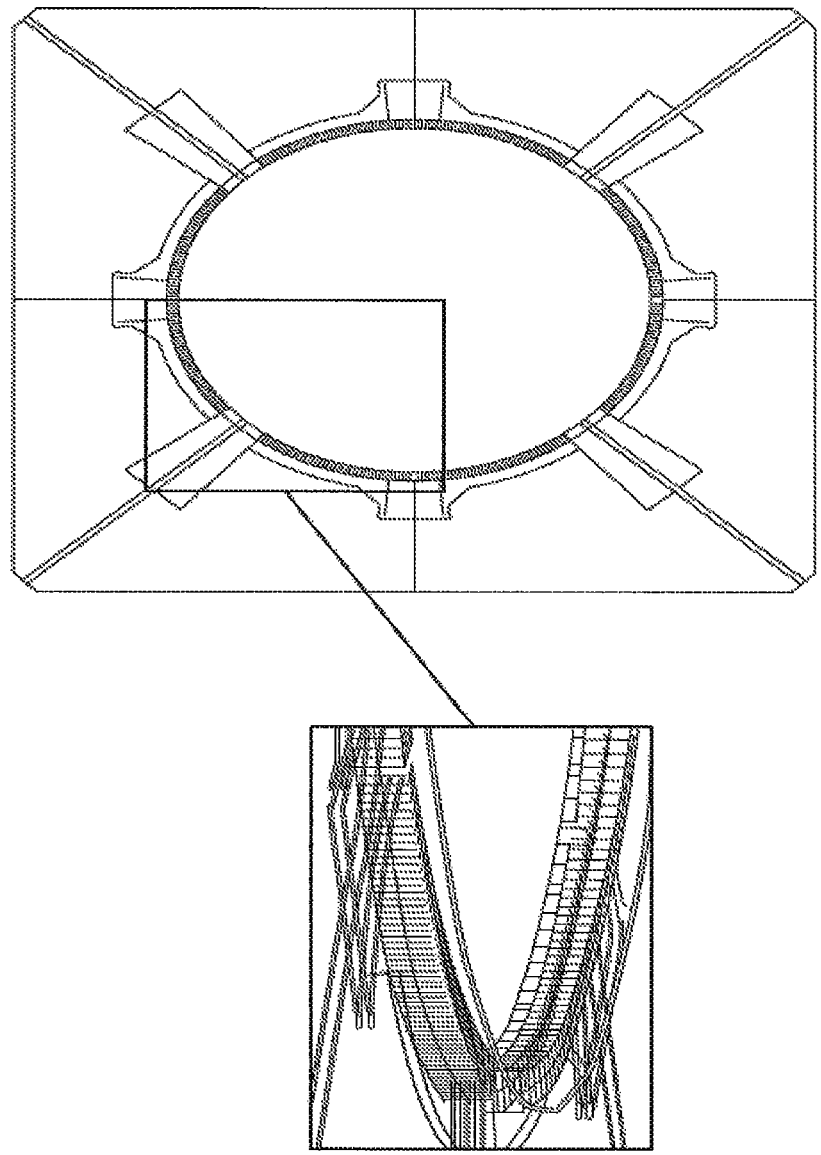
Figure 44:
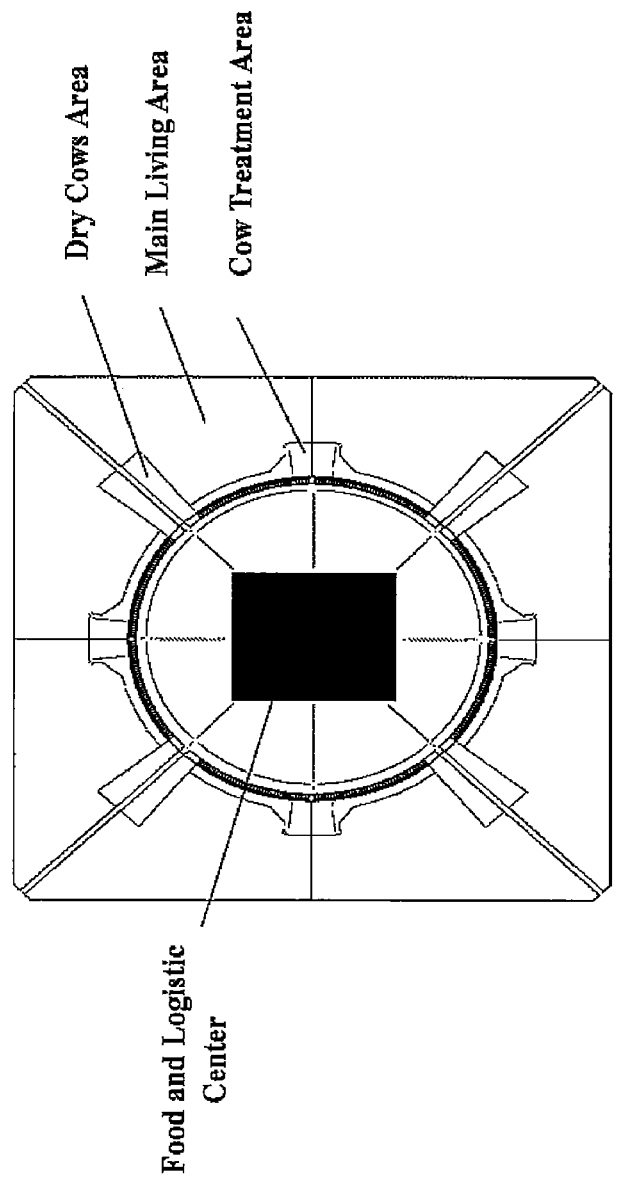
Figure 45:
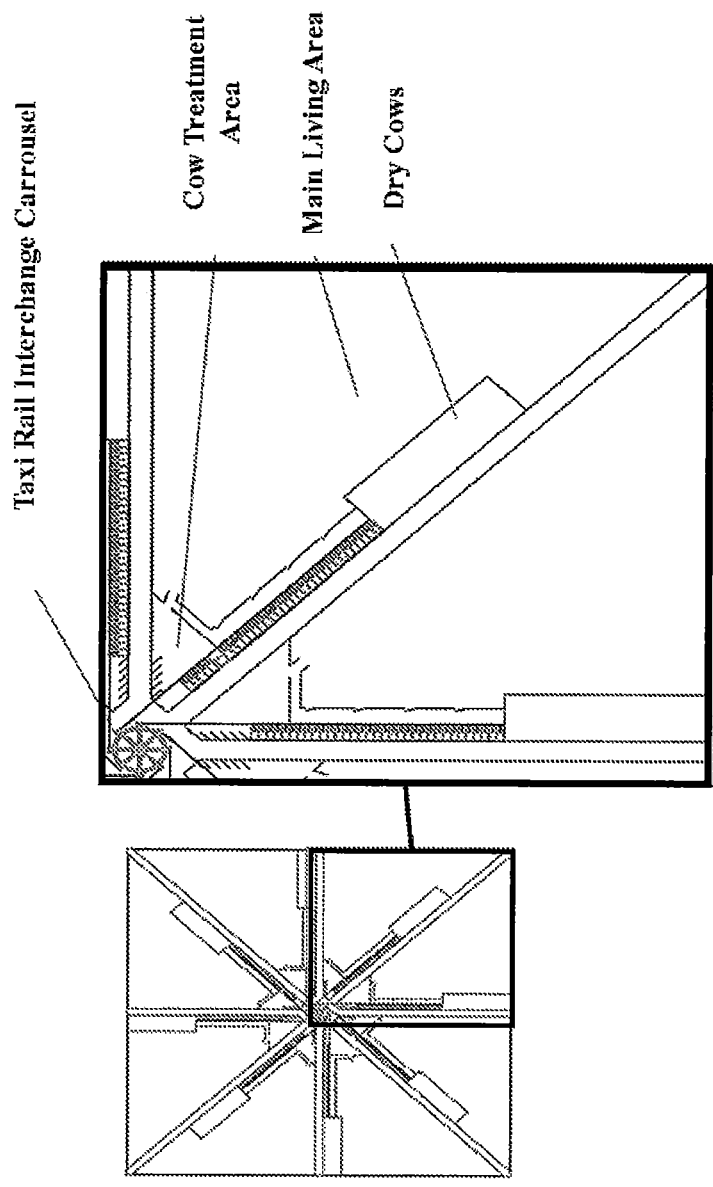
Figure 46:
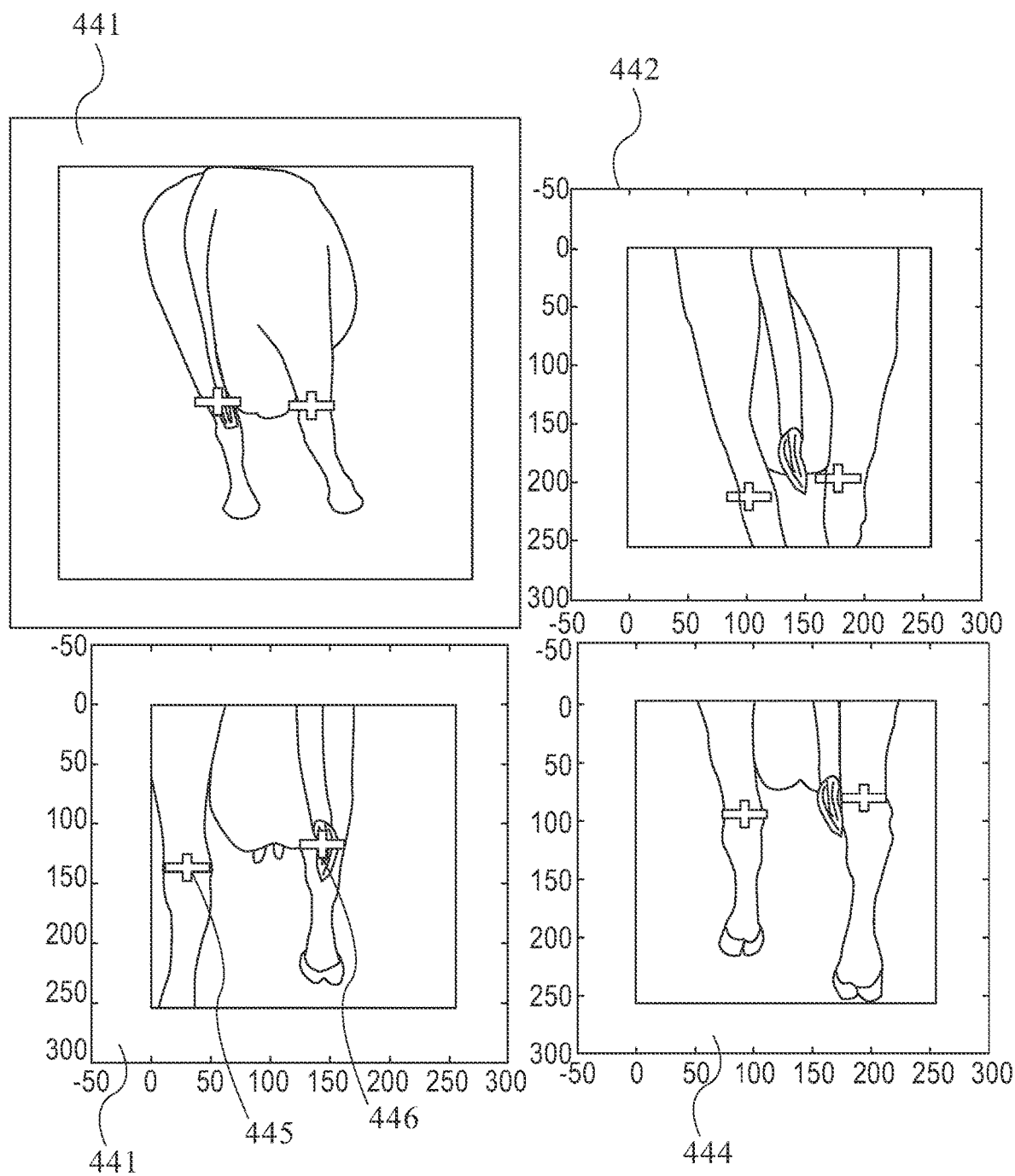

FIG. 10 schematically illustrates an FDR scheme according an embodiment of the invention;

FIG. 11 schematically illustrates an FDR scheme according an embodiment of the invention FIG. 12 schematically illustrates an FDR scheme according an embodiment of the invention;

FIG. 13 schematically illustrates an FDR scheme according an embodiment of the invention;

FIG. 14 schematically illustrates an FDR scheme according an embodiment of the invention;

FIG. 15 schematically illustrates an FDR scheme according an embodiment of the invention;

FIG. 16 schematically illustrates an FDR scheme according an embodiment of the invention FIGS. 17A-17F schematically illustrate a stall according an embodiment of the invention;

FIG. 18 schematically illustrates an FDR scheme according an embodiment of the invention;

FIG. 19 schematically illustrates an FDR scheme according an embodiment of the invention;

FIG. 20 schematically illustrates an FDR scheme according an embodiment of the invention;

FIG. 21 schematically illustrates an FDR scheme according an embodiment of the invention;

FIG. 22 schematically illustrates an FDR scheme according an embodiment of the invention;

FIG. 23 schematically illustrates an FDR scheme according an embodiment of the invention;

FIG. 24A schematically illustrates a set of three views of a first approach of a "messenger"-free "taxi"-enabling MMU-transporting system according an embodiment of the invention;

FIGS. 24B-24F schematically illustrates a few views of a second approach of a "taxi with a messenger" MMU-transporting system according an embodiment of the invention;

FIGS. 24G-24L schematically illustrates a few views of the MMU-extending system according an embodiment of the invention;

FIG. 25 schematically illustrates a set of three views of at least one of the following: TCA, TCA AM, MMUs, milking arms & modules thereof, operational units and sub-units thereof, operational axes (x,y,z) and schemes thereof, and degrees of freedom (D-Linear degrees of freedom—Moment degrees of freedom; e-elbow, s-shoulder, w-wrist) of their operation according an embodiment of the invention;

FIG. 26 schematically illustrates a set of five views of at least one of the following: TCA, TCA AM, MMUs, milking arms & modules thereof, operational units and sub-units thereof, operational axes and schemes thereof, and degrees of freedom of their operation according an embodiment of the invention;

FIG. 27 schematically illustrates stalls within an FDR scheme according to one embodiment of the invention;

FIG. 28 schematically illustrates stalls within an FDR scheme according to one embodiment of the invention, left—cow enters the stall; middle—Taxi transports MMU to its location; left—Taxi positions MMU next to upper docking station FIG. 29 schematically illustrates stalls within an FDR scheme according to one embodiment of the invention, Taxi loads MMU onto upper docking station's rails left—positioning the MMU; middle—loading the MMU; left—MMU docking;

FIG. 30 schematically illustrates stalls within an FDR scheme according to one embodiment of the invention; Taxi ejects its loading arms and loads the MMU to engage with in station, then retrieves ejection arms, right-Taxi ejection arm retrieve;

FIG. 31 schematically illustrates stalls within an FDR scheme according to one embodiment of the invention; Taxi moves to next mission; MMU is decent to lower docking station;

FIG. 32 schematically illustrates stalls within an FDR scheme according to one embodiment of the invention; after milking, vertical unit elevates MMU and waits for taxi pick up. Cow is free to leave the stall;

FIG. 33 schematically illustrates stalls within an FDR scheme according to one embodiment of the invention; Taxi arrives to station and engaged with MMU;

FIG. 34 schematically illustrates stalls within an FDR scheme according to one embodiment of the invention; Taxi pulls MMU;

FIG. 35 schematically illustrates stalls within an FDR scheme according to one embodiment of the invention; Taxi transports MMU to recycling station;

FIG. 36-41 schematically illustrate various views of TYPE IV milking assembly and its mode of use, introduction to teats and collapsing/retrieving according an embodiment of the invention;

FIG. 42 schematically illustrates a rail bend interconnecting two or more adjacent FDRs according an embodiment of the invention;

FIG. 43 schematically illustrates a rounded FDR, where food and logistic center is positioned at the middle of the FDR wherein the FDR is rounded or otherwise formed or arranged in a close structure being at least partially curved and/or is shaped as a polygonal manner, according an embodiment of the invention;

FIG. 44 schematically illustrate an embodiment of the rounded FDR, comprising, inter cilia a food and logistic center, a dry cows area, main living area and a cow treatment area;

FIG. 45 schematically illustrate a star-like FDR arrangement, comprising, inter alfa, a food and logistic center, a dry cows area, main living a real and a cow treatment area according an embodiment of the invention; and FIG. 46, displaying four camera photos of CRM-enabled middle crosses at cow's rear legs.

DETAILED DESCRIPTION OF PREFERRED EMBODIMENTS

The following description is hence provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide milking systems, sub-systems, modules, facilities, and especially cow's milking system comprising CPA&C and methods thereof.

Free Dome Range (FDR) is a disruptive technology, a paradigm shift in dairy farm layout, operations and supporting automation technology. It is significantly better than the prevailing dairy farm layouts, both loose housing (milking parlors & first generation milking robots) and tied-up barns. FDR better supports cow's health and welfare, enables optimal production of higher quality milk, improves operational margins, makes farm work easier and more satisfying and reduce land use.

It is well in the scope of the present invention to disclose a novel FDR approach, technology, system and sun-systems, methods and applications is presented (see figures below). In this FDR dairy animals have a free access to their stall to concurrently eat and to be milked in a synchronized manner. The FDR comprises, inter alia, a plurality of s stalls, s is an integer equal to or greater than one; at least one of the stalls is characterized by a front side and rear opposite side into which a dairy animal is at least temporarily accommodated, head fronting the front side; and a plurality of m main living areas (MLA), m is an integer equal to or greater than one; at least one of the MLAs is in connection with at least one of the stalls by means a plurality of g gates, g is an integer equal to or greater than one. The FDR further comprises a substantially horizontally positioned elevated rail system comprising a plurality of e elevated rails, e is an integer number equal to or greater than one; and a plurality of n mobile milking units (MMUs), n is an integer equal to or greater than one, each of the MMUs is configured to transport on the elevated rail to a dairy animal at its stall, and milk the animal while it is eating.

Cows spent about 30% of their daily time in waiting, which is about 8 hours a day: cows are waiting to be milked about three times a day, cows are manipulated to wait after these milking sessions to be maneuvered back to the range, waiting to eat, waiting in their way after eating, waiting to treatments etc. When transported, cows are physically and emotionally maneuvered and motivated. When maneuvered to their tedious daily routine, many cows lose their milking group etc. All this waiting, maneuvering, and losing their cow-friends harm the cow, harm its health, and irreversibly harm its milk productivity. The current FDR technology as defined, described, illustrated and claimed in the present invention eliminates the waiting, decreases the amount and force of animals maneuvering, improve animals quality of life and in return, increases milk productivity and animals short time and long time health. Hence, reference is now made to FIGS. 3 to 39, schematically present in a non-limiting and out-of-scale manner various embodiments of the hereto disclosed FDR, MMU, TCA and modules thereof. The hereto disclosed FDR approach and technology thereof discloses a novel, highly agro-efficient, economically preferable and animal's cruelty-preventing means for milking dairy animals, including inter alia cows. Money-wise, reduction in the 8 wasted hours is significantly increasing dairy farm profitability and business economic structure.

Much more than that, as phrased by Sir Francis Bacon: If Muhammad won't come go to the mountain then the mountain must come to Muhammad, see Essays, 1625. The hereto disclosed FDR technology revolutionary changes milking industry: anxious animals are not manipulated to come to the milking mechanism but the milking facility is brought to the animal in rest. Hence, reference is now specifically made to FIGS. 3-16, which illustrate an FDR according to a few embodiments of the invention.

As presented e.g., in FIG. 3, FDR (100) is a synergistic integration of various different modules located in various different defined locations: main living area (MLA1) having at least one exit gate (13); the MLA is interconnected to at least one eating area (2) by means of one or more unidirectional gates (3). Cows voluntarily movement form MLA to eating area is provided in a non-manipulating manner as cows go to eat whenever they please. In the eating area cows are fed within a plurality of open stalls (4), e.g., whereas feed is supplied, accumulated, arranged, adjusted and otherwise bandied by means of a movable feeding unit (MFU, see ellipse 5). Whilst feeding, in a computerized manner, one or more mobile milking units (MMUs, see squares 6) may move if needed in order to milk those feeding cows that need to be milked.

Milk is flown from cow's teats, by means of the MMUs, to one or more milk containers, via milk piping; wherein milk containers are selected in a non-limiting manner from a group consisting, inter alia, a movable MMU container, an array of two or more milk collecting containers (see triangles 7), a central container (not shown here) and any combination thereof. After feeding, cows walk in a non-manipulating manner to either MLA or treatment area (10) via unidirectional separation gate(s) (11). Whilst in treatment area (9), cows can be further fed, e.g., in preparation and cup placement unit (PCPU, 8) configured for teat preparation and attachment. Further treatment may be provided in chute (12). Cows in treatment area can be milked, using MMU, MCPCPU or PCPU, in the same way as in the eating area (2).

It is in the scope of the invention wherein according to an embodiment of the technology, milking containers are integrated module in the MMU, thus milk is flown direct from teat cups, through milk lines (tubes) to the container, one container for all four teat cups or four containers, one for each teat cup for milk from each quarter, thus perform quarter milking (individual attachment, milking control and measurement and detachment of each teat cup and quarter). Milk form one container, for example the aforesaid integrated-container-MMU, is emptied to another container as the MMU is moved by the transport system, e.g., along the suspended rails. Hence, milk can be transported by a pipeline line system, by moving milking containers to other containers, or emptying and recycling unit for emptying the milk or by any combination thereof.

It is in the scope of the invention wherein according to an embodiment of the technology, wherein the MMU and its milking subsystems are configured to milk each of cow's quarter separately, then analyze, transport and contained it (if necessary) separately; so milk for infected quarter(s) is not contaminating other milk.

As partially illustrated in FIGS. 9A-9B and other drawing attached below, fed cows are continuously and uninterruptedly directed to move, when they please, in a non-manipulated manner, without-queues and blockages, from MLA, to eating area, optionally then, via treatment area, back to MLA, and so on and so forth.

It is well within the scope of the invention wherein the term 'cow' is interchangeably referring to any member of the families of cows, buffaloes, sheep, goats, and any other milk producing farm animal.

FDR production cost is estimated to be $1,000 per cow. At an estimated sales prices of $3,000 per cow (similar to the cost of first generation milking robots and advanced modern milking parlors), the company expects to within 6 years sell and install products worth $50M in about 70 farms, averaging 250 cows/farm. This market is provided by the compelling operational gains and the increasing difficulty in getting skilled milking labor.

It is shown below that FDR discloses gains expected if a farm opts for FDR vs. a modern milking parlor or a $1^{st}$ generation milking robot. Based on these gains, FDR enables to sell into most of the new farms and into farms seeking to modernize/replace an outdated milking parlor or first-generation robots. It may also be possible to sell into dairy farms with a more current milking parlor who want to automate and find a solution to the challenge of hiring adequate milking staff. Farms with recently introduced robots are not likely to opt for FDR before their robots wear out.

The FDR as presented in this invention is a cost effective and economical feasible technology. One may expect to be able to sell into most of the new farms and into farms seeking to modernize/replace an outdated milking parlor or first-generation robots. It may also be possible to sell into dairy farms with a more current milking parlor who want to automate and find a solution to the challenge of hiring adequate milkers. Farms with recently introduced robots are less likely to opt for FDR before their robots wear out.

It is in the scope of the present invention wherein the arrangement, architecture and modules integration of this novel cow's loose housing is provided useful for milking cows whilst the free (not tie) cows are eating feed that is suggested and introduced to them e.g., their (potentially customized) total mixed ration (TMR), without any disturbance.

It is also in the scope of the invention wherein a few MMUs effectively cover a single FDR, barn/yard.

Reference is now made to FIG. 8, illustrating an embodiment of the invention wherein an array of FDRs is disclosed. In this array, at least some of the streets (here, a sequence of FDRs in parallel to the X axis, namely X1Y1, X2Y1, XnY1; and X1Y2, X2Y2, XnY2 etc.) and avenues (here, a sequence of FDRs in parallel to the Y axis, namely X1Y1, X1Y2, X1Yn; and X1Y2, X2Y2, XnY2 etc.) are interconnected by means of mutual ER, e.g., streets ER (51, 52), avenues ER (53-55) and interconnected streets/avenues ER subsystems and main system (51-55). Naturally, it is possible to connect FDRs in any other geometry and also share other resources between them.

It is acknowledged in this respect that milking stations can be arranged in many geometries, along lines, corners, inner and outer circles or ellipses etc. furthermore, PCPUs can move independently from MMUs and temporarily align with them for the purpose of milking or may be permanently or semi permanently fixed to them. Additionally or alternatively, cup placement can be aided or guided by a human operator.

Figure 40:
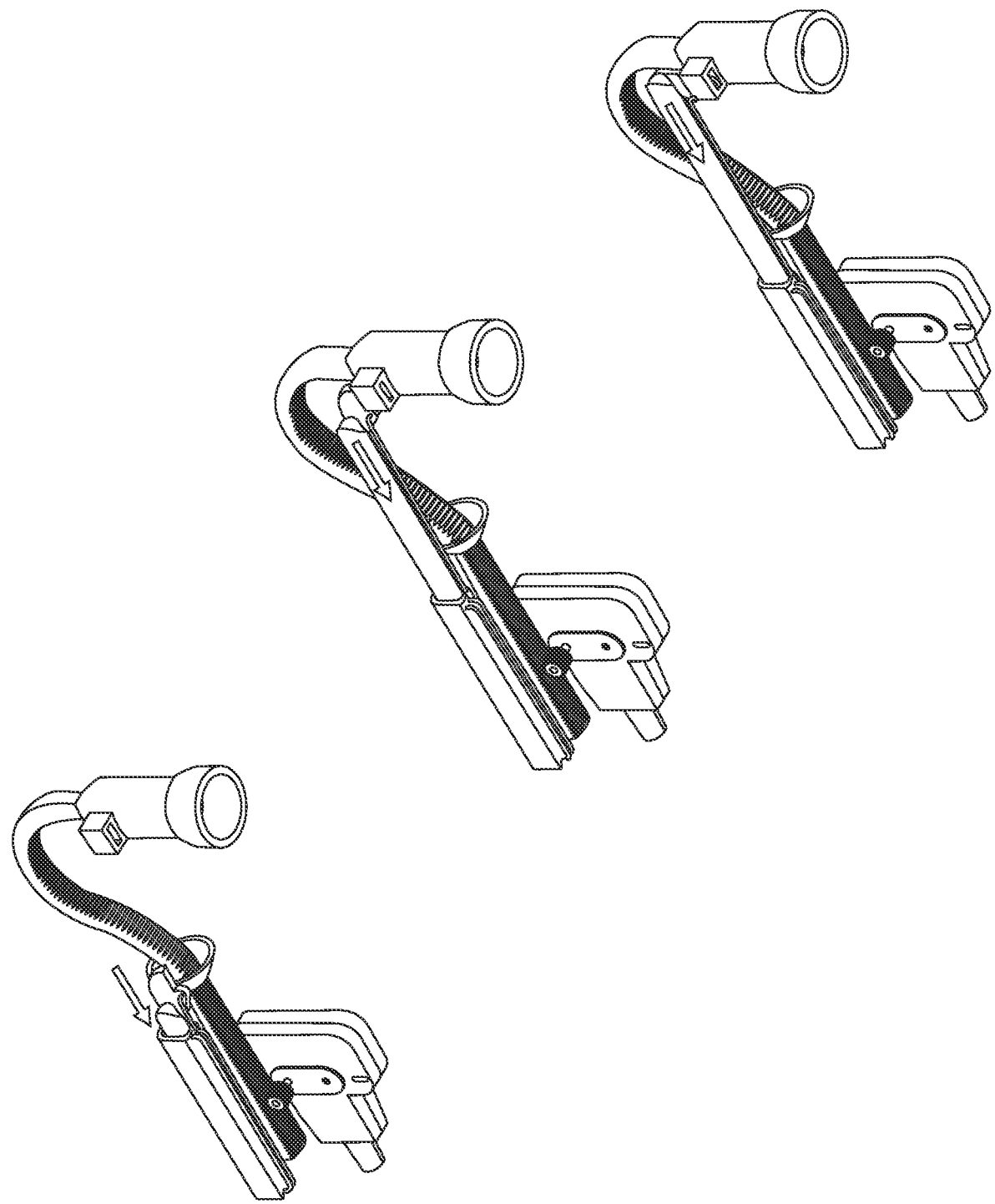
Figure 41:
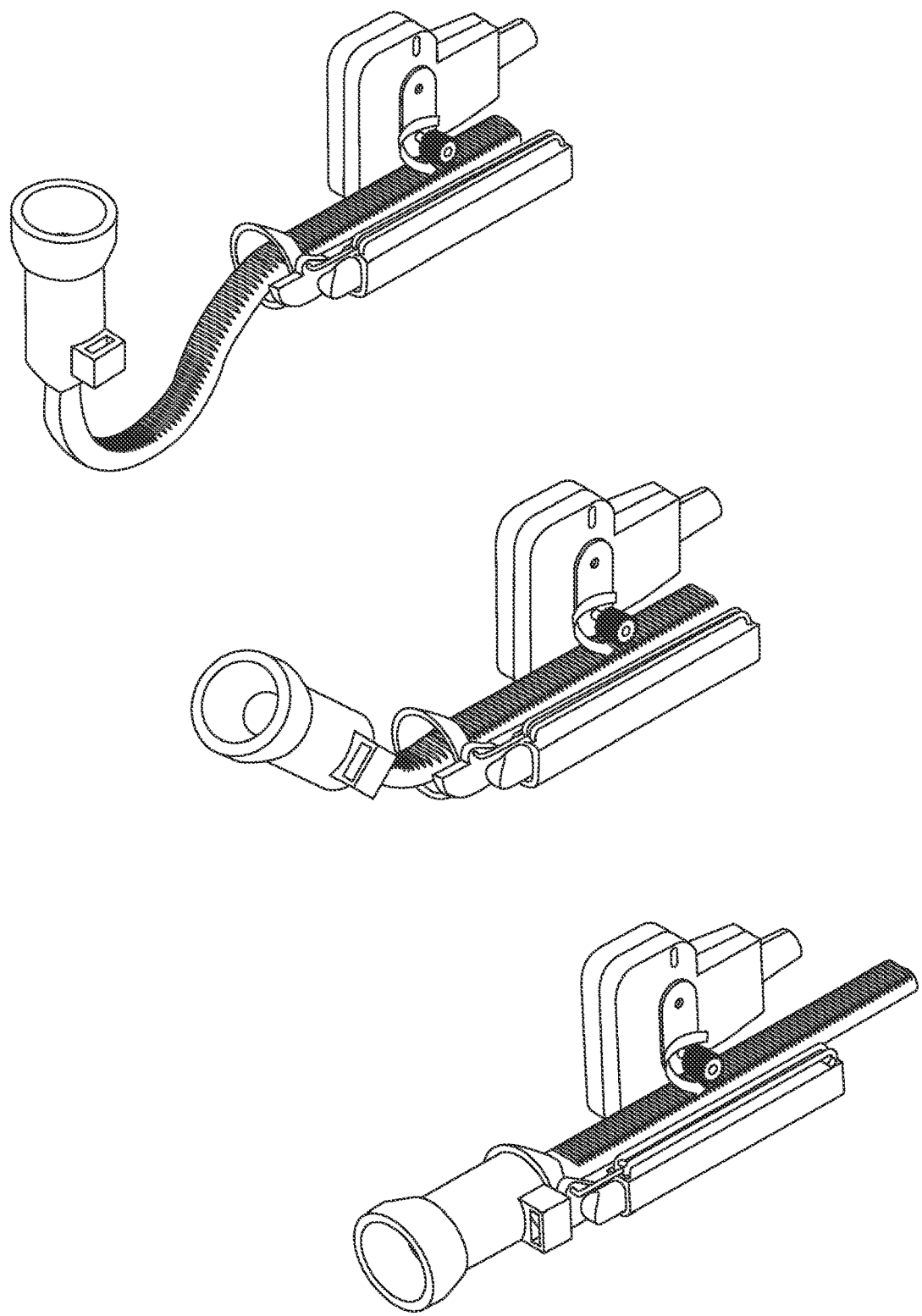

FDRs arrangements and arrays as described above may vary is shape and size: rectangular shapes, circular shapes, star-like shapes etc. hence, Reference is now respectfully made to FIG. 40, schematically illustrates a rail bend interconnecting two or more adjacent FDRs according an embodiment of the invention. FIG. 41 schematically illustrates a rounded FDR, where food and logistic center is positioned at the middle of the FDR wherein the FDR is rounded or otherwise formed or arranged in a close structure being at least partially curved and/or is shaped as a polygonal manner, according an embodiment of the invention. FIG. 42 schematically illustrate an embodiment of the aforesaid rounded FDR, comprising, inter alia a food and logistic center, a dry cows area, many living barn and a cow treatment area. FIG. 43 schematically illustrate a star-like FDR arrangement, comprising, inter alia, a food and logistic center, a dry cows area, many living barn and a cow treatment area according an embodiment of the invention It is also in the scope of the present invention wherein MMU (6,) is configured to come to and approach static cows at time of their feed, not a milking system whereat maneuverable cows are manipulated to come to a static robot.

As is stated above, it is also in the scope of the present invention wherein cows are intuitively and freely passively suggested and enabled to move from one area and one activity to other area and other activity, all is provided by arrangement, architecture and modules integration of this novel cow's loose housing, without application of stressful manipulation as utilized in the art.

It is also in the scope of the present invention wherein an array of elevated rails, e.g., overhead and/or suspended rails, all be interchangeably referring herein as an elevated rail, ER, are utilizes for MMU's (6) movement. Hence, according to one embodiment of the invention, ER is configured in such manner that it is located above and on top of one members of a group consisting of (i) the aforesaid FDR, (ii) any regular and ordinary (non-FDR) barn or dairy-yard, and (iii) portion of the same. Such an ER is designed not to disturb the milking cows, and to fit any barn/yard arrangement, size and location, a disadvantage of some of the commercially available rails which are located at ground level, i.e., aside yards and stalls. It is acknowledged in thus respect that all or some of the mobile units are movable by various means and methods, such as by cables, chains or are self-propelled.

It is also in the scope of the present invention wherein milking pipes are provided in physical connection with the ER It is thus according to an embodiment of the invention wherein milk, milked from cow by the MMU, is flown throughout milk pipes from MMU, along ER to a central collecting container, to one of an array of collecting containers, or to a combination of the same. Additionally or alternatively, MMUs are also able to move along the rails and dock to the central recycling unit to empty the milk and to be treated. The emptying/Recycling unit can be connected directly or by a pipeline to a central collecting container to be able to wash the unit and the milk pipelines.

According to one embodiment of the invention, an MMU is designed to approach cow from its lateral and/or rear sides. A sequence comprising a set of three steps is provided here useful: step one is important is to reach a start position for the MMU behind the cow; step two, begins from this position, the PCPU or MPCPU is manipulating the teat cups to a second position where it "sees" the teats of the cow; and step three is the attachment.

MMU is transportable between neighboring barns. As an example, an MMIJi is located at $T_0$ in barn X2Y3. After having finished milking a cow there, automatically by computer assisted milking protocol and MMU's movement control (CAP&C) and transferred to a neighboring barn, e.g., one of the following direct neighbors X2Y2, X1Y3; or indirect neighbors X4Y3, X2Y1or X1Y4, to milk a second cow there and at Ti. CAP&C hence optimizes milking performances and reduced operational costs. It also increases system overall reliability by making it possible to overcome malfunctions in single units, reduce need for spare capacity and provide graceful performance degradation.

The technology avoids milking queues. CAP&C assisted FDR avoids cow's fatigue and stress, thereby reducing milk losses and cow injuries, due to the daily never-ending milking-queues typical of the current art, as illustrated in FIGS. 1 and 2.

Not less important, as cows are highly social animals, the hereto described technology avoids cow's stress related to its temporal or permanent segregation from its milking group, as was defined earlier. The technology ensures cows can continuously and uninterruptedly stay in their secure-social-environment provided by the group inhabiting their FDR, thereby avoid further cow's stress, loss of milk, injuries and further increase cow's health and general well-being. Even when they need to be temporarily separated for treatment, they can interact with other members of their own group and see yet other members.

Automatic separation also drastically minimizes the need for people to be inside the MLA, thus again reducing disturbances for the cows.

The technology hereto presented provide small, young and relatively passive cows an equal opportunity to approach both feed and milking; rather than establishing and maintaining harmful dominant-cow superiority in respect to food access, access to milking facilities etc. as is characteristic of most current art.

This technology is further provided useful, in managing dry cows; dry periods etc. by the synergic means of its individually operated NMUs, and aforesaid unique FDR architecture. Drying and dry cows no longer need to be separated from their group.

Likewise, this technology provides unexpected superior results in all aspect related with cow nutrition, especially in automatically and faultlessly providing feed of personalized nutrition to individual cows. Thus for example, special low-energy feed is served to dry cows. Likewise, personalized medical care, administrated in parallel to and in online connection with the personal nutrition, is made possible by the aforesaid cost effective unique FDR arrangement, see for example Treatment area (9, see FIG. 3 and also in FIGS. 9A-9B) which online follows MMU operational area (2).

The novel FDR and its special arrangement, characterized by scalable MMUs subsystem(s) operative by CAP&C operator(s) as presented above, provides a possibility for personalized (individual) cow' management, rather than a statistical non-individual milking-group' management as is practiced today.

It is also in the scope of the invention, wherein yard can accommodate, in any specific time interval, any number of milking groups. The MMU, CAP&C-wise, is directed towards a predefined cow, and NOT targeted to specific milking group.

Hence, it is further in the scope of the invention wherein the hereto defined novel FDR, CAP&C and modules thereof are provided useful in customizing and improving milking-intervals and milking-frequencies as defined and explained above, of any specific cow, at any time, any health condition etc.

FDR of the present invention elaborates free-accessed feed techniques. One aspect of the current technology hence involves with minimization of cow's manipulation. The novel role here is that the MMU is CAP&C-wise manipulated to cow, where cows are never manipulated to the milking facilities but rather milking is done, "by the way", if and when needed, when they feed.

FDR, MMUs, CAP&C etc. are of scalable system, arrangements, sub-systems and modalities thereof, means of operation, control etc. All are designed and configured to ensure both (i) careful, step by step cost effective enlargement of facilities if and when farms grow in size and (ii) possibility for significantly large scale-up of FDR's capacities, capabilities, size and dimensions supporting large farms (thousands of cows) and mega-farms (tens of thousands of cows). Hence for example, First FDR may comprise two MMUs, three neighboring barns (e.g., a X1Y1, X1Y2 & X1Y3 module), then a Second slightly developed FDR comprises three NMUs in a X1Y1 to X2Y5 module). Otherwise, one order of magnitude and significant scale-up is provided when second FDR comprises e.g., four NMUs CAP&C-wise operative in an approximated square arrangement of nine neighboring barns (e.g., a X1Y1, X1Y2 &

X1Y3; X2Y1, X2Y2 & X2Y3 and X3Y1, X3Y2 & X33Y3 module), and so on and so forth.

As regard to above mentioned U.S. Pat. No. '058, the integration of hereto disclosed FDR, MMUs, CAP&C synergistically enhanced milk production and reduces both cow stress and operating costs by providing portable milking units which are designed to approach the cow in need, without manipulation required by milking systems in the art.

U.S. Pat. No. 8,291,860 "Apparatus and method for positioning a teat cup" by Delaval Holdings Ab which is incorporated herein as a reference, discloses an apparatus and method for locating a teat cup for use in a milking parlor. The apparatus includes a milking stall provided on a rotatable platform and a system for controlling movement of a teat cup magazine relative to the stall. The movement control system permits movement of the magazine between first and second predefined positions relative to the milking stall. This invention does not disclose however use of camera to indicate cup location in the vicinity of cow's teat.

It is also in the scope of the invention wherein FDR further comprising, or otherwise provided in connection with one or more additional auxiliaries, modalities and utilities (facilities in short).

It is thus in the scope of the invention wherein FDR further comprises at least one cultivation facility. In one embodiment, a robotic cultivator is applied to dry and otherwise treat (induce processes for manufacturing and utilizing compost by introducing oxygen into the soil) barn's floor. In another embodiment, a robotic cultivator is automatically utilized for robotic floor cleaning, soil erosion etc. Its operation is provided by one or many ways, such as manually controlled manner, automatically by processor in connection with computer readable medium means, and robotically, in a way robotic floor cleaner is operated in a given area, in connection with MMU and sensors thereof (see camera definition below), in control of the CPA&C and a combination thereof.

It is acknowledged in this respect that various other facilities are connectable and operable in hereto disclosed FDR A non-limiting list of the same comprises, inter alfa, at least one milk containers; power and general supplies and lines thereof, where power and general lines include e.g., energy (mechanical power, heat, electricity etc.), steam, compressed air, process and cleansing and/or disinfecting fluids, vacuum, fluid outlet means and sewage thereof, etc.; raw material supplies and lines thereof, including e.g., animal feed and ingredients thereof, drinking water etc.; product containers and lines thereof, especially milk temporary containers, final product milk container, and lines thereof. Lines are provided in any suitable manner, including under-floor, floor and upper (elevated) suspended, hanged or floated lines, e.g., lines immobilized or otherwise affixed to upper rails. Examples of such an upper (elevated) suspended rail and an FDR of various arrangements comprising the same are provided, inter alia, in FIGS. 7, 17A, 19-22, and 24A-24F.

Figure 17A:
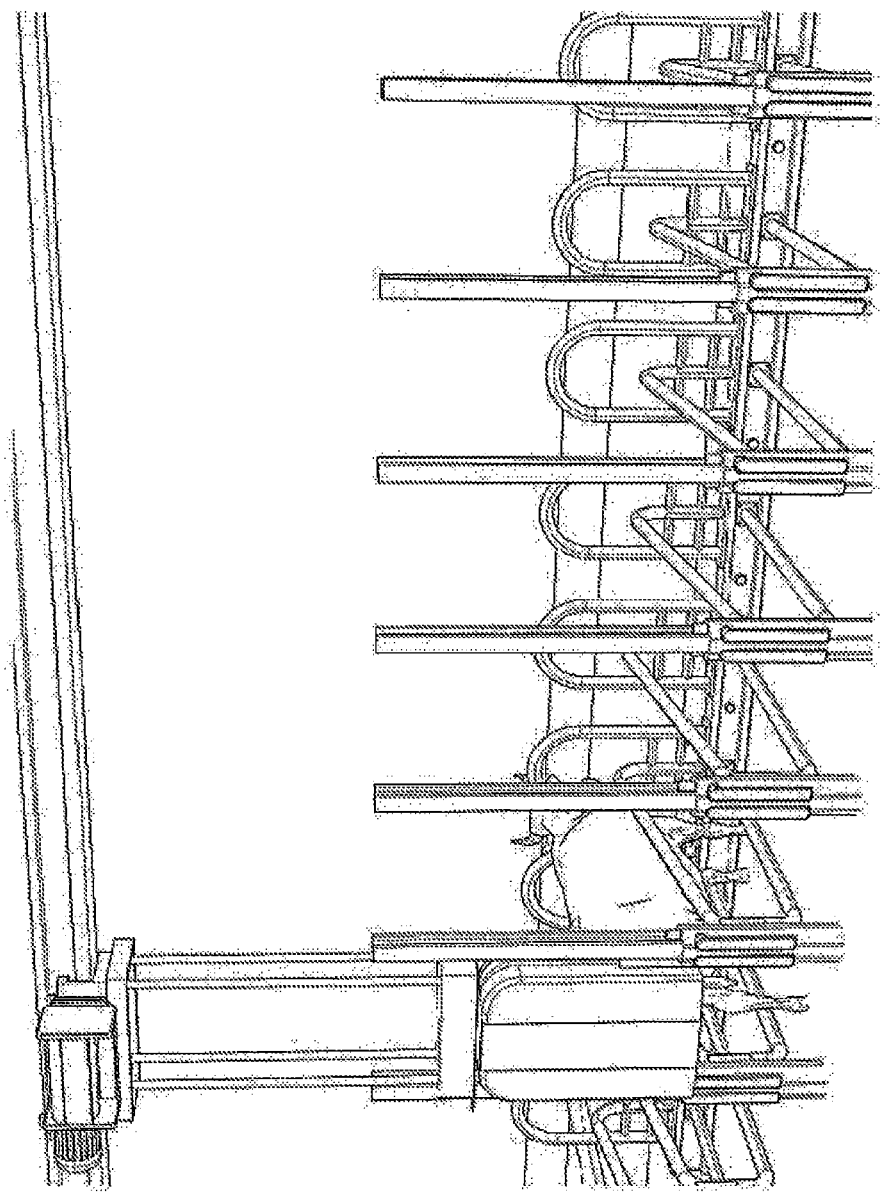
Figure 17B:
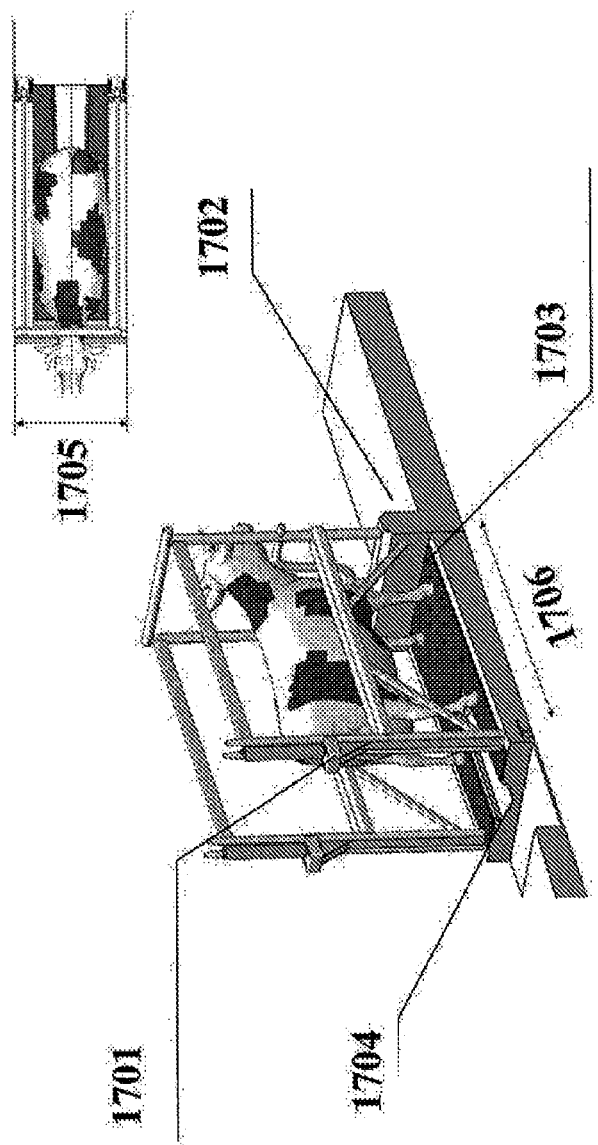
Figure 17C:
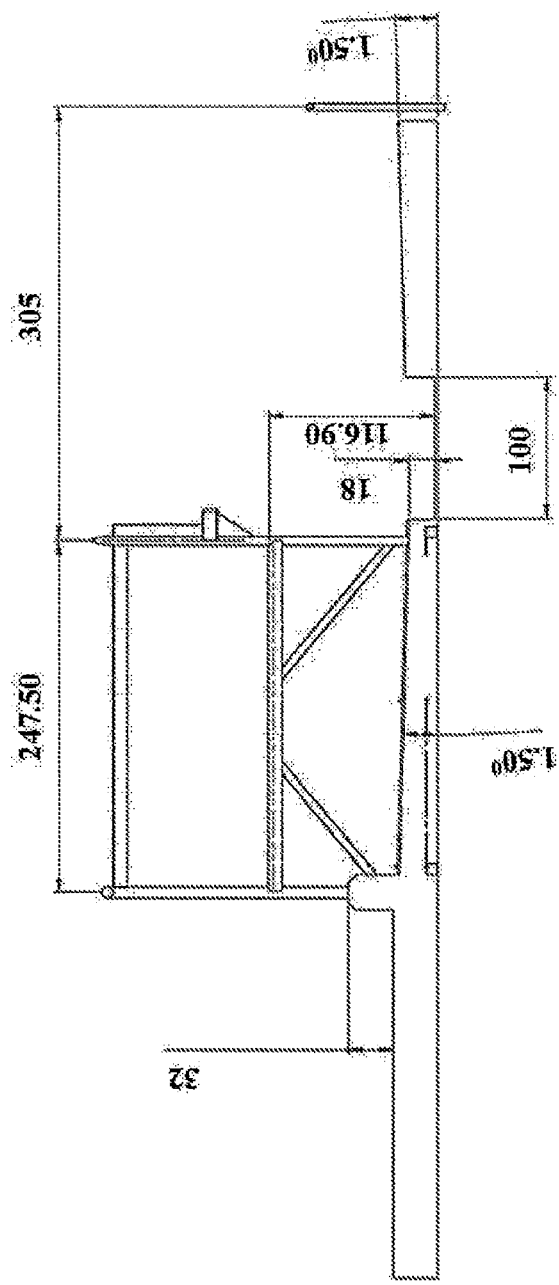
Figure 17D:
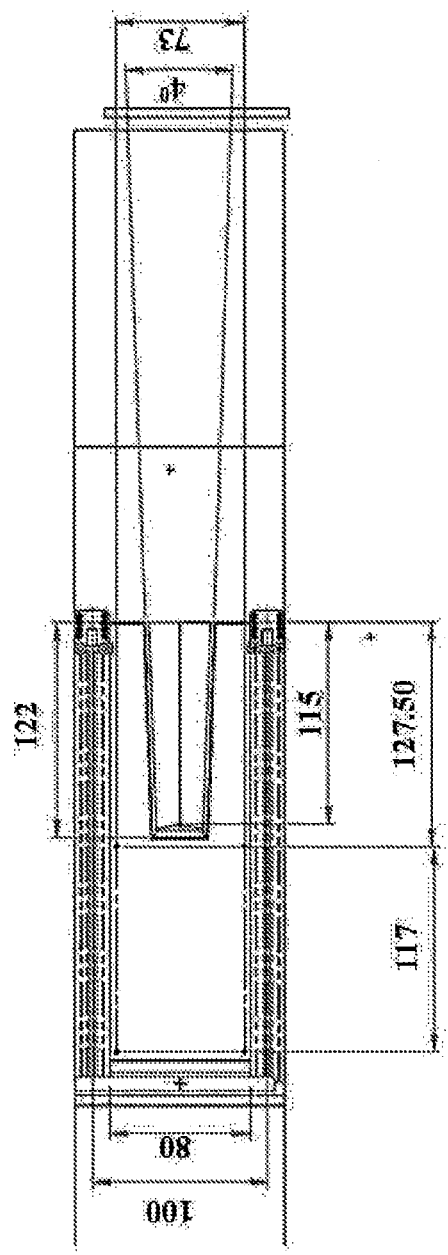
Figure 17E:
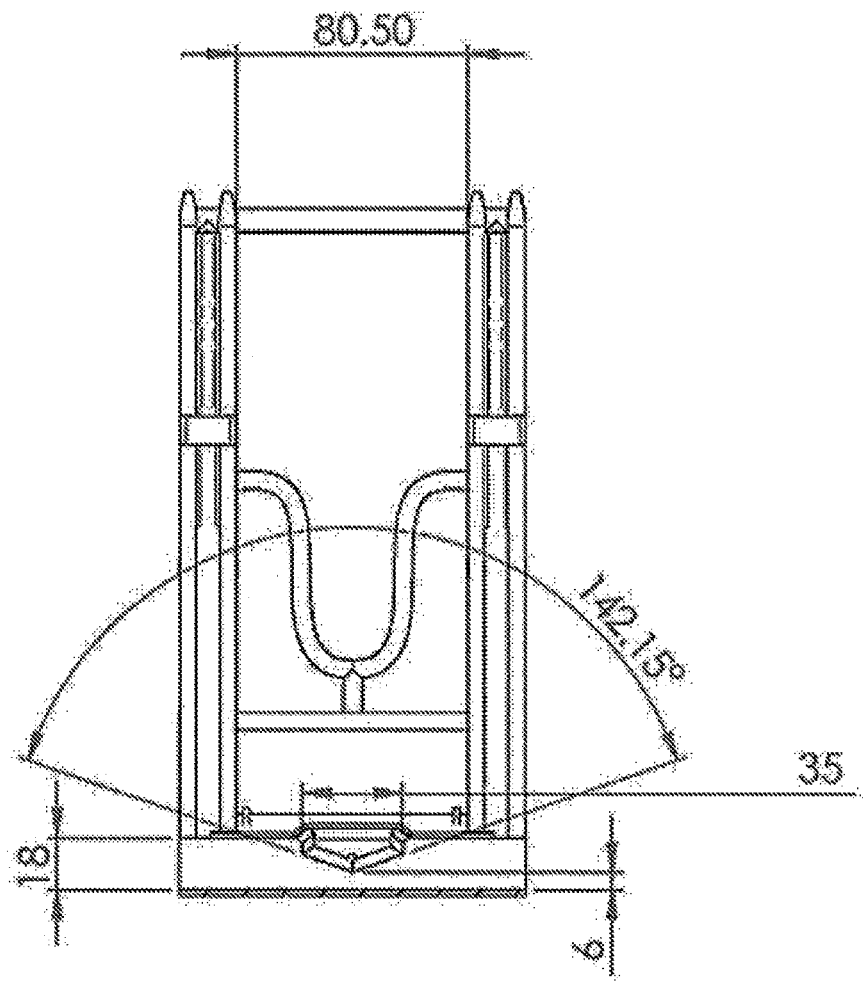
Figure 17F:
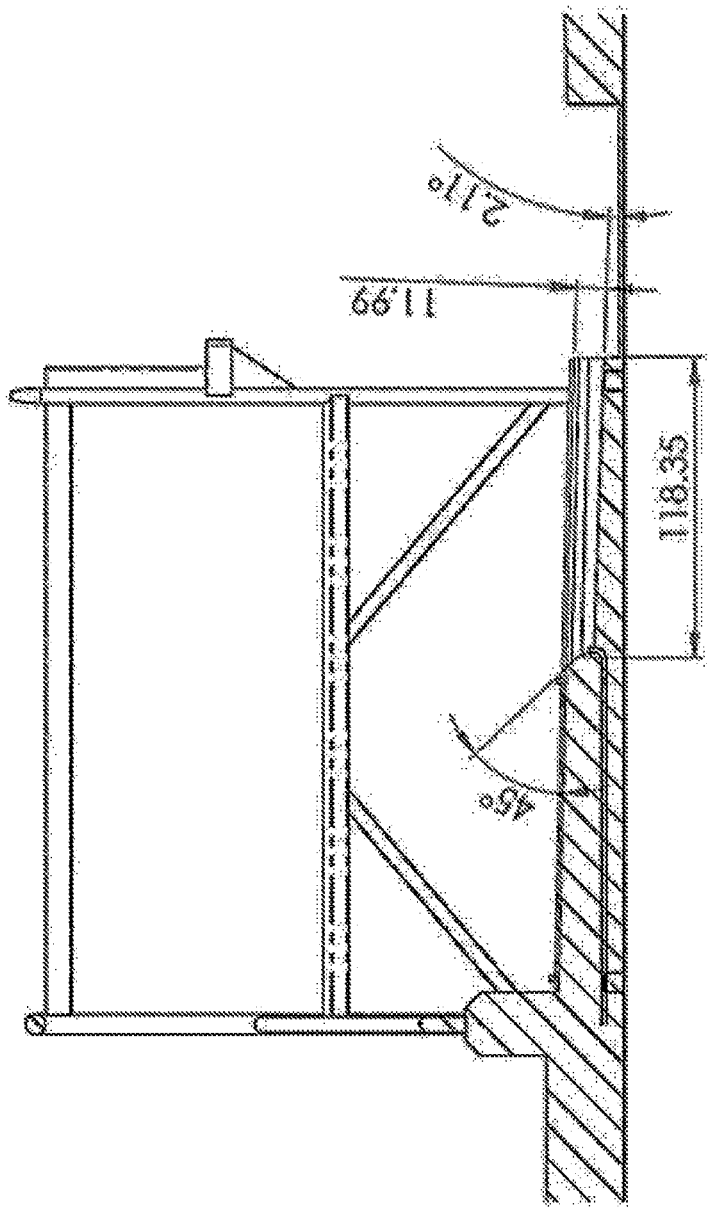

Reference is now made to FIG. 17B, illustrating a stall and milking station according to yet another embodiment of the invention. MMU's service intakes and docking stations, interconnected with and comprises inter alia water, power, air, vacuum supplies and fast connectors (1701), Feeding line (1702), a plurality of high pressure water sprinklers, e.g., about six sprinklers configured to wash (i) the stall's floor (ii) (1703), Waste drain (1704), Stall width is about 80/100 cm, inner/outer dimensions, respectively, width entrance side is about between 73 to about 80 cm (1705) and stall length is about 247 cm (1706).

Reference is now made to FIGS. 17C-F each of which illustrates the unique dimensions of the stall defined above, wherein the floor is tilted (about 1.5 deg.) towards the main drain (about 100 cm width), about 18 cm step; stall drain, being substantially perpendicular to the main drain, is a concaved recess (about 142.15 deg.), about 35 cm somewhat conical width (about 4 deg. spread), about 12 cm deep, about 115/122 cm length (net/brute, respectively), FIGS. 24A-L to 33 further disclose at least one of the following: FDR, TCA, AM, MMU, milking arms & modules thereof, operational units and sub-units thereof, operational axes and schemes thereof, and degrees of freedom of their operation according yet other embodiments of the invention. It is further acknowledged in this respect that according to one embodiment of the invention, MMU(s) comprising autonomic facilities. Hence for example, regarding milk outflow system, MMU comprise or is provided in temporal (occasional) or continuous connection with one-cow or one quartile milk container(s), power facilities and lines thereof. According to this embodiment, milk of one or a few cows is kept in or in connection with the MMU, until it's facilitated flown to a subsequent milk container by milk transport lines or the MMU is moving to the milk container and empty the milk. Alternatively or additionally, milk from MMU is immediately directed via array of appropriately constructed milk lines to a remote milk container without a temporal stay in MMU's milk container. Alternatively or additionally, milk from MMU is directed to either movable or stationary MMU-satellite facility which at least temporarily accommodates milk in its container.

Reference is now made to FIG. 24A disclosing a first approach of the mobile milking system, MMU and subsystems thereof. Here, the milking unit glides on a rail above the stall line to approach the cows from the back. An autonomous and/or at least partially online operated & controlled "Taxi" unit drives the milking unit along the rail to the stall. The movement of the taxi is substantially horizontal movement, along X axis and Y axis).

A second approach of the mobile milking system, MMU and subsystems thereof is hereto disclosed. The autonomous and/or at least partially online operated & controlled MMU is similarly horizontally transported along an elevated rail by the aforesaid "taxi", yet the substantially vertical movement is enabled by means of at least one "messenger", i.e., an MMU-transporting mechanism which vertically downloading the MMU downwards from the elevated rail to a lower docking station provided within or in connection with the stall. After the cow is being milked, the messenger uploading the MMU upwards to the Taxi.

Reference is now made to FIGS. 24B-24G disclosing a second approach of the mobile milking system, MMU and subsystems thereof. Here again, the autonomous and/or at least partially online operated & controlled MMU is horizontally transported along an elevated rail by the aforesaid "taxi", yet the substantially vertical movement is enabled by means of at least one "messenger", i.e., an MMU-transporting mechanism which vertically downloading the MMU downwards from the elevated rail to a lower docking station provided within or in connection with the stall. After the cow is being milked, the messenger uploading the MMU upwards to the Taxi.

Where first horizontal MMU movement along an elevated rail or equivalent thereof is enabled by the Taxi mechanism, and second vertical movement is enabled by the Messenger, lower horizontal movement of the milking apparatus, from the docking station to the lower rear side of the cow is enabled by a third mechanism namely the MMU' extender.

Figure 24G:
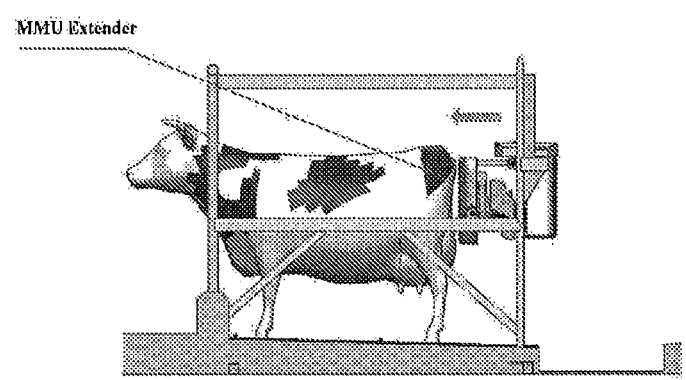
Figure 24H:
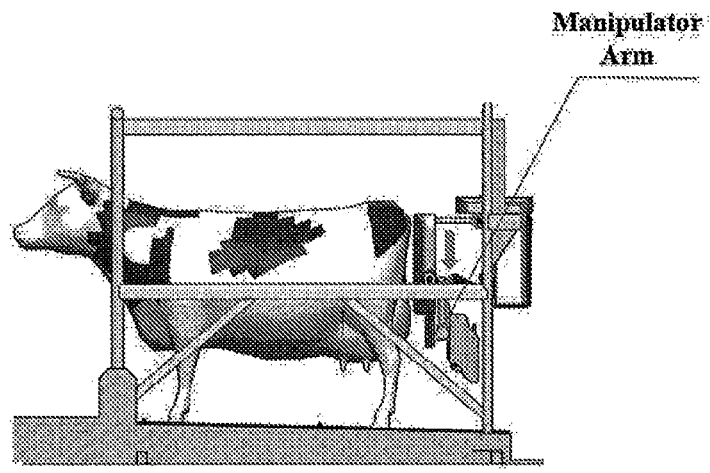
Figure 24I:
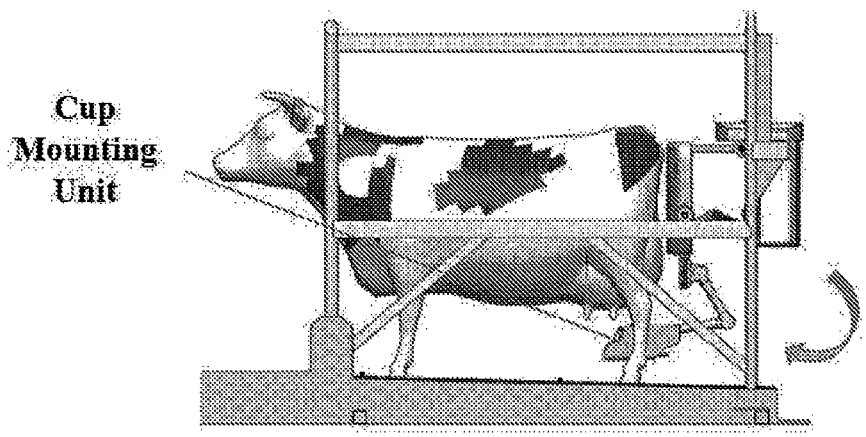
Figure 24J:
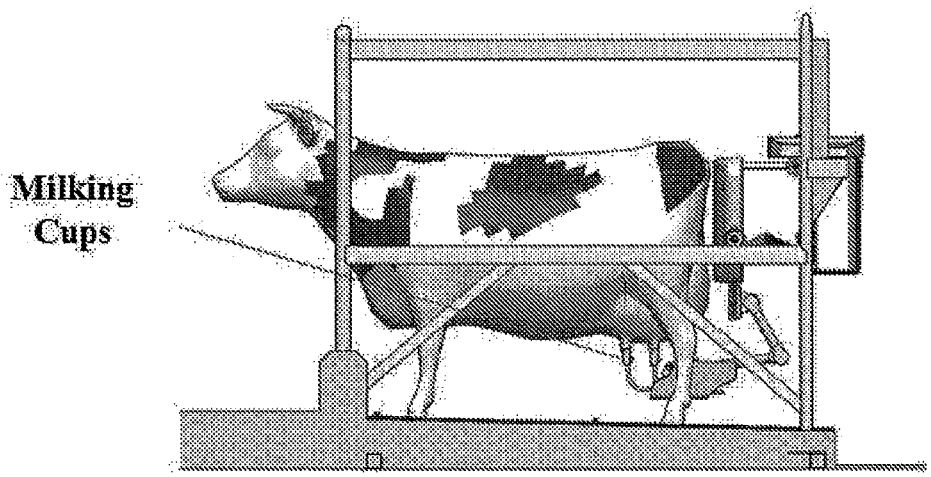
Figure 24K:
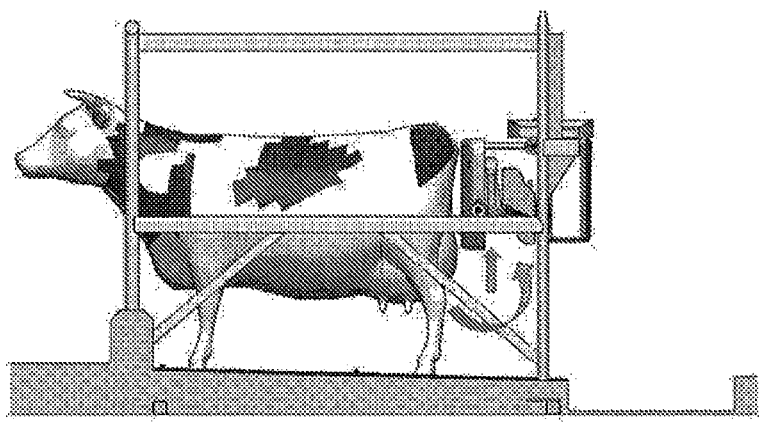
Figure 24L:
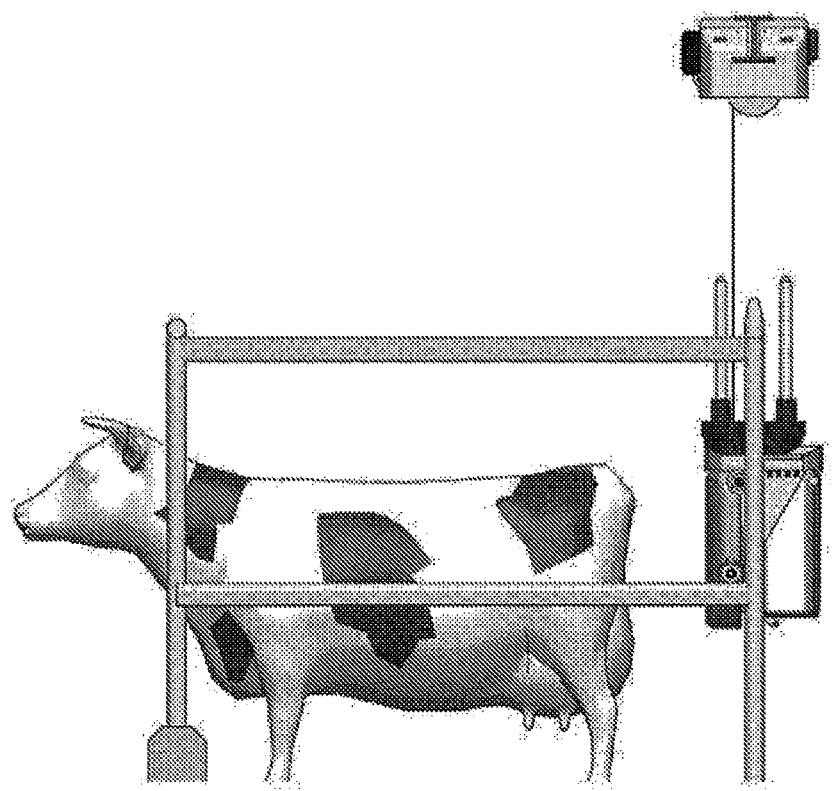

Reference is now made to FIGS. 24J-24G disclosing yet another aspect of the invention where the extender is reversibly approaching the milking assembly towards cow's teats. One embodiment of such a milking assembly is presented below at TYPE IV mechanism, see FIGS. 36-41

MMUs are in connection with other autonomic facilities, such as recycling stations, in which milk is collected, MMUs are docked to and emptied. Milk is measured for quantity and is analyzed for the chemical and biological components of the whole udder from one container, or from each quarter of the cow from four containers. Thus abnormal milk is separated from one or more quarters or from the whole udder. Then, MMUs are recycled, cleaned, loaded (by, e.g., water, and consumables), and served. Milk transports to a central container for store and collection. Autonomic facilities hence further includes cleaners of the milk containers.

Regarding power and any other supplies inflow from the outer FDR environment towards MMU, according to one embodiment of the invention, power and other supplies are directly provided to MMU via fixed lines, e.g., rail-mounted lines. Alternatively or additionally, power and other supplies are indirectly provided to MMU, e.g., via an MMU-satellite device, being e.g., an MMU-wagon carried means, movable facilities-station, stationary facilities-station, other MMU or onboard MMU storage tanks for electricity, water and other needed supplies.

It is thus further in the scope of the invention wherein a teat-cup assembly is introduced. This interactive, communicable teat cup assembly (TCA) comprises (a) four cups which are designed to be introduced to teats either (i) simultaneously and concurrently, or (ii) in a predefined order or dynamically decided order; (b) a TCA manipulator (AM), configured to actuate the teat cups distal end towards cow's teat end, (c) at least one camera in connection with the TCA, set focused on both cups and teats thus determines the spatial 3D orientation of teat cup(s) at the vicinity of the adjacent teat(s); and (d) computer readable medium (CRM) in either cordial or wirelessly communicated with the camera, having instruction for the AM to actuate the teat cups towards cow's teats.

The term "camera" denoted hereinafter to any sensor or encoder of images, e.g., in IR, NIR, or observable spectra with any suitable lens assembly, designed to capture 2D or 3D information (e.g. by stereoscopic means and/or time of flight measurements and/or any other means) or a sensor based on acoustical data. The term equally refers to digital or video images capturing modules, sensors and apparatuses thereof, and is used for at least one apparatus, where two, three or more cameras can be utilized. In a non-limiting manner, both CCD and CMOS digital camera(s), with or without zoom, are provided useful for this purpose. In an embodiment of the invention, the term also refers to at least one camera is selected from a group consisting a digital or video images capturing module, image acquiring sensor, thermal acquiring sensor, CCD, CMOS, wide-angle optic sensor, zoom enabling optic sensors, thermal sensor, optic sensor, including a monochromatic sensor or a combination of two or more monochromatic sensors, magnetic detector, florescence detector, laser detector, thermal & optic integrated sensor, time-of flight (TOP), TOP sensor, structured-light camera, structured-light sensor and any combination thereof It is in the scope of the invention wherein the camera is utilized to sense the spatial 3D orientation and location of individual cow's teat(s) and to thus to facilitate the approach of the milking device towards the teat(s). In another embodiment of the technology, thus, not all cow's teats are considered as target to be approached by a singular teat cups assembly, but individual teats which has their own 3D orientation and location are approached, by means of the camera-feedbacking mechanism. It is within the scope of the invention where one camera is targeting all four teats or where a plurality of cameras is utilized to feedback the approach of the milking assembly to a plurality of teats. The term "plurality" refers here to an integer number or items being equal or greater than one, e.g., 1, 2, 3, 4 etc.

It is in the scope of the invention wherein the camera/cameras are provided in or in connection with a maneuverable milking assembly or feedbaceky-operatable maneuverable milking assembly, and further wherein the milking assembly is provided in connection to the hereto defined elevated/suspended rail construction.

It also is in the scope of the invention wherein the camera/cameras are provided in or in connection with a milking assembly comprising a plurality of teat-cups having a distal portion facing cow's teats and a proximal portion in connection with a base; wherein the base is selected from a group consisting of multi-planes base, multi-facet base, segmented base, retractable base, and any other base characterized by more than one degrees of freedom as related to the location, 3D orientation of spatial configuration of the camera(s), the basal plane of the base and the teat cup(s).

It also is in the scope of the invention wherein communicable teat cup assembly (TCA) is disclosed. TCA comprises, inter alfa, a plurality of milking cups, a TCA manipulator, at least one camera and a computer readable medium (CRM) in either cordial or wirelessly communicated with the camera, having instruction for the manipulator to actuate the teat cups towards cow's teats. In an embodiment of the technology, TCA approaches cow's teats form cow's rear side, namely between and through cow's rear legs. This maneuver of the TCA is enabled and controlled by an image processing CRM configured to either 2D or 3D allocating both the right and left rear legs of the cow, defining the middle in legs' height (Z-main axis) and legs distance (Y-main axis), thereby enabling in-between and directing TCA to pass at the middle or adjacent to the location.

Reference is hence made to FIG. 46, displaying four camera photos of cow's rear legs (441-444). CRM is configured to allocate middle portions of left and right rear legs (e.g., crosses 445 and 446, respectively). As seen in those photos, the system is useful in all cases, namely where two legs are substantially erected or substantially tilted (441), two legs laying evenly and where right or left rear les is positioned in front of the other leg.

Much similarly, CRM of the present invention is configured to allocate each of cow's teats and, by means of one or more cameras, provide teats 2D or 3D orientation. This milking system is hence useful in all cases, namely where the teat is substantially erected (perpendicular of the stall's floor), or alternatively, where one or more of the teats is substantially tilted, two teats laying non-evenly and where one or more of the teats is positioned in front of the other teat.

Alternatively, according to yet another embodiment of the technology, a camera-free teat assembly mechanism is disclosed. In this milking system, once one cup is accommodating or provided in the vicinity to a teat, the location of other adjacent teats is non-optically calculated and the 3D orientation of those neighboring teats is provided.

According to yet another embodiment of the technology, the survey and scoring of the cow's condition is provided useful by a Deep Learning (machine Learning).

According to an embodiment of the invention, a machine learning algorithm is utilizes. These means and methods for deep learning uses a cascade of a plurality of layers of nonlinear processing units for feature extraction and transformation so rear legs 2D or 3D orientation is provided as the above, 2D or 3D orientation of each of the teats are further obtained. Each successive layer uses the output from the previous layer as input to 2D or 3D configure the milking arm movement via cow's rear legs, and affix milking cups below teats before milking; as well as cups and arm's retrieval in the same manner after milking is concluded. It is in the scope of the invention wherein the algorithms is supervised, unsupervised or partially supervised, and applications include pattern analysis (unsupervised) and classification (supervised).

It is hence according to one embodiment of the invention, where the means and methods of the hierarchical learning are at least partially based on partially unsupervised learning of multiple levels of features or representations of the data. Higher level features are derived from lower level features to form a hierarchical representation. This "rear-legs & teats image processing capabilities" of the deep structured learning milking system is part of a broader machine learning means and method is provided useful in this novel FDR which is further configured for learning representations of data; the milking learn multiple levels of representations that correspond to different levels of abstraction; the levels form a hierarchy of concepts.

According to an embodiment of the invention, the aforesaid machine learning algorithm and means thereof is further utilizes for health scoring of the cow; see Heinrichs, A. J., and V. A. Ishler. *Body condition scoring as a tool for dairy herd management.* College of Agricultural Sciences, Cooperative Extension, 1989; Roche, John R, et al. "Invited review: Body condition score and its association with dairy cow productivity, health, and welfare." *Journal of dairy science* 92.12 (2009): 5769-5801; Spoliansky, Roii, et al. "Development of automatic body condition scoring using a low-cost 3-dimensional Kinect camera." *Journal of Dairy Science* 99.9 (2016): 7714-7725; and Lynn, Nay Chi, Thi Thi Lin, and Ikuo Kobayashi. "Automatic Assessing Body Condition Score from Digital Images by Active Shape Model and Multiple Regression Technique." (2017); which are incorporated herein as a reference. Hence for example, rear portion of the cow is imaged in order to determine the spatial orientation of the rear legs. In that time, cow's health condition is assessed. Similarly, teats are also analyzed, and their thermal image and condition is also provided.

Hence, according to an embodiment of the technology, MMU, or portion thereof, e.g., the extender, comprises or intercommunicates with one or more stills camera (CCD), a video camera, optic sensor(s), thermographic sensor(s) or a combination thereof. According to yet another embodiment of the technology, the survey and scoring of the cow's condition is provided useful by a Deep Learning (machine Learning)., e.g., as disclosed by Tedin, Rafael, et al. "Computational Intelligence based construction of a Body Condition. Assessment system for cattle." *Computational Intelligence and Virtual Environments for Measurement Systems and Applications* (*CIVEMSA*), 2013 IEEE International Conference on. IEEE, 2013; Tedin. Rafael, et al. "Towards Automatic Estimation of the Body Condition Score of Dairy Cattle Using Hand-held Images and Active Shape Models." *KES.* Vol. 243. 2012; Huo, Xiaojing, et al. "on Datasocket Technology." *Information Technology Journal* 12.21 (2013): 6385-6390; Spoliansky, Roii, et al. "Development of automatic body condition scoring using a low-cost 3-dimensional Kinect camera." *Journal of Dairy Science* 99.9 (2016): 7714-7725; and Chay-Canul, Alfonso J., et al. "Body fat reserves and their relationship to ultrasound back fat measurements in Pelibuey ewes." *Ecosistemasy Recursos Agropecuarios* 3.9 (2016): 407-413 etc., all are incorporated herein as a reference.

According to yet another embodiment of the invention, the aforesaid sensors incorporated in connection with the MMU and subunits thereof, are set useful for identifying estrus conditions in cows, in manners disclosed in Chowdhury, Sujan, et al. "Deep Learning Based Computer Vision Technique for Automatic Heat Detection in Cows." *Digital image Computing: Techniques and Applications* (*DICTA*), 2016 *International Conference on. IEEE,* 2016; Halli, K., et al. "Investigations on automatically measured feed intake amount in dairy cows during the oestrus period." *Archiv fuer Tierzucht* 58.1, (2015): 93; Shahriar, Md Sumon, et al. "Heat event detection in dairy cows with collar sensors: An unsupervised machine learning approach." *SENSORS,* 2015 *IEEE. IEEE.* 2015; Chen, Chien-Hsing, and Hung-Ru Lin. "Estrus Detection for Dairy Cow Using ZigBee-Based Sensor Networks." International Journal of Information and Electronics Engineering 5.4 (2015): 250 etc., all are incorporated herein as a reference.

Estrus Determination

According to an embodiment of the invention, the aforesaid detectors are set useful for identifying estrus conditions. The detectors comprise, inter alia, cameras, single-axis accelerometers or multiple axis accelerometers. These detectors are incorporated in connection with the MMU and subunits thereof, or interconnected as sensors on the ear(s) or neck of dairy animals.

These detectors determine and measure head acceleration of the dairy animal continuously or intermittently. Detectors measuring is executed while animal is eating in the stall within an FDR or while the animal is not within an FDR-Stall or measure head acceleration throughout the whole predetermined period, with no differentiating of location of the dairy animal, This embodiment of the invention provides three means for identifying estrous time. The first identification method (A) is provided by measuring head acceleration of a dairy animal whilst eating in the stall within an FDR The second method (B) utilizes the head acceleration values measured during non-eating period (while the animal is not within an FDR-Stall). The third method (C) utilizes the differences between head acceleration values measured during non-eating period (while the animal is not within an FDR-Stall) and eating period (while the animal is within an FDR-Stall) of the same dairy animal.

In order to determine if a cow is in estrus, at least one parameter related to the cow's head movements is measured as a function of time in at least two directions and a weighted sum of at least one of the parameters is calculated for a plurality of times. The parameter or parameters is measured in at least two directions, where movement in a direction can be linear movement along an axis or can be a rotation about an axis.

The parameter is typically magnitude of acceleration (linear or rotational) or energy of motion, although other parameters, such as momentum or magnitude of motion can be used.

Typically, movement is measured in at least three directions, where the movement directions are linear movement along the Z (vertical) axis, linear movement along the X axis (lateral to the cow), and rotation about the Y axis, where the V axis is substantially parallel to the longitudinal axis of the cow's head.

The weighting factor for each movement direction can be a constant or it can depend on at least one of time, smoothness of change, and the location of the cow at the time of the measurement.

A non-limiting example of a weighting factor depending on location of the cow is vertical movement of the cow's head. An increase in vertical movement over time can be indicative of estrus; it can also indicate that a cow has begun a meal. Therefore, the weighting factor for vertical movement is typically decreased if the cow is inside a stall at the time of the movement.

A non-limiting example of a weighting factor depending on time but not depending on location is a rapid increase in movement. A rapid increase in movement typically indicates that a cow is fighting or is in discomfort or pain, rather than that she is in estrus. Therefore, for any movement direction, if a large increase in movement occurs over a short time, the weighting factor for the movement direction or directions will be decreased.

The amount of movement in a direction can change smoothly or can show fluctuations. Fluctuations can occur when, over one or a few time intervals, a cow changes its behavior, such as, for non-limiting example: a decrease in movement can occur if a cow lies down to rest, is chewing her cud or stops eating; an increase can occur if she gets up from a rest, starts eating, interacts with another animal, or is in discomfort or pain. Measurement data can be smoothed to remove fluctuations; non-limiting examples of smoothing methods include random smoothing, random walk smoothing, moving average smoothing, simple exponential smoothing, linear exponential smoothing and seasonal exponential smoothing.

A non-limiting example of smoothing weighting comprises calculating a difference between smoothed movement data in at least one direction and measured movement data in that direction. If the difference between the smoothed data and the measured data is too large, the weighting factor for movement in that directing can be decreased.

WEIGHTING ACCELERATIONS, EXAMPLE I

One or more accelometers are attached to animal's body, e.g., animal's neck collar. The accelometer(s) is or are measuring both head and body movement while animal is eating in the stall within an FDR.

The accelerations are continuously measured and stored. A baseline is determined. Art any given time, or alternatively, at a predefined time period, the current acceleration is compared with the the baseline. Alternatively, the accelerations are defined for a time period (e.g., for a period of two minutes) and the average of this acceleration is compared with the baseline. In one example, accelerations related with three axes are concurrently yet separately measured, i.e., x, y, z axes. In second example, accelerations related with six axes are concurrently yet separately measured, i.e., x, y, z axes and rotation thereof.

Example I defines estrus determination when an animal (e.g., a milking cow) is temporarily accommodated within an FDR's stall. Here, for example and in a non-limiting manner, since the cow is periodically declines its head along the Z axis for grasping food at its stall, Z axis movements and accelerations thereof gain less weight than X and Y movements and accelerations thereof.

WEIGHTING ACCELERATIONS, EXAMPLE II

Much similarly, one or more accelometers are attached to animal's body, e.g., animal's ear tag. The accelometer(s) is or are measuring both head and body movement while animal is staying in MLA within an. FDR.

Since dairy animals are ruminating and resting at the MLA, and much less feeding, accelerations along and around Z axis movements and accelerations thereof gain substantially equal weight as compared with both X and Y movements and accelerations thereof.

WEIGHTING ACCELERATIONS, EXAMPLE III

One or more accelometers are attached to animal's body. Potentially, one or more optic or thermic sensors, e.g., cameras, CCDs, video devices etc., are further utilized to determine animal movements and accelerations thereof. This integrated movement's tracking system are configure, by means of computer readable media-based digital means, to measure animal movement: animal movement whilst eating, staying in an MLA etc.

A baseline of a specific animal behavior is stored and updated. This behavior is characterized by various parameters, such as animal ID, time, location, movement, acceleration along one or more axes, daily routines, pattern of its daily activities, and specific parameters of the animal (age, weight, health score, previous estrus timings, last pregnancies and lactating parameters etc). It is well within the scope of the technology, where baseline is time-resolved (different movement pattern at mornings as compared with evenings for example) and case resolved (where animal behaves differently). Hence, it is in the scope of the technology where each animal is characterized by specific time-resolved ad case-resolved baseline fingerprint and some animal has a somewhat smooth baseline and others has a non-smooth baseline.

Before and at time of estrus, movement and accelerations change. The hereto presented FDR-based estrus determining technology is provided useful for detecting various changes of animal behavior: e.g., smooth or otherwise non-smooth increase in total movements and accelerations thereof as compared with aforesaid baseline, abrupt increase in total movements and accelerations thereof as compared with aforesaid baseline, increase movements and acceleration along a portion of the six axes, and concurrently less changes of movements in other axes as compared with aforesaid baseline, short increase in accelerations and respectively longer increase as compared with aforesaid baseline, etc.

ESTRUS DETERMINING METHODS, FIRST EXAMPLE

The detectors determine head acceleration of an eating animal whilst eating for several time periods. Each time period the dairy animal is within an FDR-Stall is denoted as ($\Delta t_i$).

Head acceleration of an eating animal ($a_{x,y,z}(t)$) is measured for each the time period ($\Delta t_i$). For each time point the animal is within an FDR-Stall, the detectors define "an animal eating event energy value" ($E_{eating}(\Delta t_i)$). Additionally, the detectors generate, for each first predetermined period of time n, a "total eating energy value" $E_{eating,total}(n)$ by summing all the "eating event energy value"s occurring during each the first predetermined period of time n, $E_{eating,total}(n) = \sum_{i=i_{begin}}^{i_{end}} E_{eating}(\Delta t_i)$ e.g. a day, a month).

For each of second predetermined period of time, comprising at least time point N of the first predetermined periods of time, the detectors generate a baseline eating energy value $S_{Eating}$ by averaging all the total eating energy values $E_{eating,total}(n)$ by the number of predetermined time periods (e.g. a day, a month). For at least of one of the second predetermined period of time, the detectors determine a "maximum daily eating energy value" ($E_{eating,max} = \max(E_{eating,total}(n))$. These detectors further generate an estrus alarm when the "eating energy event value" $E_{eating,total}(n)$ is greater than half of the sum of the "maximum daily eating energy value" and "baseline eating energy value" (($E_{eating,max} + E_{eating})/2$).

ESTRUS DETERMINING METHODS, SECOND EXAMPLE

The detectors determine and measure head acceleration of the dairy while animal is not within an FDR-Stall. Each time period the dairy animal is not within an FDR-Stall is denoted as ($\Delta t_i$).

Head acceleration of a non- eating animal ($a_{x,y,z}(t)$) is measured for each the time period ($\Delta t_i$). For each time point the animal is not in an FDR-Stall, the detectors define, for each the time period, "an animal head movement energy value" ($E_{move}(\Delta t_i)$). Additionally, the detectors generate, for each first predetermined period of time n for each animal, a total head movement energy $E_{move,total}(n)$, by summing all the "head movement energy value"s occurring during each the first predetermined period of time n, $E_{move,total}(n) = \sum_{ibegin}^{iend} E_{move,total}(\Delta t_i)$; (e.g. a day, a month).

For each of second predetermined period of time, comprising at least time point N of the first predetermined periods of time, the detectors generate a "baseline head movement energy" $E_{move}$ by averaging all the total energy values $E_{move,total}(n)$ by the number of predetermined time periods (e.g. a day, a month). For at least of one of the second predetermined periods of time, the detectors determine a "maximum daily head energy movement value" $E_{move,max} = \max (E_{move,total}(n))$. These detectors further generate an estrus alarm when the "energy event value" $E_{move,total}(n)$ is greater than half of the sum of the "maximum daily head energy value" and "baseline head movement energy value" ($E_{move,max} + E_{move})/2$.

ESTRUS DETERMINING METHODS, THIRD EXAMPLE

The detectors determine and measure head acceleration of the dairy animal non-eating period (while the animal not within the FDR-Stall), as well as measuring head acceleration of the dairy animal eating period (while the animal is within an FDR-Stall), for the same dairy animal.

For each first predetermined period of time n, the detectors determine a "total non-eating head movement energy" $E_{noneat}(n)$ as the difference between the total animal head movement energy value $E_{move,total}(n)$ and the total eating event energy value $E_{eat,total}(\Delta t_n)$, $E_{noneat}(n) = E_{move,total}(n) - E_{eat,total}(n)$ occurring during each the first predetermined period of time n (e.g. a day, a month). For each of second predetermined period of time, comprising at least time point N of the first predetermined periods of time, the detectors generate a "baseline head movement energy value" $E_{move}$, by averaging all the total non-eating movement energy values $E_{move,total}(n)$ by the number of predetermined time periods (e.g. a day, a month). For at least of one of the second predetermined periods of time, the detectors determine a "maximum daily head movement energy value" $E_{move,max} = \max(E_{noneat}(n))$ These detectors further generate an estrus alarm when the "a total non-eating head movement energy" $E_{noneat}(n)$ is greater than half of the sum of the "maximum daily head movement energy value" and "baseline head movement energy value" ($E_{move,max} + E_{move})/2$.

The hereto presented FDR comprises a novel stall to which cow is provided with a non-manipulated free access. At time cow is wishing to eat, it freely and autonomously approaches a stall. Subsequently, after cow has finish eating, it leaves the stall, and so on and so forth along all day long. According to an embodiment of the invention, stall comprises means for detecting, for each cow, current an accumulated feed, eating habits, chewing rate, feed suitability etc, thus provides FDR's milking system with cows feeding and food parameters, health condition, continuously detecting changes in feeding and food parameters, in health condition, and in predefined cases and parameters thereof, alarming beforehand.

The hereto presented FDR comprises a novel stall to which cow is provided with a non-manipulated free access. At time cow is wishing to eat, it freely and autonomously approaches a stall. Subsequently, after cow has finish eating, it leaves the stall, and so on and so forth along all day long. According to an embodiment of the invention, stall comprises means for detecting, for each cow, current an accumulated feed, eating habits, chewing rate, feed suitability etc, thus provides FDR's milking system with cows feeding and food parameters, health condition, continuously detecting changes in feeding and food parameters, in health condition, and in predefined cases and parameters thereof, alarming beforehand.

It is also in the scope of the invention that the TCA is in connection with the MMA, providing the CPA&C with enhanced capabilities. According to one aspect of the invention, four teat cups are exceeded from a mutual base having length and width, X-axis and Y-axis, in an approximated perpendicular manner, where teat cups are connected in their proximal portion to the base. In this embodiment, at least one camera is located adjacent, on or in the base and is focusing teat cups' distal end. According to another aspect of the invention, camera is maneuverable along the base, e.g., via a reciprocal linear motions. X-axis and Y-axis maneuverability is thus provided, whereas Z-axis maneuverability, as well and rotation along at least one axis is further achievable. According to another aspect of the invention, the teat cup base is maneuverable in respect to the teat and/or in respect the MMU's/cow's teat time-resolved spatial orientation and location. According to yet another aspect of the invention, camera's lens cleansing mechanism is further provided, and is selected in a non-limiting manner from water irrigator, steam emitter, physical scrubbing or wiping modules or a combination of the same.

It is also in the scope of the invention wherein the TCA further comprises other modules, some of them possibly feed backly controlled and operated by means of the camera. Those modules are selected in a non-limiting manner from a group inter alta consisting of teat washing and cleaning modules, water irrigators, water supply, nozzles and pressure regulators, disinfecting solution supply lines and nozzles thereof, vacuum lines, on/off switches, FDR's cultivators, gates and accessories thereof, and any combination thereof.

It is also in the scope of the invention wherein TCA and system thereof further comprises detectors for analyzing abnormal milk and milk components, milk separators for separating the detected abnormal milk.

Figure 36:
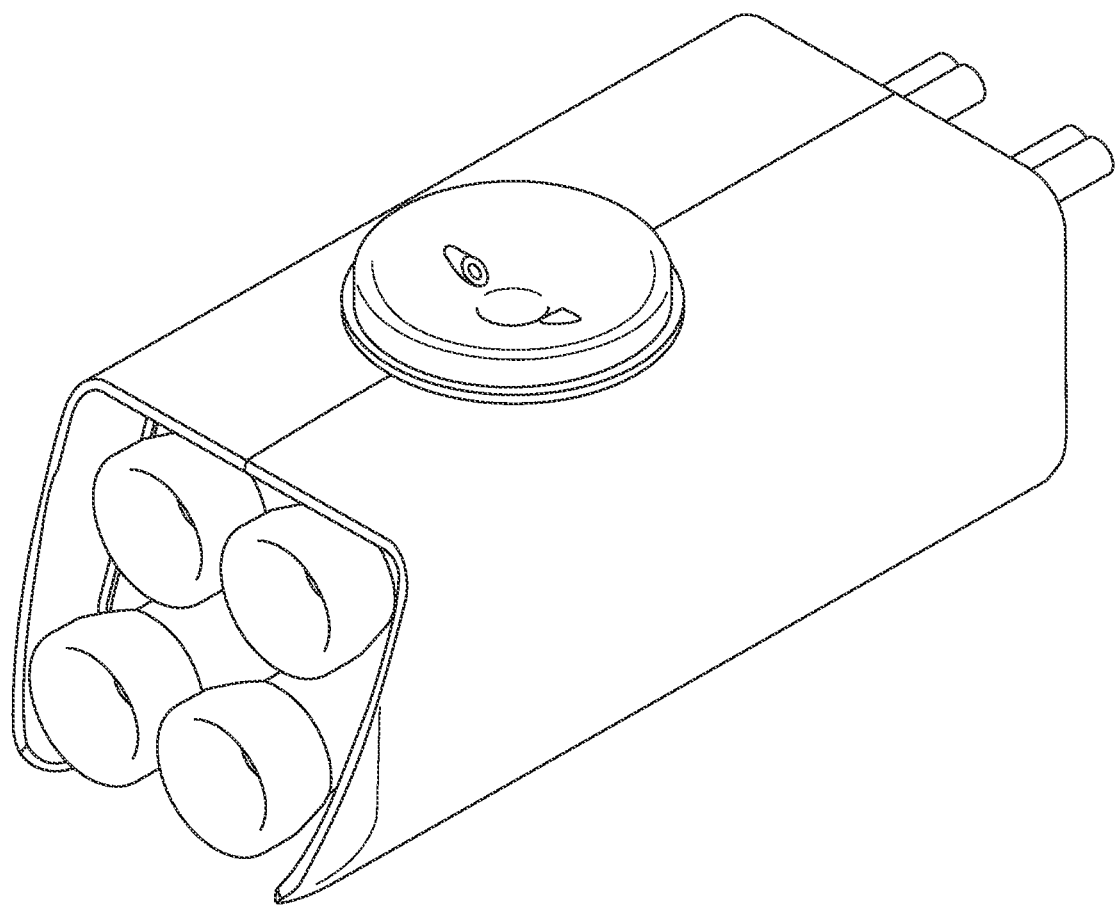
Figure 37:
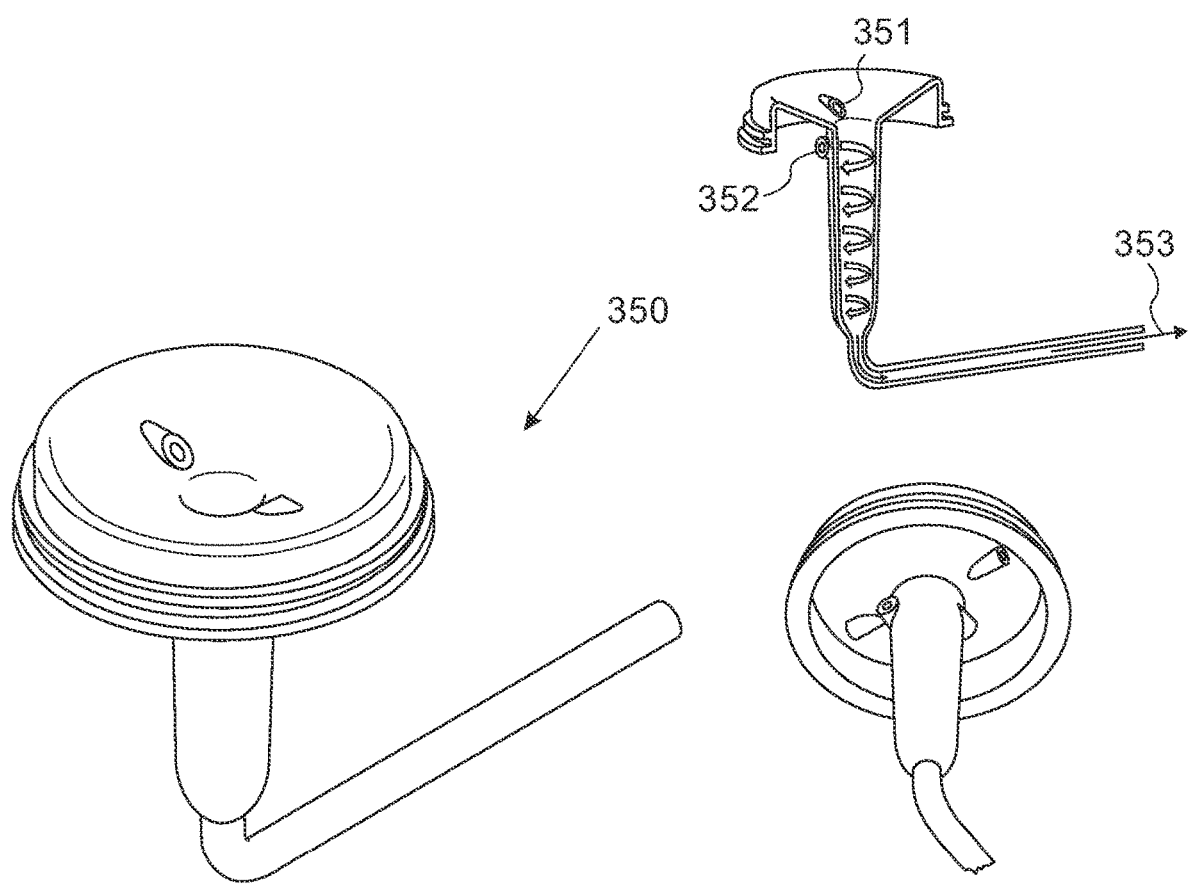
Figure 38:
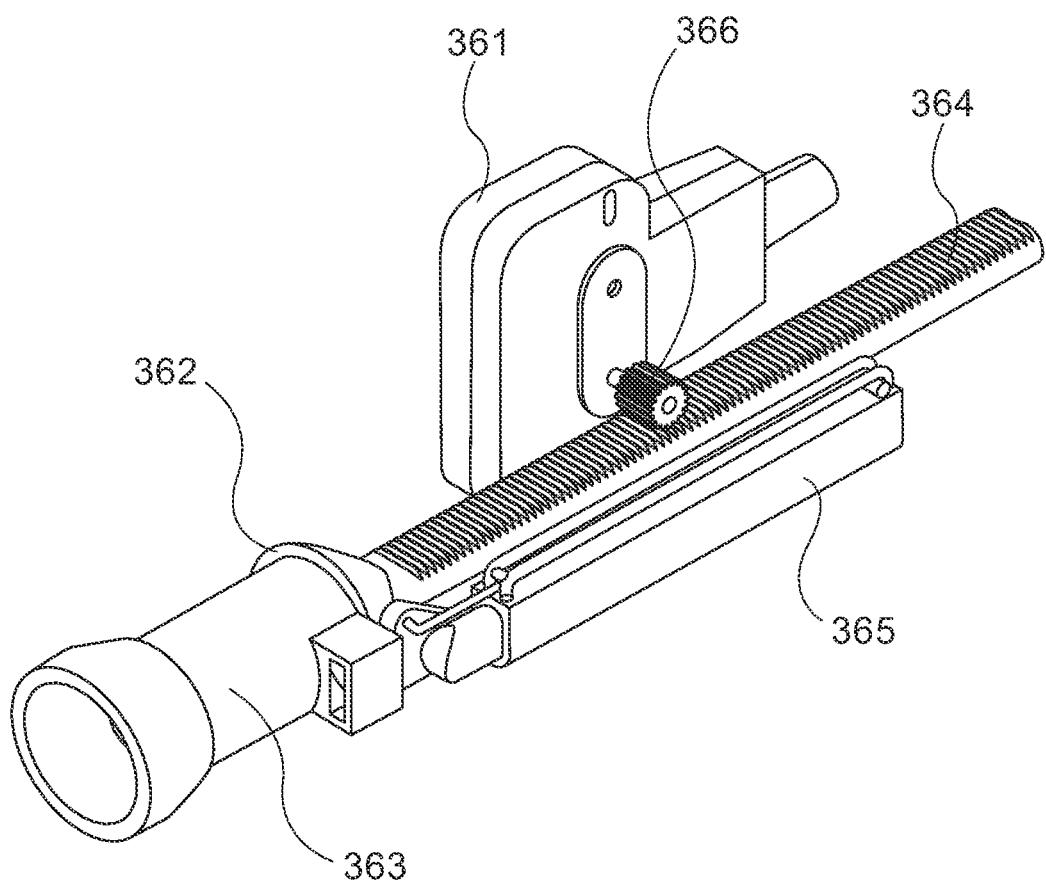
Figure 39:
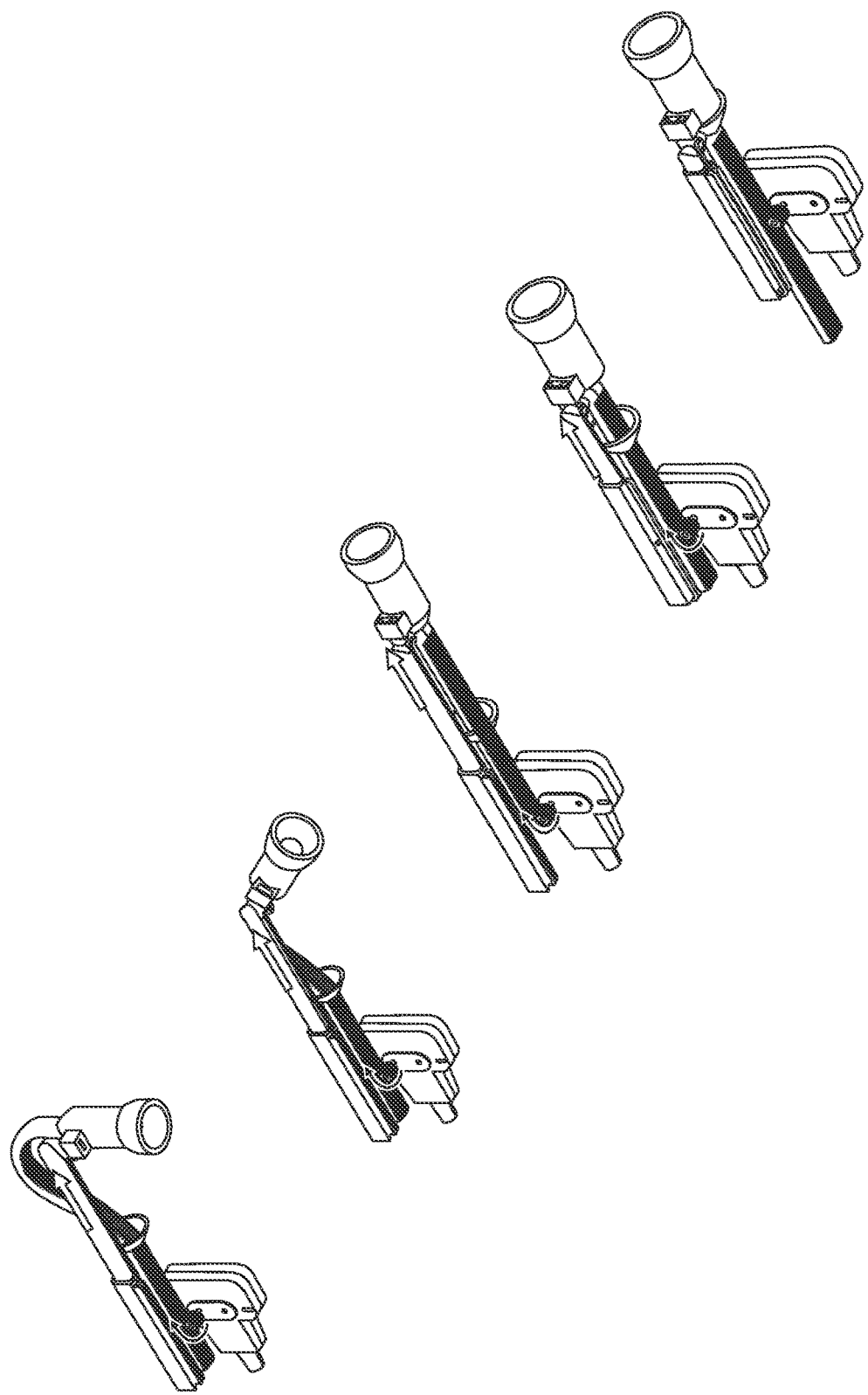

Reference is now made to FIG. 36 which schematically illustrates TYPE IV of the milking mechanism according to yet another embodiment of the invention. This TYPE IV mechanism comprises four (yet possible more or less) milking cups positioned in a horizontal position and a single cleaning cup positioned on top in a vertical position. Milking cups are being ejected and straightens to a vertical position in one mechanical maneuver. FIG. 35 illustrates a set of three images of cleaning cup. Hot water (351) and air (352) are being injected to the vacuum (353)-enabled cleaning cup. FIG. 36 discloses an ejection and straightens mechanism of the TYPE IV milking module, which inter glia comprises motors gear box (361), cup receptacle (362), a milking cup (363), dual pipe- milk & vacuum (364), ejection mechanism (365) and rack and pinion (366). FIGS. 39-41 discloses folding and retracting mechanism action according to one aspect of the invention. FIG. 41 discloses the disconnecting movement from teat. Gear box rack pulls back the dual hose and milking cup engage with its receptacle.

FDR. EXAMPLE 1

Reference is now made to FIG. 9A, schematically illustrating an FDR barn yard (MLA) general overview, according to one embodiment of the invention. The FDR is arranged as follows: Feeding line and milking stations (901), Milk discharge and washing unit (902), Dry cows' area (903), Calving area (904), Mani living barns (905), Freeway & Separation gate (906), Cow treatment area (907) and Tie chutes (908). Reference is now made to FIG. 9B, schematically illustrating this FDR, showing cow in the tied in chute (910), cow in the feeding line eating and ready to be milked (911), cow enters the feeding milking area through one way gate (912), and cow exits milking area Freeway or separation for treatment (913).

The FDR thus integrates various interconnected animal habitat zones: one or more living zones were dairy cattle, here, cows, are freely and interruptedly doing whatever they wish to do, without any human or external interruption of manipulation. One or more cultivators are possibly provided useful in the living zone(s) for treating animal's soil for compost generation from their fecal. One or more eating and milking zone(s) are utilized for animal's free eating (cow eats when and what it like), without human or other animal's interfering. Animals are concurrently milked in a clean manner if and when it is required, whilst animal fecal is automatically treated by one or more cultivators. In one or more treatment zones, to where cows are free to enter, food and milking is suggested to animals and thus their stay can be prolonged. Animal stress in minimized by that cow is staying in this zone with member of its group. An optional dried animal zone, where dried cows are free to enter, while a continuous eye contact with other member of it's group is maintained.

FDR, EXAMPLE 2

According to another mode of the invention, incoportable with various details defined in. Example 1 above, eating and milking module is configured for cow's individual undisturbed feeding, e.g., by means of longitudinal separation if one animal from the others. It is further configured for cow's separate and personalized feed by means of personalized batch feed in predefined identified feeding tray. It is further configured for online & inline individual feed control for each of the cows on the module. It is further configured for avoiding cow's escape prior to its required milking. It is further configured for encouraging and supporting animal evacuation, e.g., food manipulation etc. Physically, it is further configured for not restricting animal's head movement and for serving animals of various type and sizes. Emptying and recycling module is provided useful for cleansing MMUs, milk outlet flow, measurement and control, module cleaning, disposable materials upload, providing various maintenance and repair facilities. Milking module is configured for teat cleansing and preparation, milking and post-milking care, for whole udder or quarter milking. It is further configured for quaternary milking. It is further configured for milking dose metering, e.g., batch-wise or continuous milking weighting. A teat cup administration module is configured to use at least one movable camera. It is further configured for administration of teat-cups in a predefined sequence. It is further configured for various transportation and maneuverability mechanisms and performances. Rail-transportation module is configured for mounting and otherwise getting down the milking assembly to and from a milking position. It is further configured for disassembling dismounting movable units from the rail. Eating/feeding line is configured to comprise about 30% of the number of cows. This line is configured to be straight, zigzagged, curved, continuous or broken. Automatic feeding module is configured to ensure enough food is served to each cow. It is further configured for ensuring personalized feed, meaning optimization of food quality, quantity, and suitability to the specific cow. The cultivating module is provided useful for autonomic translocation e.g., in and from living zones and treatment zones. The cultivator is further configured for ensuring slow and silent movement where animals are not intimidated. The cultivator is further configured for feedbacked robotic movement, adapted to detouring stationary objects, sleeping animals etc. It is further provided useful for passing through FDR's gates. The cultivator is further configured for soil composition, e.g., utilizing fermenting bacteria and other relevant microorganisms.

Reference is now made to FIGS. 27-34 disclosing a fourth embodiment of the present invention showing a transportation method of the MMU and subsystems thereof. Here again, the MMU is horizontally transported along an elevated rail by a taxi. In the following embodiment of the invention, the taxi is a driving unit that horizontally sliding, actuating or otherwise transporting the milking unit along a defined root, potentially a root comprising one or more stations, without the necessity of lowering or elevating the milking units into the cow stall. According to this embodiment of the invention, the taxi pushes, pules or otherwise actuate the milking unit forward to an upper docking station, located on top of the cow stall, while the milking unit comprises its own vertical drive unit configured to lower or elevate itself independently, without being depended on the taxi. Furthermore, MMU leaves the dairy animal at the end of the milking process, or it the dairy cow resists to milking process or counterforces the milking process. In addition, the MMU of this embodiment is continuously or occasionally connected to powerlines, e.g., powerlines allocated within the elevated rail system. This connection avoids the use of running power cables inside and between stalls and operational drawbacks related with power shut down.

The invention claimed is:

1. A free dome range (FDR) where at least one dairy animal has free access to their stall to concurrently eat and to be milked, comprising:
   a. s stalls, s is an integer equal to or greater than one; at least one of said s stalls is characterized by a front side and rear opposite side into which one of said at least one dairy animal is at least temporarily accommodated, head of said one of at least one said dairy animal facing said front side;
   in main living areas (MLA), m is an integer equal to or greater than one; at least one of said MLAs is in connection with at least one of said s stalls by means of g gates, g is an integer equal to or greater than one;
   where said FDR further comprises
   c. a horizontally positioned elevated rail system comprising e elevated rails, e is an integer greater than or equal to one;
   d. n mobile milking units (MMUs), n is an integer equal to or greater than one, each of said n MMUs is configured to be transported via at least one of said e elevated rails to said one of said at least one dairy animal in said at least one of said s stalls, and milk said one of said at least one dairy animal while it is eating;
   wherein said FDR further comprises at least two connectors, each of said at least two connectors comprising an extender and a messenger; each of said n MMUs selected from the group consisting of an MMU comprising an extender, and an MMU comprising an extender and a messenger; each said messenger is configured to both (i) lower said extender vertically from one of said e elevated rails to a lower docking station provided within or in connection with one of said s stalls and (ii) raise vertically said extender to one of said e elevated rails; each said extender configured to milk said one of said at least one dairy animal while it is eating; at least one taxi, each of said at least one taxi is reversibly connectable to each of said at least two connectors; each of said at least one taxi is configured to transport on said e elevated rails each of said least two connectors, each of said at least two connectors is configured to be transported to a different one of said at least one dairy animal; said at least one taxi is configured to reversibly disconnect from a first of said at least two connectors, said first of said at least two connectors being at a first predetermined location, said at least one taxi is configured to disconnect from one of said at least two connectors and to reversibly connect said one of said at least two connectors to said lower docking station in one of said s stalls; said at least one taxi configured to connect to a second of said at least two connectors and to transport said second of said at least two connectors to another one of said s stalls, to disconnect from said second of said at least two connectors, and to reversibly connect said second of said at least two connectors to said lower docking station in the another one of said s stalls.

2. The FDR of claim 1, wherein said extender is configured to reversibly approach a milking assembly towards teats of said at least one dairy animal.

3. The FDR of claim 1, additionally comprising, for at least one of said s stalls, said docking station located at a rear portion of said at least one of said s stalls, said docking station being configured to reversibly interconnect at least one of said messenger and said extender of at least one of said n MMUs.

4. The FDR of claim 1, wherein each of said at least one taxi is configured to drive any one of said n MMUs, one at a time, horizontally along said e elevated rails; the number n of said MMUs is an integer equal to or greater than two; each of said n MMUs comprising an extender; said at least one taxi being reversibly connectable, one at a time, to said n extenders; said at least one taxi is configured to transport, on said e elevated rails, each of said n extenders to in dairy animals, in being an integer equal to or greater than I and equal to or less than n, each of said n extenders is configured to milk one of said in dairy animals while it is eating.

5. The FDR of claim 4, additionally comprising p messengers, p being an integer greater than or equal to 1 and less than or equal to n, each of said p messengers reversibly connectable to said at least one taxi, each of said p messengers is configured to both (i) lower one of said n extenders vertically from one of said e elevated rails to said lower docking station provided within or in connection with one of said s stalls and (ii) raise vertically said one of said n extenders to said one of said e elevated rails; each of said n extenders configured to reversibly approach a milking assembly towards at least one teat of one of said m dairy animals.

6. The FDR of claim 4, wherein a recycling station is configured to be docked to by at least one of said n extenders and to accept milk from at least one of said n extenders, said recycling station additionally configured to perform a member of the group consisting of measure quantity of milk, measure quality of milk, clean at least one of said n extenders, load at least one of said n extenders, and any combination thereof.

7. The FDR of claim 4, wherein a recycling station is additionally configured to analyze milk for chemical and biological components and, optionally, to separate abnormal milk from normal milk.

8. The FDR of claim 4, wherein a recycling station is configured to be docked to by at least one of said n connectors and to accept milk from said at least one of said n connectors, said recycling station additionally configured to perform a member of the group consisting of measure quantity of milk, measure quality of milk, clean at least one of said n MMUs, load said at least one of said n connectors, and any combination thereof.

9. The FDR of claim 8, wherein a recycling station is additionally configured to analyze milk for chemical and biological components and, optionally, to separate abnormal milk from normal milk.

10. A method of providing for at least one dairy animal in a free dome range (FDR)) with free access to a stall for concurrently eating and being milked, comprising:
   a. providing s stalls, s is an integer greater than or equal to one; further providing at least one of said s stalls with a front side and rear opposite side into which said at least one dairy animal is at least temporarily accommodated, a head of said at least one dairy animal facing said front side;
   b. providing in main living areas (MLA), in is an integer greater than or equal to one; connecting at least one of said in MIAs with at least one of said s stalls by means of g gates, g is an integer equal to or greater than one;
   wherein said method further comprises
   c. positioning an elevated rail system hotizontally and providing the same with e elevated rails, e is an integer number equal to or greater than one;
   d. providing n mobile milking units (MMUs), n is an integer equal to or greater than one, and configuring each of said n MMUs to be transported on at least one of said e elevated rails to said at least one dairy animal in said at least one of said s stalls, and milk said at least one dairy animal while it is eating;

further wherein said FDR further comprises at least two connectors, each said at least two connectors comprising extender and a messenger; each of said n MMUs selected from the group consisting of an MMU comprising an extender, and an MMU comprising an extender and a messenger; each said messenger is configured to both (i) lower said extender vertically from one of said e elevated rails to a lower docking station provided within or in connection with one of said s stalls and (ii) raise vertically said extender to one of said e elevated rails; each said extender configured to milk said one of said at least one dairy animal while it is eating; at least one taxi, each of said at least one taxi reversibly connectable to each of said at least two connectors; each of said at least one taxi is configured to transport on said e elevated rails each of said least two connectors, each of said at least two connectors is configured to be transported to a different one of said at least one dairy animal; said at least one taxi is configured to disconnect from one of said at least two connectors and to reversibly connect said one of said at least two connectors to said lower docking station in one of said s stalls; said at least one taxi configured to connect to a second of said at least two connectors and to transport said second of said at least two connectors to another one of said s stalls, to disconnect from said second of said at least two connectors, and to reversibly connect said second of said at least two connectors to said lower docking station in the another one of said s stalls.

* * * * *